US012640870B2

(12) United States Patent
Kim et al.

(10) Patent No.: US 12,640,870 B2
(45) Date of Patent: May 26, 2026

(54) DEVICE AND METHOD FOR TRANSMITTING AND RECEIVING CONTROL INFORMATION AND DATA IN COMMUNICATION SYSTEM

(71) Applicant: SAMSUNG ELECTRONICS CO., LTD., Suwon-si (KR)

(72) Inventors: Kyungjoong Kim, Suwon-si (KR); Hongsil Jeong, Suwon-si (KR); Seho Myung, Suwon-si (KR); Sungjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 322 days.

(21) Appl. No.: 18/109,640

(22) Filed: Feb. 14, 2023

(65) Prior Publication Data

US 2023/0198702 A1     Jun. 22, 2023

Related U.S. Application Data

(63) Continuation of application No. PCT/KR2021/010840, filed on Aug. 13, 2021.

(30) Foreign Application Priority Data

Aug. 14, 2020    (KR) ........................ 10-2020-0102822
Oct. 22, 2020    (KR) ........................ 10-2020-0137799

(51) Int. Cl.
*H04L 5/00*          (2006.01)
*H04L 1/00*          (2006.01)
(Continued)

(52) U.S. Cl.
CPC ....... *H04L 5/0048* (2013.01); *H04W 72/1268* (2013.01); *H04W 72/54* (2023.01)

(58) Field of Classification Search
CPC .. H04L 5/0048; H04W 72/54; H04W 72/1268
(Continued)

(56) References Cited

U.S. PATENT DOCUMENTS 8,576,783 B2    11/2013  Huh et al.
10,447,455 B2    10/2019  Bontu et al.
(Continued)

FOREIGN PATENT DOCUMENTS

CN         110061804 A     7/2019
EP         3462654 A1 *   4/2019    ........... H04L 1/0016
(Continued)

OTHER PUBLICATIONS

Communication issued Apr. 23, 2025 from the Korean Intellectual Property Office for Korean Patent Application No. 10-2020-0137799.
(Continued)

*Primary Examiner* — Xuan Lu
(74) *Attorney, Agent, or Firm* — Sughrue Mion, PLLC

(57)          ABSTRACT

The present disclosure relates to a $5^{th}$ generation (5G) or pre-5G communication system for supporting a higher data transmission rate than a $4^{th}$ generation (4G) communication system such as long-term evolution (LTE). Disclosed is a method performed by a terminal that may comprise: receiving configuration information for a CSI report from a base station; acquiring a channel quality indicator (CQI) table on the basis of the configuration information for the CSI report; and transmitting CSI including a CQI according to the CQI table to the base station, wherein the CQI table is configured on the basis of a first CQI table of a case where transport block error probability is 0.1 and a second CQI table for a case where transport block error probability is 0.00001. The method performed by the terminal may further comprise: receiving configuration information relating to a physical
(Continued)

uplink shared channel (PUSCH) or a physical downlink shared channel (PDSCH) from the base station; identifying a modulation and coding scheme (MCS) table on the basis of the configuration information relating to the PUSCH or PDSCH; and acquiring a transport block size (TBS) on the basis of the MCS table, wherein the MCS table is configured on the basis of a first MCS table configured by default and a second MCS table configured for low spectral efficiency (SE) in the base station.

20 Claims, 17 Drawing Sheets

(51) Int. Cl.
| | |
|---|---|
| *H04L 1/20* | (2006.01) |
| *H04L 27/26* | (2006.01) |
| *H04W 72/1268* | (2023.01) |
| *H04W 72/54* | (2023.01) |

(58) Field of Classification Search
USPC ......................................................... 370/329
See application file for complete search history.

(56) References Cited

U.S. PATENT DOCUMENTS

| | | | |
|---|---|---|---|
| 10,848,223 | B2 | 11/2020 | Kim et al. |
| 11,258,536 | B2 * | 2/2022 | Myung ................ H03M 13/116 |
| 11,477,802 | B2 | 10/2022 | Lee et al. |
| 11,985,664 | B2 * | 5/2024 | Park ...................... H04W 72/20 |
| 2015/0271794 | A1 * | 9/2015 | Kang .................. H04L 27/0008 |
| | | | 370/329 |

| | | | |
|---|---|---|---|
| 2017/0187489 | A1 * | 6/2017 | Myung ................ H03M 13/116 |
| 2019/0028229 | A1 | 1/2019 | Yeo et al. |
| 2020/0351008 | A1 | 11/2020 | Shao et al. |
| 2021/0329614 | A1 * | 10/2021 | Park ...................... H04L 1/0027 |
| 2022/0239405 | A1 | 7/2022 | Kim et al. |
| 2023/0188247 | A1 * | 6/2023 | Myung ................ H04L 5/0051 |
| | | | 370/329 |

FOREIGN PATENT DOCUMENTS

| | | |
|---|---|---|
| JP | 2019-140453 A | 8/2019 |
| KR | 10-2007-0000807 A | 1/2007 |
| KR | 10-2016-0063253 A | 6/2016 |
| KR | 10-2019-0056866 A | 5/2019 |
| KR | 10-2019-0122472 A | 10/2019 |
| WO | 2015/141960 A1 | 9/2015 |
| WO | 2017/039166 A1 | 3/2017 |
| WO | 2019/031925 A1 | 2/2019 |

OTHER PUBLICATIONS

"Draft Report of 3GPP TSG RAN WG1 #AH_NR2 v0.1.0", 2017, MCC Support, R1-171xxxx, 3GPP TSG RAN WG1 Meeting #90, 105 pages total.
Written Opinion (PCT/ISA/237) issued Dec. 15, 2021 by the International Searching Authority for International Patent Application No. PCT/KR2021/010840.
Search Report (PCT/ISA/210) issued Dec. 15, 2021 by the International Searching Authority for International Patent Application No. PCT/KR2021/010840.
Communication issued Nov. 11, 2025 from the Korean Intellectual Property Office for Korean Patent Application No. 10-2020-0137799.

* cited by examiner

DEVICE AND METHOD FOR TRANSMITTING AND RECEIVING CONTROL INFORMATION AND DATA IN COMMUNICATION SYSTEM

CROSS-REFERENCE TO RELATED APPLICATION(S)

This application is a Bypass Continuation Application of International Application No. PCT/KR2021/010840, filed on Aug. 13, 2021, which is based on and claims priority to Korean Patent Application No. 10-2020-0102822 and Korean Patent Application 10-2020-0137799, filed on Aug. 14, 2020, and Oct. 22, 2020, respectively, at the Korean Intellectual Property Office, the disclosure of which are incorporated herein by reference in their entireties.

BACKGROUND

1. Field

The disclosure relates to a communication or broadcasting system and, more particularly, to an apparatus and a method for transmitting and receiving control information in a communication or broadcasting system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

New radio (NR), which refers to a new 5G communication scheme, is designed to enable free multiplexing of various services in time and frequency resources. Accordingly, waveforms/numerologies, reference signals, and the like may be dynamically or freely allocated according to needs of the corresponding services. In order to provide an optimal service to a terminal in communication, it is important to provide optimized data transmission through measurements of a channel quality and an interference amount, and accordingly it is essential to accurately measure a channel state. However, unlike the 4G communication in which channel and interference characteristics do not greatly vary according to frequency resources, a 5G channel has channel and interference characteristics greatly varying according to services, and thus there is a need to support subsets in terms of frequency resource group (FRG) that enable separate measurements of channel and interference characteristics.

The types of services supported in the NR system may be categorized into enhanced mobile broadband (eMBB), massive machine type communications (mMTC), and ultrareliable and low-latency communications (URLLC). The eMBB may be considered a service that targets high-speed transmission of high-capacity data, the mMTC may be considered a service that targets minimized power consumption for a terminal and access of multiple terminals, and the URLLC may be considered a service that targets high reliability and low latency. Different requirements may be applied depending on the type of service applied to a terminal.

In a communication system, various services may be provided to users. As described above, when various services are provided to users, a transmitting side and a receiving side are required to communicate through an appropriate modulation scheme or a coding rate according to communication requirements for each service.

SUMMARY

Based on the discussion, the disclosure provides an apparatus and a method for generating, configuring, or indicating a channel quality indicator (CQI) table in a communication system requiring various target block error rates (BLERs).

Further, the disclosure provides an apparatus and a method for generating, configuring, or indicating a modulation and coding scheme (MCS) table in a communication system requiring various target BLERs.

According to various embodiments, a method performed by a UE includes receiving configuration information for CSI reporting from a base station (BS), acquiring a channel quality indicator (CQI) table on the basis of the configuration information for CSI reporting, and transmitting CSI including the CQI according to the CQI table to the BS, and the CQI table may be configured on the basis of a first CQI table in the case in which a transport block error probability is 0.1 and a second CQI table in the case in which the transport block error probability is 0.00001.

According to various embodiments, a method performed by a UE includes receiving configuration information for a physical uplink shared channel (PUSCH) or a physical downlink shared channel (PDSCH) from a BS, identifying a modulation and coding scheme (MCS) table on the basis of the configuration information for the PUSCH or the PDSCH, and acquiring a transport block size (TBS) on the basis of the MCS table, and the MCS table may be configured on the basis of a first MCS table configured by default and a second MCS table configured for low spectral efficiency (SE) in the BS.

According to various embodiments, a method performed by a BS includes transmitting configuration information to a UE and receiving channel state information (CSI) including the CQI according to a channel quality indicator (CQI) table determined on the basis of the configuration information from the UE, and the CQI table may be configured on the basis of a first CQI table in the case in which a transport block error probability is 0.1 and a second CQI table in the case in which the transport block error probability is 0.00001.

According to various embodiments, a method performed by a BS includes identifying a modulation and coding scheme (MCS) table and transmitting configuration information for a physical uplink shared channel (PUSCH) or a physical downlink shared channel (PDSCH) for indicating the MCS table to a UE, and the MCS table may be configured on the basis of a first MCS table configured by default and a second MCS table configured for low spectral efficiency (SE) in the BS.

According to various embodiments, a UE includes at least one transceiver and at least one processor, and the at least one processor may be configured to receive configuration information for CSI reporting from a BS, acquire a channel quality indicator (CQI) table on the basis of the configuration information for CSI reporting, and transmit CSI including the CQI according to the CQI table to the BS, and the CQI table may be configured on the basis of a first CQI table in the case in which a transport block error probability is 0.1 and a second CQI table in the case in which the transport block error probability is 0.00001.

According to various embodiments, the UE may be further configured to receive configuration information for a physical uplink shared channel (PUSCH) or a physical downlink shared channel (PDSCH) from the BS, identify a modulation and coding scheme (MCS) table on the basis of the configuration information for the PUSCH or the PDSCH, and acquire a transport block size (TBS) on the basis of the MCS table, and the MCS table may be configured on the basis of a first MCS table configured by default and a second MCS table configured for low spectral efficiency (SE) in the BS.

According to various embodiments, a BS includes at least one transceiver and at least one processor, the at least one processor may be configured to transmit configuration information to a UE and receive channel state information (CSI) including the CQI according to a channel quality indicator (CQI) table determined on the basis of the configuration information from the UE, and the CQI table may be configured on the basis of a first CQI table in the case in which a transport block error probability is 0.1 and a second CQI table in the case in which the transport block error probability is 0.00001.

According to various embodiments, the BS may be further configured to identify a modulation and coding scheme (MCS) table and transmit configuration information for a physical uplink shared channel (PUSCH) or a physical downlink shared channel (PDSCH) for indicating the MCS table to the UE.

An apparatus and a method according to various embodiments of the disclosure enable more efficient communication by providing an appropriate CQI table or MCS table according to a target block error rate (BLER) required for communication between a BS and a UE.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION OF EXEMPLARY EMBODIMENTS

Figure 1:
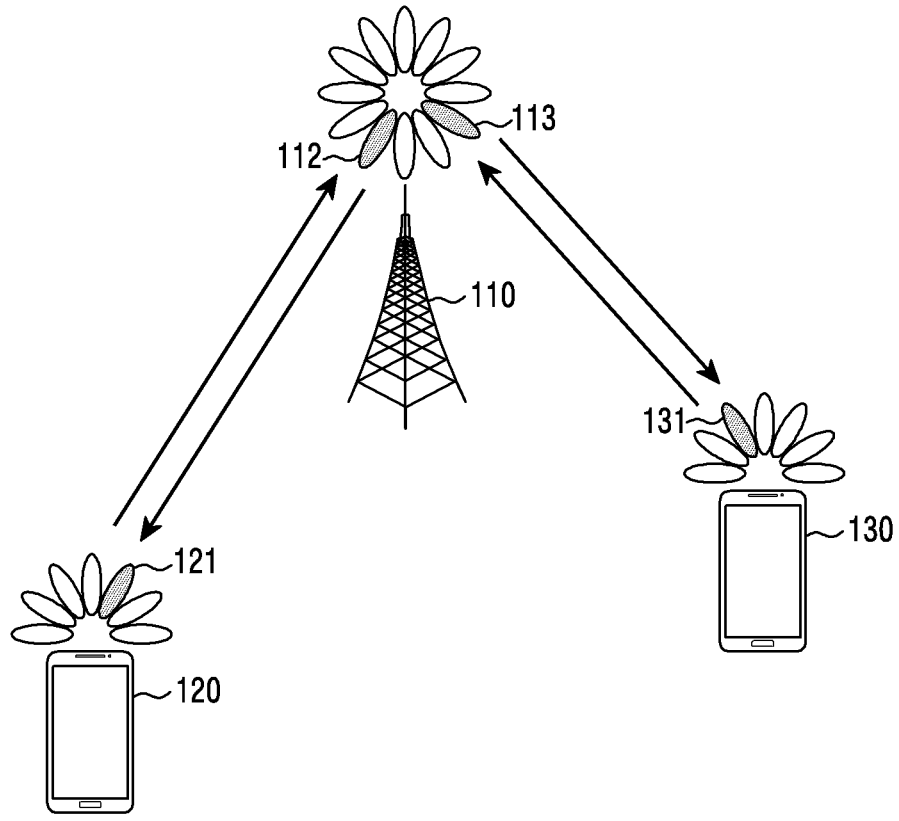
FIG. 1 illustrates a wireless communication system according to an embodiment of the disclosure.

Hereinafter, exemplary embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Based on determinations by those skilled in the art, the main idea of the disclosure may also be applied to other communication systems having similar technical backgrounds through some modifications without significantly departing from the scope of the disclosure. For reference, the term "communication system" generally covers the meaning of a broadcast system, but in the disclosure, a communication system that provides a broadcast service as the main service may be more clearly referred to as a broadcast system.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms referring to signals, terms referring to channels, terms referring to control information, terms referring to network entities, terms referring to device elements, and the like are illustratively used for the convenience of description. Therefore, the disclosure is not limited by the terms as used below, and other terms referring to subjects having equivalent technical meanings may be used.

Furthermore, as used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

Further, in the disclosure, various parameters such as a signal strength, a signal to interference and noise ratio (SINR), and an SNR are described as channel qualities, but reference signal received power (RSRP), beam reference signal received power (BRSRP), reference signal received quality (RSRQ), received signal strength indicator (RSSI), carrier to interference noise ratio (CINR), error vector magnitude (EVM), bit error rate (BER), block error rate (BLER), other terms having the same technical meaning, or metrics indicating the channel quality as well as the described metrics may be used as the channel quality in each embodiment of the disclosure.

In the disclosure, in a transmitted synchronization signal may include at least one of a primary synchronization signal (PSS), a secondary synchronization signal (SSS), an extended synchronization signal (ESS), and an SS block. In the disclosure, a transmitted reference signal may include at least one of a beam reference signal (BRS), a beam refinement reference signal (BRRS), a cell-specific reference signal (CRS), a channel state information-reference signal (CSI-RS), and a demodulation-reference signal (DM-RS).

In addition, various embodiments of the disclosure will be described using terms and names employed in some communication standards (e.g., 3rd generation partnership project (3GPP)), but they are merely for the sake of illustration. Various embodiments of the disclosure may be easily modified and applied to other communication systems.

Hereinafter, the disclosure relates to an apparatus and a method for transmitting and receiving control information in a communication system or a broadcasting system. Specifically, the disclosure describes a technology for transmitting and receiving control information on the basis of a channel quality indicator (CQI) and modulation coding scheme (MCS) tables in a wireless communication system. A method of transmitting control information according to various embodiments of the disclosure may include a method of designing a CQI table to transmit channel state information (CSI) or a method using the designed CQI table. The method of transmitting and receiving control information according to various embodiments of the disclosure may include a method of designing a CQI table designated when a supported service or a target BLER is different or a method using the designated CQI table. The method of transmitting and receiving control information according to various embodiments of the disclosure may include a method of determining or configuring an appropriate MCS by using an appropriate MCS table corresponding to the CQI table or a designed MCS table. The method of transmitting and receiving control information according to various embodiments of the disclosure may include an SINR mapping method and an MCS configuration method based on CQI information reported by the UE. The method of transmitting and receiving control information according to various embodiments of the disclosure may include a method of efficiently skipping a low density parity check (LDPC) code on the basis of a determined MCS level and a transport block size.

FIG. 1 illustrates a wireless communication system according to an embodiment of the disclosure. FIG. 1 illustrates a BS 110, a UE 120, and a UE 130 as parts of nodes using a radio channel in a wireless communication system. Although FIG. 1 illustrates only one BS, another BS that is the same as or similar to the BS 110 may be further included.

The BS 110 is a network infrastructure element that provides radio access to the UEs 120 and 130. The BS 110 has coverage defined in a predetermined geographical area on the basis of the range within which a signal can be transmitted. The BS 110 may be referred to as "Access Point (AP)", an "evolved NodeB (eNB)", a "5th-Generation (5G) node", a "wireless point", a "Transmission/Reception Point (TRP)", or another term having a meaning equivalent thereto, as well as "base station".

Each of the UE 120 and the UE 130 is a device used by a user and communicates with the BS 110 through a radio channel. According to circumstances, at least one of the UE 120 and the UE 130 may operate without any involvement of a user. For example, when at least one of the UEs 120 and 130 is a device that performs machine-type communication (MTC), the UE may not be carried by the user. Each of the UE 120 and the UE 130 may be referred to as a "user equipment (UE)", "mobile station", "subscriber station", "remote terminal", "wireless terminal", or "user device", or using another term having an equivalent technical meaning, as well as "terminal".

The BS 110, the UE 120, and the UE 130 may transmit and receive radio signals. In some embodiments, the BS 110, the UE 120, and the UE 130 may perform communication in a first frequency range (FR) (for example, an FR1 band (410 MHz to 7125 MHz) of an NR communication system). For example, the BS 110, the UE 120, and the UE 130 may transmit and receive radio signals in a sub-6 GHz band. In other embodiments, the BS 110, the UE 120, and the UE 130 may perform communication in a second frequency band (for example, an mFR2 band (higher than or equal to 24.25 GHz) of the NR communication system). For example, as illustrated in FIG. 1, the BS 110, the UE 120, and the UE 130 may transmit and receive radio signals in a millimeter wave (mmWave) band (for example, 28 GHz, 30 GHz, 38 GHz, and 60 GHz). At this time, in order to increase a channel gain, the BS 110, the UE 120, and the UE 130 may perform beamforming. The beamforming may include transmission beamforming and reception beamforming. That is, the BS 110, the UE 120, and the UE 130 may assign directivity to a transmission signal or a reception signal. To this end, the BS 110 and the UEs 120 and 130 may select serving beams 112, 113, 121, and 131 through a beam search procedure or beam management procedure. After the serving beams 112, 113, 121, and 131 are selected, communication may be performed through resources having a quasi-co-located (QCL) relationship with resources through which the serving beams 112, 113, 121, and 131 are transmitted.

If the large-scale characteristics of a channel for transmitting symbols through a first antenna port can be inferred from a channel for transmitting symbols through a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

Figure 2:
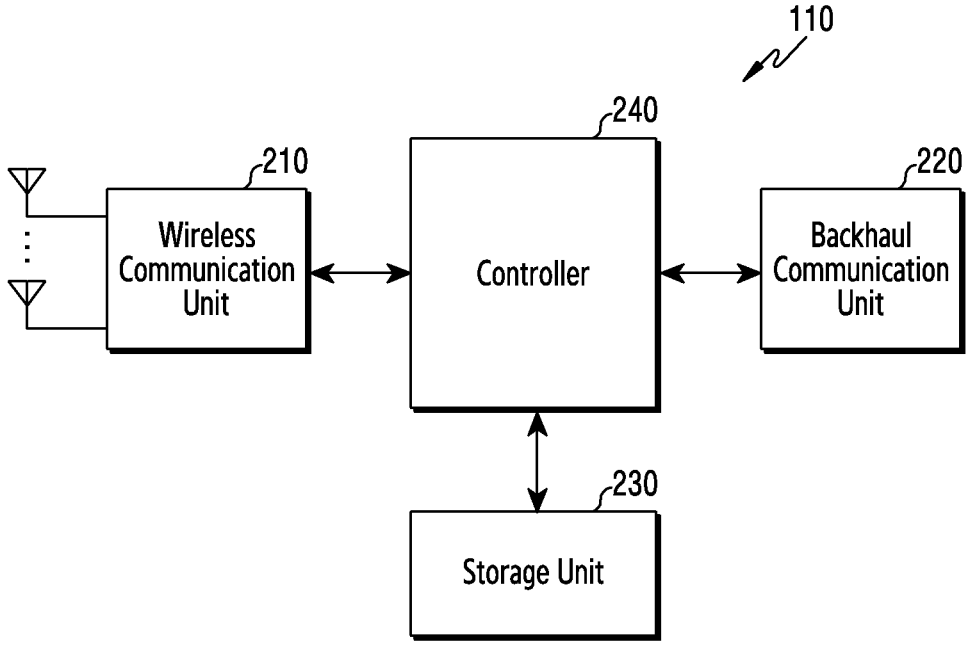
FIG. 2 illustrates a configuration of the BS in a wireless communication system according to an embodiment of the disclosure.

FIG. 2 illustrates a configuration of the BS in a wireless communication system according to an embodiment of the disclosure. The configuration illustrated in FIG. 2 may be understood as the configuration of the BS 110. The term " . . . unit", or the ending of a word, such as " . . . or", " . . . er", or the like, may indicate a unit of processing at least one function or operation, which may be embodied in hardware, software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving signals through a radio channel. For example, the wireless communication unit 210 performs a function of converting a baseband signal and a bitstream according to a physical layer standard of the system. For example, in data transmission, the wireless communication unit 210 generates complex symbols by encoding and modulating a transmission bitstream. In data reception, the wireless communication unit 210 reconstructs the reception bitstream by demodulating and decoding the baseband signal.

The wireless communication unit 210 up-converts a baseband signal into a radio frequency (RF) band signal, transmits the same through an antenna, and down-converts an RF band signal received through an antenna into a baseband signal. To this end, the wireless communication unit 210 may include a transmission filter, a reception filter, an amplifier, a mixer, an oscillator, a digital-to-analog convertor (DAC), an analog-to-digital convertor (ADC), and the like. Further, the wireless communication unit 210 may include a plurality of transmission and reception paths. The wireless communication unit 210 may include at least one antenna array including a plurality of antenna elements.

On the hardware side, the wireless communication unit 210 may include a digital unit and an analog unit, and the analog unit may include a plurality of sub-units according to operation power, operation frequency, and the like. The digital unit may be implemented as at least one processor (for example, digital signal processor (DSP)).

The wireless communication unit 210 transmits and receives the signal as described above. Accordingly, all or part of the wireless communication unit 210 may be referred to as a "transmitter", a "receiver", or a "transceiver". Further, in the following description, transmission and reception performed through a radio channel may include the above-described processing by the wireless communication unit 210. In some embodiments, the wireless communication unit 210 may perform functions for transmitting and receiving signals through wired communication.

The backhaul communication unit 220 provides an interface for communicating with other nodes within the network. That is, the backhaul communication unit 220 converts a bitstream transmitted from the base station to another node, for example, another access node, another base station, or a core network, into a physical signal, and converts a physical signal received from another node into a bitstream.

The storage unit 230 stores a basic program for the operation of the BS, an application program, and data such as configuration information. The storage unit 230 may include a volatile memory, a non-volatile memory, or a combination of the volatile memory and the non-volatile memory. The storage unit 230 provides stored data according to a request from the controller 240.

The controller 240 controls the overall operation of the BS. For example, the controller 240 transmits and receives a signal through the wireless communication unit 210 or the backhaul communication unit 220. The controller 240 records data in the storage unit 230 and reads the same. The controller 240 may perform the functions of a protocol stack required for communication standards. According to another implementation, the protocol stack may be included in the wireless communication unit 210. To this end, the controller 240 may include at least one processor.

According to an embodiment, the controller 240 may transmit and receive control information to and from the UE 120. For example, the controller 240 may control the BS to perform operations according to embodiment described below.

Figure 3:
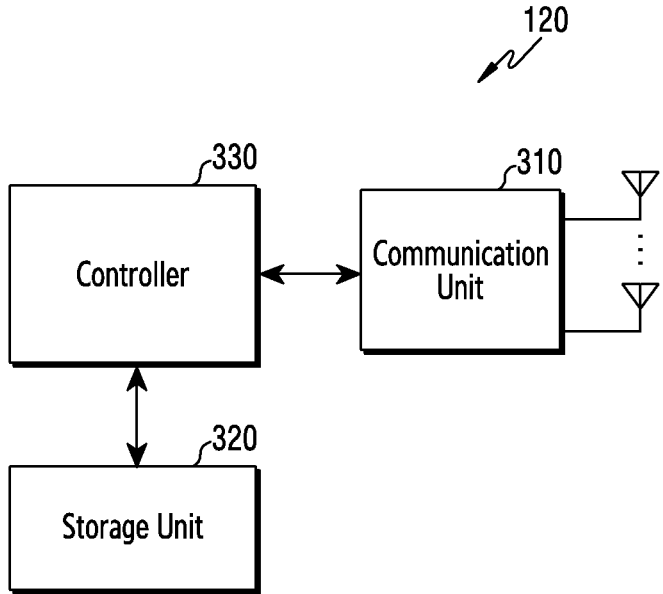
FIG. 3 illustrates a configuration of the UE in a wireless communication system according to an embodiment of the disclosure.

FIG. 3 illustrates a configuration of the UE in a wireless communication system according to an embodiment of the disclosure. The configuration illustrated in FIG. 3 may be understood as the configuration of the UE 120. The term " . . . unit", or the ending of a word, such as " . . . or", " . . . er", or the like, may indicate a unit of processing at least one function or operation, which may be embodied in hardware, software, or a combination of hardware and software.

Referring to FIG. 3, the UE includes a communication unit 310, a storage unit 320, and a controller 330.

The communication unit 310 performs functions for transmitting and receiving a signal through a radio channel. For example, the communication unit 310 performs a conversion function between a baseband signal and a bitstream according to the physical layer standard of the system. For example, in data transmission, the communication unit 310 generates complex symbols by coding and modulating the transmission bitstream. In data reception, the communication unit 310 reconstructs the reception bitstream by demodulating and decoding the baseband signal. The communication unit 310 up-converts a baseband signal to an RF band signal, transmits the same through an antenna, and then down-converts the RF band signal received through the antenna to the baseband signal. For example, the communication unit 310 may include a transmission filter, a reception filter, an amplifier, a mixer, an oscillator, a DAC, an ADC, and the like.

The communication unit 310 may include a plurality of transmission and reception paths. The communication unit 310 may include at least one antenna array including a plurality of antenna elements. On the hardware side, the communication unit 310 may include a digital circuit and an analog circuit (for example, a radio frequency integrated circuit (RFIC)). The digital circuit and the analog circuit may be implemented as one package. The communication unit 310 may include a plurality of RF chains. The communication unit 310 may perform beamforming.

The communication unit 310 may include different communication modules for processing signals in different frequency bands. The communication unit 310 may include a plurality of communication modules to support a plurality of different radio access technologies. For example, the different radio access technologies may include Bluetooth low energy (BLE), wireless fidelity (Wi-Fi), Wi-Fi Gigabyte (WiGig), cellular network (for example, long-term evolution (LTE)), and the like. Further, the different frequency bands may include a super high frequency (SHF) (for example, 2.5 GHz and 5 Ghz) band and a millimeter (mm) wave (for example, 60 GHz) band.

The communication unit 310 transmits and receives a signal as described above. Accordingly, all or some of the communication unit 310 may be referred to as a "transmitter", a "receiver", or a "transceiver". In the following description, transmission and reception performed through a radio channel are used to have a meaning including the processing performed by the communication unit 310. In some embodiments, the communication unit 310 may perform functions for transmitting and receiving a signal through wired communication.

The storage unit 320 stores a basic program for the operation of the UE, an application program, and data such as configuration information. The storage unit 320 may include a volatile memory, a non-volatile memory, or a combination of the volatile memory and the non-volatile memory. The storage unit 320 provides stored data according to a request from the controller 330.

The controller 330 may control general operations of the UE. For example, the controller 330 transmits and receives a signal through the communication unit 310. The controller 330 records data in the storage unit 320 and read the same. The controller 330 may perform functions of a protocol stack required by the communication standard. To this end, the controller 330 may include at least one processor, microprocessor, or may be a part of the processor. Further, the part of the communication unit 310 or the controller 330 may be referred to as a communication processor (CP).

According to an embodiment, the controller 330 may transmit and receive control information to and from the BS 110. For example, the controller 330 may control the UE to perform operations according to an embodiment described below.

Figure 4A:
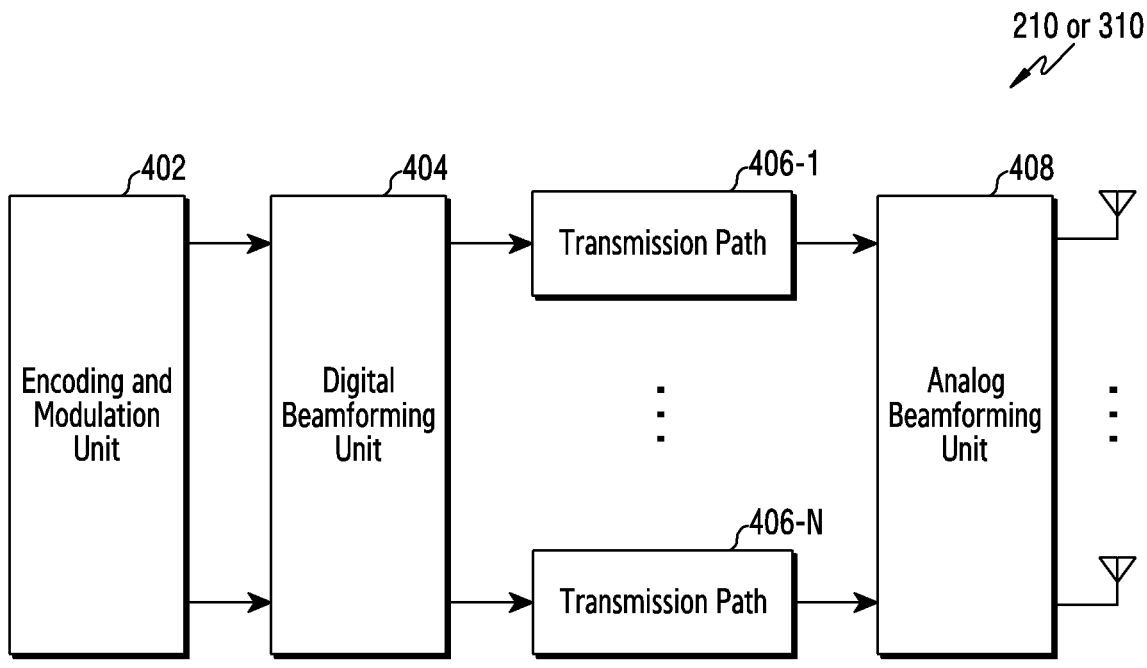
FIG. 4A illustrates a configuration of a communication unit in a wireless communication system according to an embodiment of the disclosure.
Figure 4B:
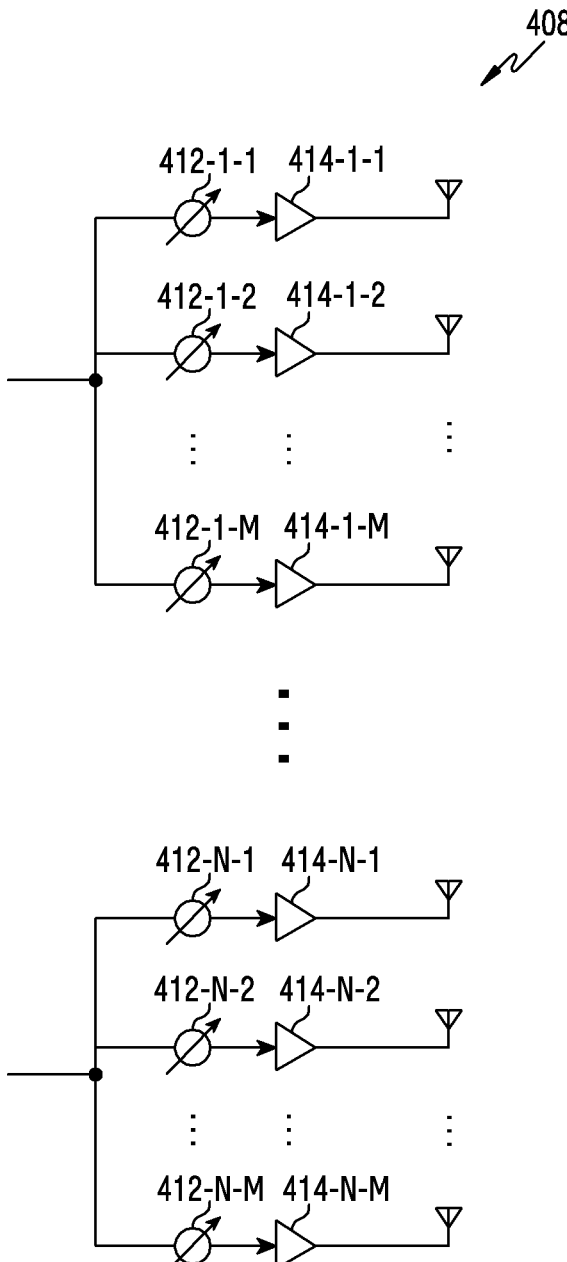
FIG. 4B illustrates an example of a configuration of an analog beamforming unit of the communication unit in the wireless communication unit according to an embodiment of the disclosure.
Figure 4C:
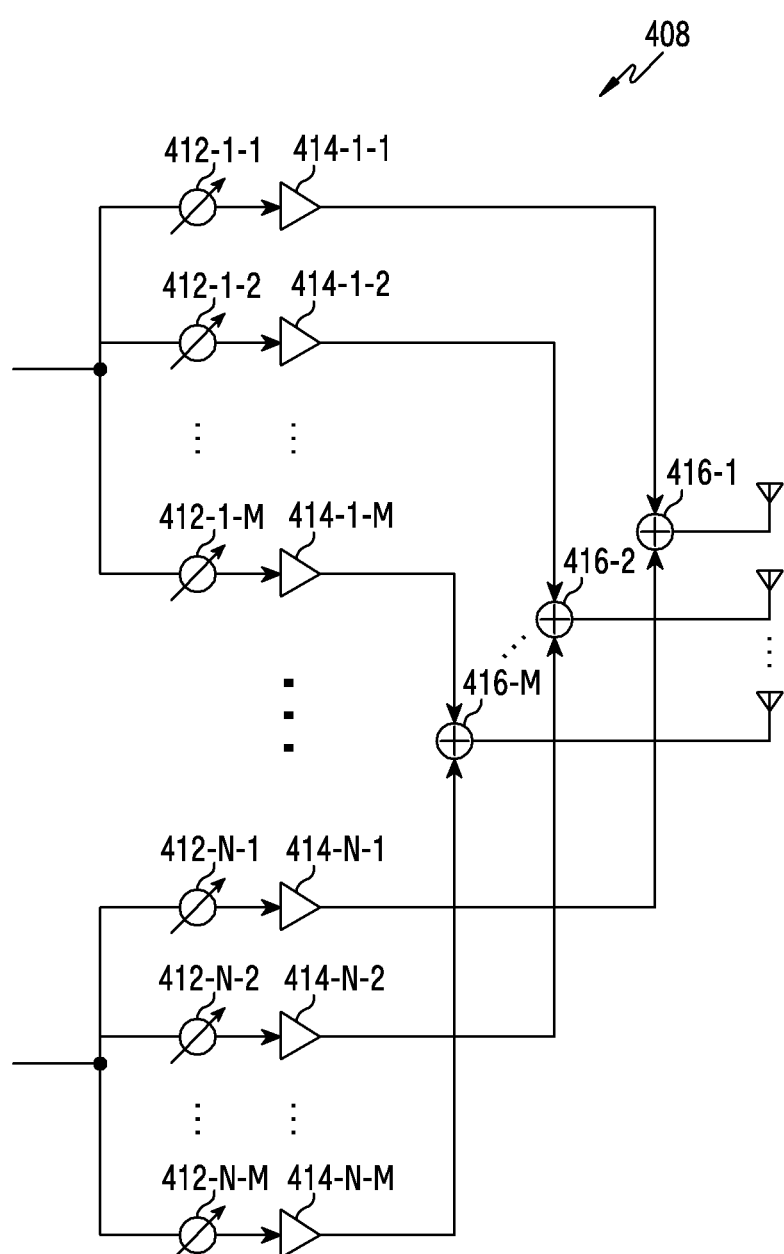
FIG. 4C illustrates another example of the configuration of the analog beamforming unit of the communication unit in the wireless communication unit according to an embodiment of the disclosure.

FIGS. 4A to 4C illustrate a configuration of a communication unit in a wireless communication system according to an embodiment of the disclosure. FIGS. 4A to 4C illustrate the detailed configuration of the wireless communication unit 210 of FIG. 2 or the communication unit 310 of FIG. 3. Specifically, FIGS. 4A to 4C illustrate elements for performing beamforming as the part of the wireless communication unit 210 of FIG. 2 or the communication unit 310 of FIG. 3.

Referring to FIG. 4A, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For the channel encoding, at least one of low-density parity check (LDPC) code, convolution code, and polar code may be used. The encoding and modulation unit 402 generates modulation symbols by performing constellation mapping.

The digital beamforming unit 404 performs beamforming for a digital signal (for example, modulation symbols). To this end, the digital beamforming unit 404 multiplies beamforming weighted values by modulation symbols. The beamforming weighted values may be used for changing the magnitude and phase of the signal, and may be referred to as a "precoding matrix" or a "precoder". The digital beamforming unit 404 outputs digitally beamformed modulation symbols through the plurality of transmission paths 406-1 to 406-N. At this time, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculator, a cyclic prefix (CP) inserter, a DAC, and an up-converter. The CP inserter is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provide independent signal-processing processes for a plurality of streams generated through the digital beamforming. However, depending on an implementation scheme, some of the elements of the plurality of transmission paths 406-1 to 406-N may be used in common.

The analog beamforming unit 408 performs beamforming on an analog signal. To this end, the digital beamforming unit 404 multiplies beamforming weighted values by analog signals. The beamformed weighted values are used to change the magnitude and phase of the signal. More specifically, the analog beamforming unit 408 may be configured as illustrated in FIG. 4B or 4C according to the connection structure between the plurality of transmission paths 406-1 to 406-N and the antennas.

Referring to FIG. 4B, signals input into the analog beamforming unit 408 may be transmitted through the antennas via phase/size conversion and amplification operation. At this time, the signals in respective paths are transmitted through different antenna sets, that is, antenna arrays. In processing of signals input through a first path, the signals are converted into signal sequences having the same or different phase/size by phase/size conversion units 412-1-1 to 412-1-M, amplified by amplifiers 414-1-1 to 414-1-M, and transmitted through antennas.

Referring to FIG. 4C, the signals input into the analog beamforming unit 408 are transmitted through the antennas via phase/size conversion and amplification operation. At this time, the signals in respective paths are transmitted through the same antenna set, that is, the antenna array. In the processing of signals input through a first path, the signals are converted into signal sequences having the same or different phases/sizes by the phase/size conversion units 412-1-1 to 412-1-M, and are amplified by the amplifiers 414-1-1 to 414-1-M. The signals amplified to be transmitted through one antenna array are added by adders 416-1-1 to 416-1-M on the basis of antenna elements and then transmitted through antennas.

FIG. 4B illustrates an example in which an independent antenna array is used for each transmission path, and FIG. 4C illustrates an example in which transmission paths share one antenna array. Further, according to another embodiment, some transmission paths may use independent antenna arrays, and the remaining transmission paths may share one antenna array. Further, according to another embodiment, a structure that may adaptively vary depending on the situation may be used by applying a switchable structure between transmission paths and antenna arrays.

In a long-term evolution (LTE) system which is a representative example of a broadband wireless communication system, the downlink adopts an orthogonal frequency division multiplexing (OFDM) scheme (or referred to as a cyclic prefix (CP) OFDM scheme), and the uplink adopts a single carrier frequency division multiple access (SC-FDMA) scheme (or referred to as a discrete Fourier transform (DFT)-spreading (S) OFDM scheme). In a new radio (NR) system of the 3GPP, the downlink adopts a CP-OFDM scheme, and the uplink adopts a DFT-S-OFDM scheme and a CP-OFDM scheme. In such a multi-access scheme, data or control information are distinguished for each user by allocating and operating the data or the control information such that time-frequency resources for transmitting the data or the control information do not overlap for each user, that is, orthogonality is established.

Figure 5:
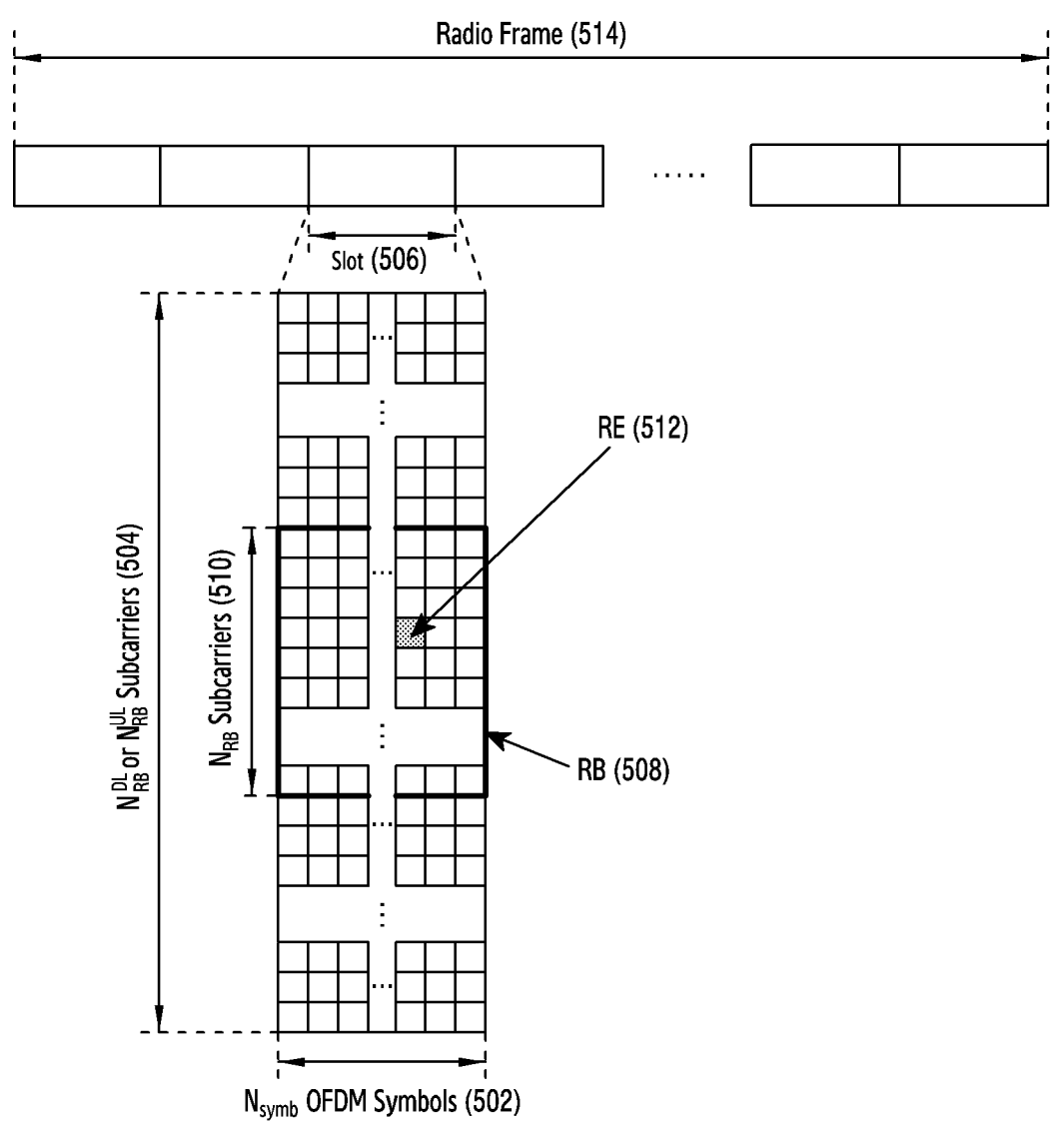
FIG. 5 illustrates the structure of resources in a time-frequency domain in the wireless communication system according to an embodiment of the disclosure.

FIG. 5 illustrates a resource structure of a time-frequency domain in a wireless communication system according to an embodiment of the disclosure. FIG. 5 illustrates a basic structure of the time-frequency domain which is a radio resource area in which data or a control channel is transmitted in the downlink or the uplink.

In FIG. 5, the horizontal axis indicates a time domain and the vertical axis indicates a frequency domain. The minimum transmission unit in the time domain is an OFDM symbol, and $N_{symb}$ OFDM symbols 502 are one slot 506. A length of a subframe is defined as 1.0 ms and a length of a radio frame 514 is defined as 10 ms. In the frequency domain, the minimum transmission unit is a subcarrier, and a bandwidth of the entire system transmission band includes a total of $N_{BW}$ subcarriers 504. Detailed values of $N_{symb}$ and $N_{BW}$ may be variably applied depending on a system.

A basic unit of resources in the time-frequency domains is a resource element (RE) 512 and may be indicated by an OFDM symbol index and a subcarrier index. In the LTE system, a resource block (RB) (or a physical resource block (PRB)) 508 may be defined by $N_{symb}$ successive OFDM symbols 502 in the time domain and $N_{RB}$ successive subcarriers 510 in the frequency domain. Accordingly, one RB

508 includes $N_{symb} \times N_{RB}$ Res 512. In general, the minimum transmission unit of data is an RB. In the NR system, one RB is defined as $N_{RB}$ successive subcarriers 510 in the frequency domain. In the NR system, when subcarrier spacing (SCS) is 15 kHz (that is, $\mu=0$), $N_{symb}=14$, $N_{RB}=12$, and $N_{BW}$ and $N_{RB}$ are proportional to the bandwidth of the system transmission band. A data transmission rate may increase in proportion to the number of RBs scheduled to the UE. In the case of a frequency division duplex (FDD) system of operating the downlink and the uplink divided by the frequency, a downlink transmission bandwidth and an uplink transmission bandwidth may be different from each other. A channel bandwidth refers to a radio frequency (RF) bandwidth corresponding to the system transmission bandwidth. [Table 1] and [Table 2] show some of the corresponding relation of a system transmission bandwidth, subcarrier spacing (SCS), and a channel bandwidth defined in the NR system in a frequency band (or FR1 of the NR system) lower than a reference value (for example, 6 GHz) and a frequency band (or FR2 of the NR system) higher than a reference value (for example, 24.25 GHz). For example, the NR system having a channel bandwidth of 100 kHz with subcarrier spacing of 30 kHz includes a transmission bandwidth of 273 RBs. In [Table 1] and [Table 2], N/A may be a bandwidth-subcarrier combination which is not supported by the NR system.

TABLE 1

| | | Channel bandwidth [MHz] | | | | | |
|---|---|---|---|---|---|---|---|
| | SCS | 5 | 10 | 20 | 50 | 80 | 100 |
| Transmission bandwidth configuration ($N_{RB}$) | 15 kHz | 25 | 52 | 106 | 207 | N/A | N/A |
| | 30 kHz | 11 | 24 | 51 | 133 | 217 | 273 |
| | 60 kHz | N/A | 11 | 24 | 65 | 107 | 135 |

TABLE 2

| | | Channel bandwidth [MHz] | | | |
|---|---|---|---|---|---|
| | SCS | 50 | 100 | 200 | 400 |
| Transmission bandwidth configuration ($N_{RB}$) | 60 kHz | 66 | 132 | 264 | N/A |
| | 120 kHz | 32 | 66 | 132 | 264 |

In the NR system, the scheduling information of downlink data or uplink data is transmitted from the BS to the UE through downlink control information (DCI). The DCI is defined in various formats. Each format may indicate whether the DCI is an uplink grant which is scheduling information for uplink data or a downlink grant which is scheduling information for downlink data, whether the DCI is compact DCI having small size control information, whether the DCI applies spatial multiplexing using multiple antennas, and whether the DCI is DCI for controlling power. For example, DCI format 1-1 which is scheduling control information for downlink data may include at least one of the items shown in [Table 3] below.

TABLE 3

| Item | Description |
|---|---|
| Carrier indicator | Indicates a frequency carrier for transmission |
| DCI format indicator | Indicator indicating whether the corresponding DCI is for downlink or uplink |
| Bandwidth part (BWP) indicator | Indicates a BWP for transmission |
| Frequency domain resource allocation | Indicates RBs in the frequency domain allocated to data transmission. Expressed resources are determined according to a system bandwidth and a resource allocation scheme. |
| Time domain resource allocation | Indicates a slot and an OFDM symbol of the slot for transmitting a data-related channel |
| VRB-to-PRB mapping | Indicates a scheme for mapping a virtual RB (VRB) index and a physical RB (PRB) index |
| MCS (modulation and coding scheme) | Indicates a modulation scheme and a coding rate used for data transmission. That is, it may indicate a coding rate value for informing of TBS and channel coding information as well as information on QPSK, 16 QAM, 64 QAM, or 256 QAM. |
| Code block group (CBG) transmission information | Indicates a transmitted CBG when CBG retransmission is configured |
| HARQ process number | Indicates an HARQ process number |
| NDI (new data indicator) | Indicates HARQ initial transmission or retransmission |
| RV (redundancy version) | Indicates a redundancy version of HARQ |
| Transmit power control command (TPC) for a physical uplink control channel (PUCCH) | Indicates a transmit power control command for a PUCCH which is an uplink control channel |

In [Table 3], in the case of physical uplink shared channel (PUSCH) transmission, time domain resource assignment may be indicated by information on a slot in which the PDSCH is transmitted, a start symbol location S in the corresponding slot, and the number L of symbols to which the PDSCH is mapped. S may be a relative location from start of the slot, L may be the number of successive symbols, and S and L may be determined on the basis of a start and length indicator value (SLIV) defined below.

```
if (L−1)≤7 then
    SLIV=14·(L−1)+S
else
    SLIV=14·(14−L+11)+(14−1−S)
where 0<L≤14−S
```

In the NR system, in general, information on the corresponding relation between an SLIV value, a PDSCH or physical uplink shared channel (PUSCH) mapping type, and information on a slot in which a PDSCH or a PUSCH is transmitted may be set or configured in one row through a radio resource control (RRC) configuration. Thereafter, in the time domain resource assignment of the DCI, the BS may transmit information on the SLIV value, the PDSCH or PUSCH mapping type, and the slot in which the PDSCH or the PUSCH is transmitted by indicating an index value defined by the configured corresponding relation.

In the case of the NR system, the PDSCH or PUSCH mapping type is defined as a type A or a type B. In the case of the PDSCH or PUSCH mapping type A, a demodulation reference signal (DMRS) symbol starts at a second or a third OFDM symbol in the slot. In the case of the PDSCH or PUSCH mapping type B, the DMRS symbol starts at a first OFDM symbol of time domain resources allocated by PUSCH transmission.

The DCI may be transmitted through a physical downlink control channel (PDCCH) which is a downlink control channel via channel coding and modulation. The PDCCH may be used to refer to control information itself rather than the channel. In general, the DCI is scrambled using a particular radio network temporary identifier (RNTI) or a UE identifier, independently for each UE, a cyclic redundancy check (CRC) bit is added thereto, and then channel coding is performed, whereby each independent PDCCH is configured and transmitted. The PDCCH is mapped to a control resource set (CORESET) configured in the UE.

Downlink data may be transmitted through a PDSCH which is a physical channel for downlink data transmission. The PDSCH may be transmitted after the control channel transmission interval, and scheduling information such as the detailed mapping location in the frequency domain and the modulation scheme is indicated by the DCI transmitted through the PDCCH. Via an MCS in the control information included in the DCI, the BS informs the UE of the modulation scheme and the target coding rate applied to the PDSCH to be transmitted and the size (transport block size (TBS)) of data to be transmitted. In an embodiment, the MCS may include 5 bits or bits larger or smaller than the bits. The TBS corresponds to the size before channel coding for error correction is applied to a transport block (TB) which is data to be transmitted by the BS.

In the disclosure, the transport block (TB) may include a medium access control (MAC) header, a MAC control element (CE), one or more MAC service data units (SDUs), and padding bits. Alternatively, the TB may indicate the unit of data from the MAC layer to the physical layer or a MAC protocol data unit (PDU).

Modulation schemes supported by the NR system are quadrature phase shift keying (QPSK), 16 quadrature amplitude modulation (QAM), 64 QAM, and 256 QAM, and the modulation order (Qm) thereof corresponds to 2, 4, 6, or 8. That is, 2 bits may be transmitted per symbol in the case of QPSK, 4 bits may be transmitted per symbol in the case of 16 QAM, 6 bits may be transmitted per symbol in the case of 64 QAM, and 8 bits may be transmitted per symbol in the case of 256 QAM, and when 1024 QAM is supported, 10 bits may be mapped and transmitted per symbol of 1024 QAM.

15

Figure 6A:
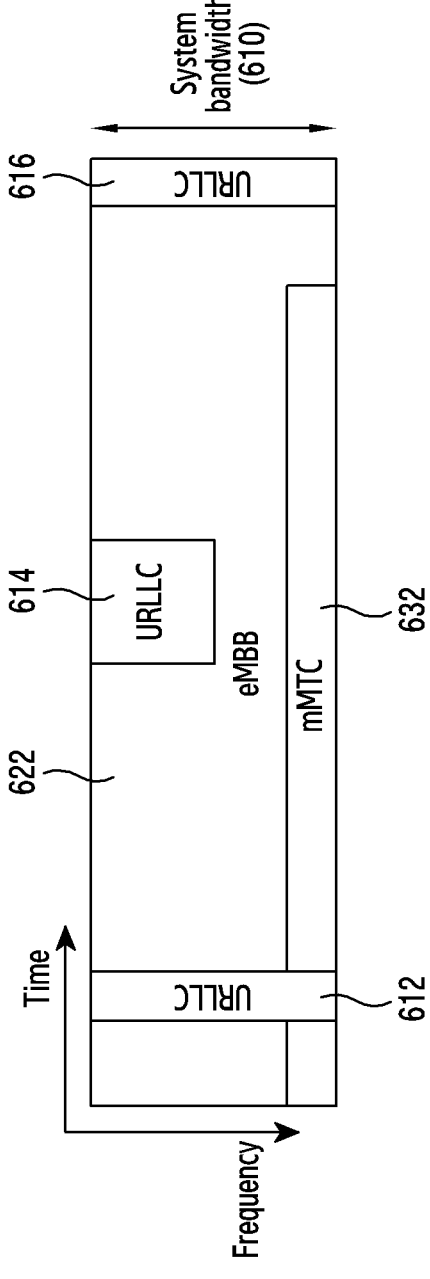
FIG. 6A illustrates an example of allocation of data for each service to frequency-time resources in a wireless communication system according to an embodiment of the disclosure.
Figure 6B:
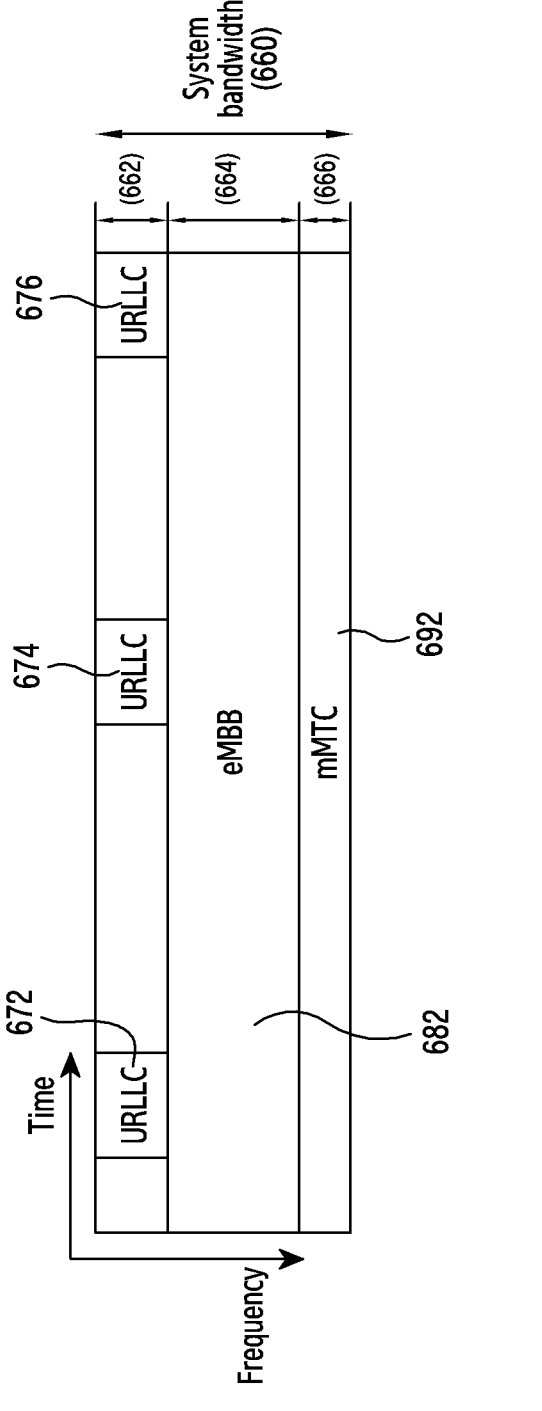
FIG. 6B illustrates another example of allocation of data for each service to frequency-time resources in a wireless communication system according to an embodiment of the disclosure.

In an aspect of service, the NR system may be designed such that various services are freely multiplexed in time and frequency resources, and accordingly waveform/numerology, reference signals, and the like may be dynamically or freely controlled as necessary. In order to provide an optimal service to the UE in wireless communication, optimized data transmission through measurement of a channel quality and an amount of interference is important, and thus it is necessary to accurately measure a channel state. However, unlike 4G communication in which channel and interference characteristics are not largely changed according to frequency resources, channel and interference characteristics are largely changed according to a service in the case of a 5G channel, so that supporting a subset of frequency resource groups (FRGs) for performing measurement according to divided channel and interference characteristics is needed. Meanwhile, in the NR system, supported service types may be divided into enhanced mobile broadband (eMBB), massive machine type communications (mMTC), and ultra-reliable and low-latency communications (URLLC). eMBB is a service aiming at high-speed transmission of high-capacity data, mMTC is a service aiming at minimization of UE power and access of a plurality of UEs, and URLLC is a service aiming at high reliability and low latency. Different requirements may be applied according to the type of service applied to the UE. Examples of resource distribution of respective services are illustrated in FIGS. 6A and 6B below. Referring to FIGS. 6A and 6B, a scheme of allocating frequency and time resources to transmit information in each system is identified.

FIG. 6A illustrates an example of allocation of data for each service to frequency-time resources in a wireless communication system according to an embodiment of the disclosure.

Referring to FIG. 6A, in an entire system frequency band 610, resources are allocated for eMBB 622, URLLC 612, 614, and 616, and mMTC 632. When data of the URLLC 612, 614, and 616 is generated while data of the eMBB 622 and data of the mMTC 632 are allocated and transmitted in a specific frequency band, parts already allocated for the eMBB 622 and the mMTC 632 may be emptied or the data of the URLLC 612, 614, and 616 may be transmitted without transmission of the data of the eMBB 622 and the mMTC 632. Since the URLLC requires a reduction in the delay time, resources for transmitting the data of the URLLC 612, 614, and 616 may be allocated to a part of the resources allocated to the eMBB 622. Of course, when the URLLC 612, 614, and 616 are additionally allocated and transmitted in resources to which the eMBB 622 is allocated, the data of the eMBB 622 may not be transmitted in duplicate frequency-time resources, and accordingly, the transmission performance of the data of the eMBB 622 may be reduced. That is, in this case, transmission of the data of the eMBB 622 may fail due to allocation of the resources for the URLLC 612, 614, and 616. The scheme illustrated in FIG. 6A may be referred to as a preemption scheme.

FIG. 6B illustrates another example of allocation of data for each service to frequency-time resources in a wireless communication system according to an embodiment of the disclosure.

FIG. 6B illustrates an example of providing respective services in subbands 662, 664, and 666 divided from an entire system frequency band 660. Specifically, the subband 662 is used for transmission of the data of the URLLC 672, 674, and 576, the subband 664 is used for transmission of the data of the eMBB 682, and the subband 666 is used for transmission of the data of the mMTC 692. Information related to a configuration of the subbands 662, 664, and 666 may be predetermined, and the information may be transmitted from the BS to the UE through higher signaling. Alternatively, without separate transmission of the configuration information of the subbands to the UE, the information related to the subbands 662, 664, and 666 may be randomly divided by the BS or a network node to provide services.

According to an embodiment, the length of a transmission time interval (TTI) used for URLLC transmission may be shorter than the length of a TTI used for eMBB or mMTC transmission. Further, a response of information related to the URLLC may be transmitted earlier than that of the eMBB or the mMTC, and thus the UE using the URLLC service may transmit and receive information with a lower delay. The three services or structures of physical layer channels used for respective types for transmitting data may be different from each other. For example, at least one of the length of the TTI, an allocation unit of frequency resources, the structure of a control channel, and a data mapping method may be different. Although the three services and the three data types have been described above, more types of services and data types corresponding thereto may exist. In this case, various embodiments described below may be implemented.

Figure 6C:
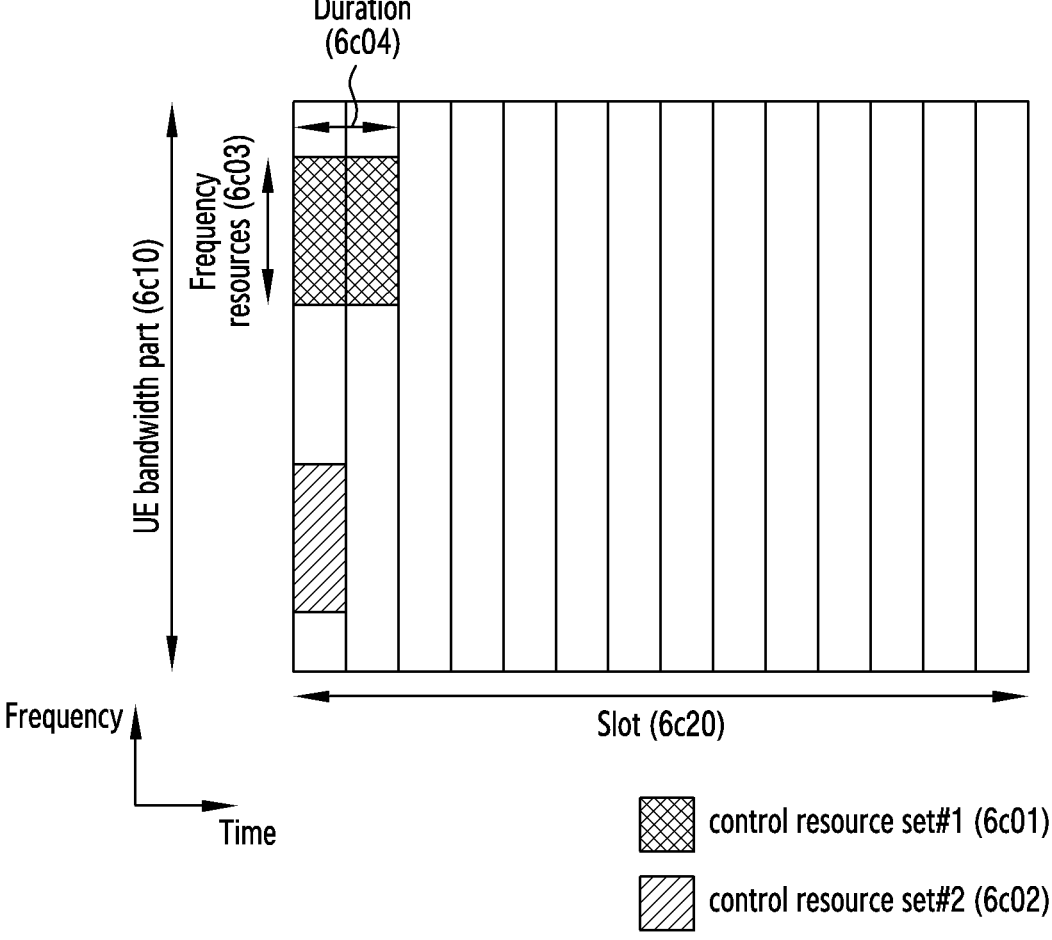
FIG. 6C illustrates an example of a control resource set (CORESET) in which a downlink control channel is transmitted in the wireless communication system according to an embodiment of the disclosure.

FIG. 6C illustrates an example of a control resource set (CORESET) in which a downlink control channel is transmitted in a wireless communication system according to an embodiment of the disclosure. FIG. 6C illustrates an example in which a UE bandwidth part 6c10 is configured in a frequency axis and two CORESETs (CORESET #1 6c01 and CORESET #2 6c02) are configured within one slot 6c20 in a time axis. The control resource sets 6c01 and 6c02 may be configured in a specific frequency resource 6c03 within the entire UE bandwidth part 6c10 in the frequency axis. One or a plurality of OFDM symbols may be configured in the time axis. The configured symbols may be defined as control resource set duration 6c04. Referring to the example illustrated in FIG. 6C, CORESET #1 6c01 may be configured as CORESET duration of two symbols, and CORESET #2 6c02 may be configured as CORESET duration of one symbol.

The CORESETs may be configured in the UE by the BS through higher-layer signaling (for example, system information, a master information block (MIB), or radio resource control (RRC) signaling). Configuring the CORESET in the UE may mean providing information such as an identity of the CORESET, a frequency location of the CORESET, a symbol length of the CORESET, and the like. For example, information provided to configure the CORESET is described below.

```
ControlResourceSet ::=        SEQUENCE {
    -- Corresponds to L1 parameter 'CORESET-ID'
    controlResourceSetId        ControlResourceSetId,
    frequencyDomainResources    BIT STRING (SIZE (45)),
    duration                    INTEGER (1..maxCoReSetDuration),
```

-continued

```
cce-REG-MappingType              CHOICE {
    interleaved                  SEQUENCE {
        reg-BundleSize               ENUMERATED {n2, n3, n6},
        precoderGranularity          ENUMERATED {sameAsREG-bundle,
allContiguousRBs},
        interleaverSize              ENUMERATED {n2, n3, n6}
        shiftIndex
    INTEGER(0..maxNrofPhysicalResourceBlooks-1)
    OPTIONAL
    },
    nonInterleaved               NULL
    },
    tci-StatesPDCCH              SEQUENCE(SIZE (1..maxNrofTCI-StatesPDCCH))
OF TCI-StateId                   OPTIONAL,
    tci-PresentInDCI             ENUMERATED
{enabled}                            OPTIONAL, -- Need S
}
```

In 5G (for example, NR of the 3GPP), the CORESET may include $N_{RB}^{CORESET}$ RBs in the frequency domain, and include $N_{symb}^{CORESET} \in \{1,2,3\}$ symbols in the time axis. One CCE may include six REGs, and the REG may be defined as one RB during one OFDM symbol. In REGs in one CORESET, REG indexes, starting at REG index 0, may be assigned in a time-first order from the lowest RB in a first OFDM symbol of the CORESET.

In 5G (for example, NR of the 3GPP), an interleaved scheme and a non-interleaved scheme are supported by a PDCCH transmission method. The BS may configure whether to perform interleaving or non-interleaving transmission for each CORESET in the UE through higher-layer signaling. Interleaving may be performed in units of REG bundles. The REG bundle may be defined as a set of one or a plurality of REGs. The UE may determine a CCE-to-REG mapping scheme in the corresponding control resource set as the following method on the basis of the information indicating whether to perform interleaving or non-interleaving transmission configured by the BS.

Figure 6D:
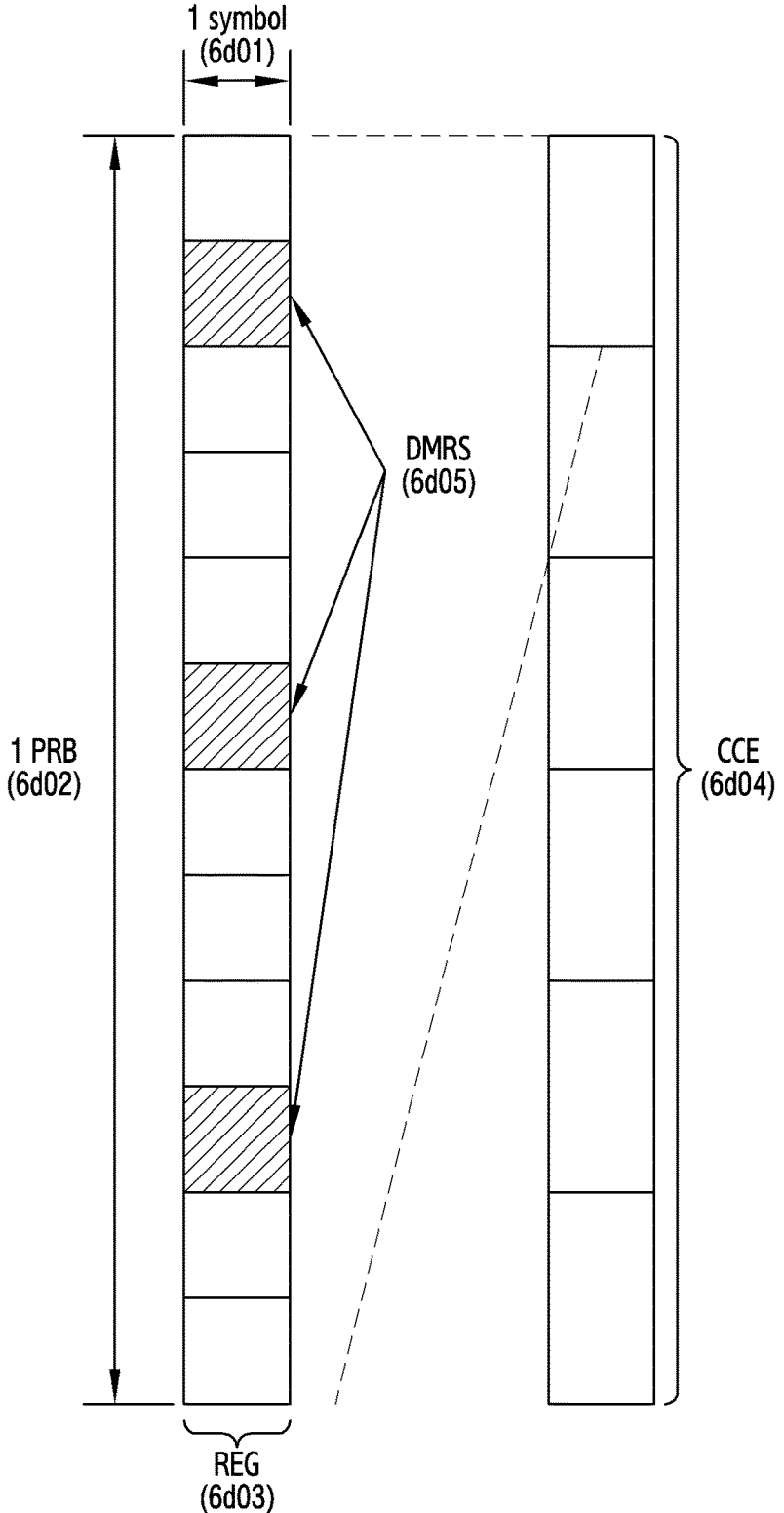
FIG. 6D illustrates an example including all of resource elements (REs) in which downlink control information (DCI) is mapped to a resource element group (REG) which is the basic unit of the downlink control channel and areas to which demodulation reference signals corresponding reference signals for decoding the REs are mapped according to an embodiment of the disclosure.

FIG. 6D illustrates an example including all of resource elements (REs) in which downlink control information (DCI) is mapped to a resource element group (REG) which is the basic unit of the downlink control channel and areas to which demodulation reference signals corresponding reference signals for decoding the REs are mapped according to an embodiment of the disclosure. The basic unit of the downlink control channel illustrated in FIG. 6D, that is, the REG 6d03, may include all of REs to which the DCI is mapped and the areas to which the DMRSs 6d05 corresponding to reference signals for decoding the REs, are mapped. As illustrated in FIG. 6D, three DMRSs 6d05 may be transmitted within one REG 6d03. The number of CCEs required to transmit the PDCCH may be 1, 2, 4, 8, or 16 according to the aggregation level (AL), and the different numbers of CCEs may be used to implement link adaptation of the downlink control channel. For example, if AL=L, one downlink control channel may be transmitted through L CCEs. The UE is required to detect a signal in the state in which the UE is not aware of information on the downlink control channel, and a search space indicating a set of CCEs is defined for blind decoding. The search space is a set of downlink control channel candidates including CCEs for which the UE should attempt decoding at the given aggregation level, and the UE may have a plurality of search spaces since there are several aggregation levels at which a group of CCEs is configured by 1, 2, 4, 8, or 16 CCEs. The search space set may be defined as a set of search spaces at all of the configured aggregation levels.

The search space is divided into a UE-specific search space and a common search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for a common search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined by a UE identity and a function of various system parameters.

In 5G (for example, NR of the 3GPP), parameters for the PDCCH search space may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type (a common search space or a UE-specific search space), a combination of a DCI format and an RNTI to be monitored in the corresponding search space, a CORESET index for monitoring the search space, and the like. For example, parameters for the PDCCH search space may include the following information.

```
SearchSpace ::=                              SEQUENCE {
    -- Identity of the search space. SearchSpaceId = 0 identifies the SearchSpace configured via PBCH
    (MIB) or ServingCellConfigCommon.
    searchSpaceId                                SearchSpaceId,
    controlResourceSetId                         ControlResourceSetId,
    monitoringSlotPeriodicityAndOffset           CHOICE {
        sl1                                          NULL,
```

-continued

```
        sl2                                     INTEGER (0..1),
        sl4                                     INTEGER (0..3),
        sl5                                     INTEGER (0..4),
        sl8                                     INTEGER (0..7),
        sl10                                    INTEGER (0..9),
        sl16                                    INTEGER (0..15),
        sl20                                    INTEGER (0..19),
        sl40                                    INTEGER (0..39),
        sl80                            INTEGER (0..79),
        sl160                           INTEGER (0..159),
        sl320                           INTEGER (0..319),
        sl640                           INTEGER (0..639),
        sl1280                          INTEGER (0..1279),
        sl2560                          INTEGER (0..2559)
    }
                                        OPTIONAL,
    duration                        INTEGER (2..2559)
    monitoringSymbolsWithinSlot                 BIT STRING (SIZE
(14))                                           OPTIONAL,
        nrofCandidates                          SEQUENCE {
            aggregationLevel1                   ENUMERATED {n0, n1, n2, n3, n4, n5, n6, n8},
            aggregationLevel2                   ENUMERATED {n0, n1, n2, n3, n4, n5, n6, n8},
            aggregationLevel4                   ENUMERATED {n0, n1, n2, n3, n4, n5, n6, n8},
            aggregationLevel8                   ENUMERATED {n0, n1, n2, n3, n4, n5, n6, n8},
            aggregationLevel16                  ENUMERATED {n0, n1, n2, n3, n4, n5, n6, n8}
        },
        searchSpaceType                         CHOICE {
        -- Configures this search space as common search space (CSS) and DCI formats to monitor.
            common                              SEQUENCE {
    }
            ue-Specific                         SEQUENCE {
                -- Indicates whether the UE monitors in this USS for DCI formats 0-0 and 1-0 or for
formats 0-1 and 1-1.
                formats                         ENUMERATED {formats0-0-And-1-0,
formats0-1-And-1-1},
                ...
        }
    }
```

The BS may configure one or a plurality of search space sets in the UE according to configuration information. According to an embodiment, the BS may configure search space set 1 and search space set 2 in the UE. The UE may be configured to monitor a DCI format A scrambled by an X-RNTI in the common search space in search space set 1 and configured to monitor a DCI format B scrambled with a Y-RNTI in the UE-specific search space in search space set 2.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI DCI format 2_4 with CRC scrambled by CI-RNTI DCI format 2_5 with CRC scrambled by AI-RNTI DCI format 2_6 with CRC scrambled by PS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The described RNTIs may follow the following definition and use.

Cell RNTI (C-RNTI): used for scheduling UE-specific PDSCH

Temporary cell RNTI (TC-RNTI): used for scheduling UE-specific PDSCH

Configured scheduling RNTI (CS-RNTI): used for semi-statically configured UE-specific PDSCH scheduling Random access RNTI (RA-RNTI): used for PDSCH scheduling at random access stage Paging RNTI (P-RNTI): used for PDSCH scheduling through which paging is transmitted System information RNTI (SI-RNTI): used for PDSCH scheduling through which system information is transmitted Interruption (INT)-RNTI: used for indicating whether puncturing is performed for PDSCH Transmit power control for (TPC)-PUSCH-RNTI: used for indicating PUSCH power control command Transmit power control for (TPC)-PUCCH RNTI: used for indicating PUCCH power control command Transmit power control for (TPC)-SRS RNTI: used for indicating SRS power control command Cancellation indicator (CI)-RNTI: used for indicating cancellation of PUSCH transmission Availability indicator (AI)-RNTI: used for indicating whether soft resources can be used Power saving (PS)-RNTI: used for indicating power consumption reduction command in DRX inactive interval The DCI formats may follow the definition in [Table 4] below.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |

In 5G, a search space at an aggregation level L in a search space set s in a CORESET p may be expressed as shown in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + N_{CI} \right) \bmod \lfloor N_{CCE,p}/L \rfloor \right\} + i \qquad \text{[EQN. 1]}$$

L: aggregation level $n_{CI}$: carrier index $N_{CCE,p}$: total number of CCEs existing within control resource set p $n_{s,f}^\mu$: slot index $M_{p,s,max}^{(L)}$: number of PDCCH candidates at aggregation level L $m_{snCI}=0, \ldots, M_{p,s,max}^{(L)}-1$: PDCCH candidate index at aggregation level L $i=0, \ldots, L-1$ $$Y_{p,n_{s,f}^\mu} = \left( A_p \cdot Y_{p,n_{s,f}^\mu -1} \right) \bmod D, \; Y_{p,-1} = n_{RNTI} \neq 0, \; A_0 = 39827, \; A_1 = 29829,$$

$A_2 = 39839, \; D = 65537$ nRNTI: UE identifier

A value of $Y\_(p, n_{s,f}^\mu)$ may correspond to 0 in the case of the common search space.

A value of $Y\_(p, n_{s,f}^\mu)$ may correspond to a value varying depending on a UE identity (a C-RNTI or an ID configured in the UE by the BS) and a time index in the case of the UE-specific search space.

Hereinafter, a method of allocating time domain resources for a data channel in a 5G communication system is described.

The BS may configure a table for time domain resource allocation information for a downlink data channel (physical downlink shared channel (PDSCH)) and an uplink data channel (physical uplink shared channel (PUSCH)) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include, for example, PDCCH-to-PDSCH slot timing (corresponding to a time interval in units of slots between a time point at which a PDCCH is received and a time point at which a PDSCH scheduled by the received PDCCH is transmitted, and indicated by K0) or PDCCH-to-PUSCH slot timing (corresponding to a time interval in units of slots between a time point at which a PDCCH is received and a time point at which a PUSCH scheduled by the received PDCCH is transmitted, and indicated by K2), information on a location and a length of a start symbol in which a PDSCH or a PUSCH is scheduled within the slot, a mapping type of a PDSCH or a PUSCH, and the like. For example, the following information may be notified to the UE by the BS.

---

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation PDSCH-TimeDomainResourceAllocation ::= SEQUENCE { k0                         INTEGER(0..32)          OPTIONAL, -- Need S mappingType                ENUMERATED {typeA, typeB}, startSymbolAndLength      INTEGER (0..127)

}

---

PUSCH-TimeDomainResourceAllocation information element

PUSCH-TimeDomainResourceAllocationList ::=   SEQUENCE (SIZE(1..maxNrofUL-Allocations)) OF PUSCH-TimeDomainResourceAllocation PUSCH-TimeDomainResourceAllocation ::= SEQUENCE { k2                INTEGER(0..32)     OPTIONAL, -- Need S mappingType          ENUMERATED {typeA, typeB}, startSymbolAndLength    INTEGER (0..127)

}

The BS may inform the UE of one of the entries in the table for the time domain resource allocation information through L1 signaling (for example, DCI) (for example, indicated through a 'time domain resource allocation' field within DCI). The UE may acquire time domain resource allocation information for a PDSCH or a PUSCH on the basis of the DCI received from the BS.

Hereinafter, a method of allocating frequency domain resources for a data channel in a 5G communication system is described.

In 5G, two types, such as resource allocation type 0 and resource allocation type 1, are supported as a method of indicating frequency domain resource allocation information for a downlink data channel (physical downlink shared channel (PDSCH) and an uplink data channel (physical uplink shared channel (PUSCH)).

Resource Allocation Type 0

The BS may inform the UE of RB allocation information in the form of a bitmap for a resource block group (RBG). At this time, the RBG may include a set of successive virtual RBs (VRBs), and the size P of the RBG may be determined on the basis of a value configured as a higher-layer parameter (rbg-Size) and a value of the size of a BWP defined in [Table 5] below.

Nominal RBG Size P

TABLE 5

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

A total number $N_{REG}$ of RBGs of a BWP i having the size N BWP.isize may be defined as below.

$$\blacksquare \ N_{RBG} = \left\lceil \left( N_{BWP,i}^{size} + \left( N_{BWP,i}^{start} \bmod P \right) \right) / P \right\rceil,$$

where
the size of the first RBG is $$RBG_0^{size} = P - N_{BWP,i}^{start} \bmod P,$$

the size of last RBG is $$RBG_{last}^{start} = \left( N_{BWP,i}^{start} + N_{BWP,i}^{size} \right) \bmod P$$

if $$\left( N_{BWP,i}^{start} + N_{BWP,i}^{size} \right) \bmod P > 0 \text{ and } P$$

otherwise,
the size of all other RBGs is P.

Bits in a bitmap having the bit size of $N_{RBG}$ may correspond to respective RBGs. Indexes may be assigned to the RBGs in the order of increasing frequencies starting from the lowest frequency of the BWP. For $N_{RBG}$ RBGs within the BWP, RBGs from RBG #0 to RBG #($N_{REG}$−1) may be mapped to bits from the MSB to the LSB in the RBG bitmap. When a specific bit value within the bitmap is 1, the UE may determine that an RBG corresponding to the corresponding bit value is allocated. When a specific bit value within the bitmap is 0, the UE may determine that an RBG corresponding to the corresponding bit value is not allocated.

Resource Allocation Type 1

The BS may inform the UE of the RB allocation information through information on a start location and a length of successively allocated VRBs. At this time, interleaving or non-interleaving may be additionally applied to the successively allocated VRBs. A resource allocation field of resource allocation type 1 may include a resource indication value (RIV), and the RIV may include a start point ($RB_{start}$) of the VRB and a length ($L_{RBs}$) of successively allocated RBs. More specifically, the RIV within the BWP having the size of $N_{BWP}^{size}$ may be defined as below.

$$\begin{aligned}
&\text{if } (L_{RBs} - 1) \le \lfloor N_{BWP}^{size}/2 \rfloor \text{ then} \\
&RIV = N_{BWP}^{size}(L_{RBs} - 1) + RB_{start} \\
&\text{else} \\
&RIV = N_{BWP}^{size}(N_{BWP}^{size} - L_{RBs} + 1) + (N_{BWP}^{size} - 1 - RB_{start}) \\
&\text{where} L_{RBs} \ge 1 \text{ and shall not exceed } N_{size}^{BWP} - RB_{start}.
\end{aligned}$$

Hereinafter, a method of measuring and reporting a channel state in a 5G communication system is described in detail.

Channel state information (CSI) may include at least one of a channel quality indicator (channel quality information (CQI)), a precoding matrix index (precoding matric indicator (PMI)), a CSI-RS resource indicator (CRI), an SS/PBCH block resource indicator (SSBRI), a layer indicator (LI), a rank indicator (RI), and/or an L1-reference signal received power (RSRP). The BS may control time and frequency resources for CSI measurement and report of the UE.

For the CSI measurement and report, the UE may receive a configuration of setting information (CSI-ReportConfig) for N(≥1) CSI reports, setting information (CSI-ResourceConfig) for M(≥1) RS transmission resources, one or two trigger states (CSI-AperiodicTriggerStateList, CSI-SemiPersistentOnPUSCH-TriggerStateList) list information through higher-layer signaling.

For the CSI report setting (CSI-ReportConfig), each report setting CSI-ReportConfig is CSI resource setting CSI-ResourceConfig associated with the corresponding report setting and may be associated with one downlink (DL) BWP identified by a given higher-layer parameter BWP identifier (bwp-id). As a time domain report operation for each report setting CSI-ReportConfig, aperiodic, semi-persistent, and periodic schemes may be supported, and may be configured in the UE by the BS through reportConfigType parameters configured by a higher layer. The semi-persistent CSI reporting method supports 'PUCCH-based semi-persistent (semi-PersistentOnPUCCH) and 'PUSCH-based persistent (semiPersistentOnPUSCH)'. In the case of the periodic or semi-persistent CSI reporting method, the UE may receive a configuration of PUCCH or PUSCH resources for transmitting the CSI from the BS through higher-layer signaling. A period of PUCCH or PUSCH resources for transmitting the CSI and a slot offset may be given on the basis of numerology of an uplink (UL) BWP configured to transmit the CSI report. In the case of the aperiodic CSI reporting method, the UE may receive scheduling of PUSCH resources for transmitting the CSI from the BS through L1 signaling (DCI format 0_1).

For the CSI resource settings (CSI-ResourceConfig), each CSI resource setting CSI-ReportConfig may include S(≥1) CSI resource sets (configured as a higher-layer parameter csi-RS-ResourceSetList). The CSI resource set list may include a non-zero power (NZP) CSI-RS resource set and an SS/PBCH block set or include a CSI-interference measurement (CSI-IM) resource set. Each CSI resource setting may be located in a downlink (DL) BWP identified by a higher-layer parameter bwp-id, and the CSI resource setting may be connected to a CSI report setting in the same downlink BWP. The time domain operation of CSI-RS resources within the CSI resource settings may be configured as one of aperiodic, periodic, or semi-persistent from the higher-layer parameter resourceType. For the periodic or semi-persistent CSI resource settings, the number of CSI-RS resource sets may be limited to S=1, and the configured period and slot offset may be given on the basis of numerology of a downlink BWP identified by bwp-id. The UE may receive a configuration of one or more CSI resource settings for channel or interference measurement from the BS through higher-layer signaling, and may include, for example, the following CSI resources.

CSI-IM resources for interference measurement

NZP CSI-RS resources for interference measurement

NZP CSI-RS resources for channel measurement

For CSI-RS resource sets associated with resource setting in which higher-layer parameter resourceType is configured to be 'aperiodic', 'periodic', or 'semi-persistent', resource setting for a trigger state for CSI reporting setting in which reportType is configured to be 'aperiodic' and a channel or interference measurement for one or a plurality of component cells (CCs) may be configured through higher-layer parameter CSI-AperiodicTriggerStateList.

The aperiodic CSI report of the UE may use the PUSCH, the periodic CSI report may use the PUCCH, and the semi-persistent CSI report may use the PUCCH after being activated to the PUSCH or the MAC control element (MAC CE) when triggered or activated by DCI. As described above, the CSI resources setting may also be configured to be aperiodic, periodic, or semi-persistent. Combinations of CSI report settings and CSI resource configurations may be supported on the basis of [Table 6] below.

Triggering/Activation of CSI Reporting for the Possible CSI-RS Configurations.

TABLE 6

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |

TABLE 6-continued

| CSI-RS Configuration | Periodic CSI Reporting | Semi-Persistent CSI Reporting | Aperiodic CSI Reporting |
|---|---|---|---|
| Aperiodic CSI-RS | Not Supported | Not Supported | Triggered by DCI; additionally, activation command [10, TS 38.321] possible as defined in Subclause 5.2.1.5.1. |

The aperiodic CSI reporting may be triggered by a "CSI request" field of DCI format 0_1 corresponding to scheduling DCI for the PUSCH. The UE may monitor the PDCCH, acquire DCI format 0_1, and acquire scheduling information for the PUSCH and a CSI request indicator. The CSI request indicator may be configured as NTS bits (=0, 1, 2, 3, 4, 5, or 6), and may be determined by higher-layer signaling (reportTriggerSize). Among one or a plurality of aperiodic CSI reporting trigger states which can be configured through high-layer signaling (CSI-AperiodicTriggerStateList), one trigger state may be triggered by the CSI request indicator.

When all bits in the CSI request field are 0, it may mean that the CSI reporting is not requested.

When the number (M) of CSI trigger states within the configured CSI-AperiodicTriggerStateList is larger than $2^{NTs}-1$, M CSI trigger states may be mapped to $2^{NTs}-1$ according to a predefined mapping relation, and one of $2^{NTs}-1$ trigger states may be indicated by the CSI request field.

When the number (M) of CSI trigger states within the configured CSI-AperiodicTriggerStateList is smaller than or equal to $2^{NTs}-1$, one of M CSI trigger states may be indicated by the CSI request field.

[Table 7] below shows an example for the relation between a CSI request indicator and a CSI trigger state which can be indicated by the corresponding indicator.

TABLE 7

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1 CSI resource#2 |
| 10 | CSI trigger state#2 | CSI report#3 | CSI resource#3 |
| 11 | CSI trigger state#3 | CSI report#4 | CSI resource#4 |

The UE may measure CSI resources within the CSI trigger state triggered by the CSI request field and generate the CSI (including one or more of the CQI, the PMI, the CRI, the SSBRI, the LI, the RI, or the L1-RSRP) on the basis thereof. The UE may transmit the acquired CSI by using a PUSCH scheduled by corresponding DCI format 0_1. When 1 bit corresponding to an uplink data indicator (UL-SCH indicator) within DCI format 0_1 indicates "1", uplink data (UL-SCH) and the acquired CSI may be multiplexed and transmitted through PUSCH resources scheduled by DCI format 0_1. When 1 bit corresponding to an uplink data indicator (UL-SCH indicator) within DCI format 0_1 indicates "0", only the CSI may be mapped and transmitted through PUSCH resources scheduled by DCI format 0_1 without uplink data (UL-SCH).

Figure 6E:
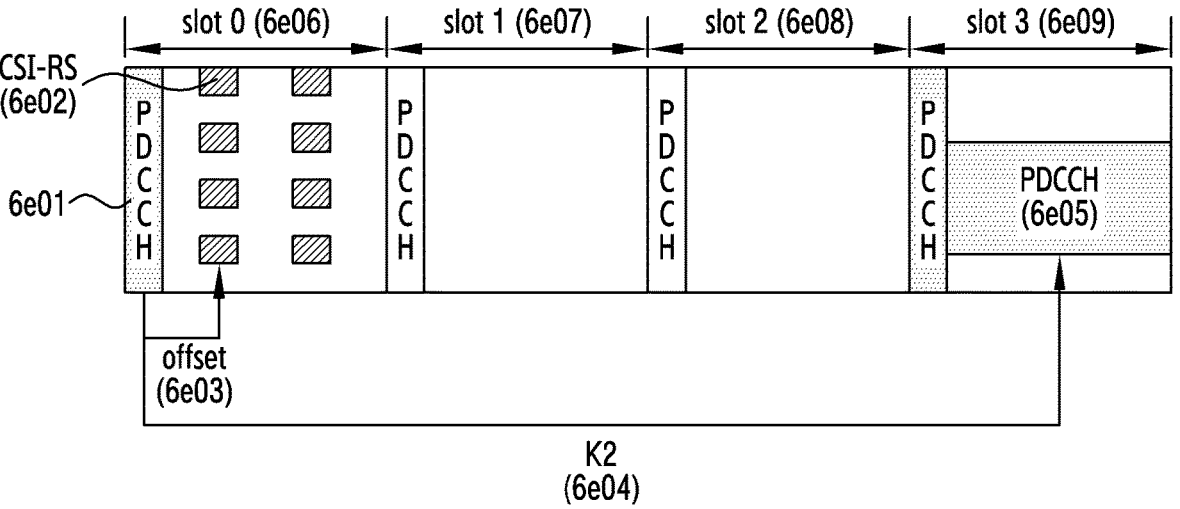
FIG. 6E illustrates an example of an aperiodic channel state information (CSI) reporting method according to an embodiment of the disclosure.
Figure 6F:
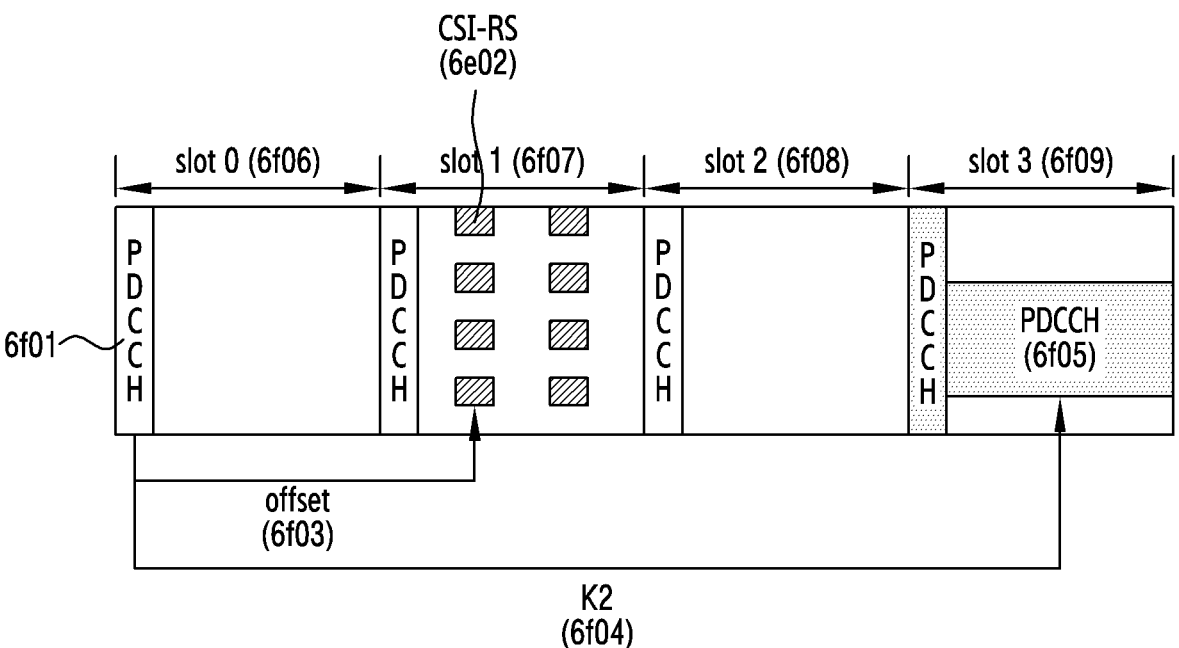
FIG. 6F illustrates another example of the aperiodic CSI reporting method according to an embodiment of the disclosure.

FIGS. 6E and 6F illustrate an example of an aperiodic CSI reporting method according to an embodiment of the disclosure.

In an example of FIG. 6E, the UE may acquire DCI format 0_1 by monitoring a PDCCH 6e01 and acquire scheduling information for a PUSCH 6e05 and CSI request information therefrom. The UE may acquire resource information for a CSI-RS 6e02, to be measured, from the received CSI request indicator. The UE may determine a time point at which resources of the transmitted CSI-RS 6e02 are measured on the basis of a time point at which DCI format 0_1 is received and a parameter for an offset (aperiodicTriggeringOffset) within an NZP CSI-RS resource set configuration (for example, NZP-CSI-RS-ResourceSet). More specifically, the UE may receive a configuration of an offset value X of the parameter aperiodicTriggeringOffset within the NZP-CSI-RS resource set configuration from the BS through higher-layer signaling, and the configured offset value X may be an offset between a slot for receiving DCI of triggering the aperiodic CSI report and a slot for transmitting CSI-RS resources. For example, the aperiodicTriggeringOffset parameter value and the offset value X may have a mapping relation shown in [Table 8] below.

TABLE 8

| aperiodicTriggeringOffset | Offset X |
| --- | --- |
| 0 | 0 slot |
| 1 | 1 slot |
| 2 | 2 slots |
| 3 | 3 slots |
| 4 | 4 slots |
| 5 | 16 slots |
| 6 | 24 slots |

In an example of FIG. 6E shows an example in which the offset value 6e03 is configured as X=0. In this case, the UE may receive the CSI-RS 6e02 in the slot (corresponding to slot #0 6e06 in FIG. 6E) for receiving DCI format 0_1 of triggering the aperiodic CSI reporting and report CSI information measured by the received CSI-RS 6e02 to the BS through the PUSCH 6e05. The UE may acquire scheduling information (information corresponding to each field of DCI format 0_1) for the PUSCH 6e05 for the CSI report from DCI format 0_1. For example, the UE may acquire information on a slot for transmitting the PUSCH 6e05 on the basis of the time domain resource allocation information for the PUSCH 6e05 in DCI format 0_1. In the example of FIG. 6, the UE may acquire 3 as a K2 value 6e04 corresponding to a slot offset value for PDCCH-to-PUSCH, and accordingly, the PUSCH 6e05 may be transmitted at a time point at which the PDCCH 6e01 is received in slot #3 6e09 spaced apart from slot #0 6e06 by three slots.

In an example of FIG. 6F, the UE may acquire DCI format 0_1 by monitoring a PDCCH 6f01 and acquire scheduling information for a PUSCH 6f05 and CSI request information therefrom. The UE may acquire resource information for a CSI-RS 6f02, to be measured, from the received CSI request indicator. The example of FIG. 6F illustrates an example in which an offset value 6f03 for the CSI-RS is configured as X=1. In this case, the UE may receive the CSI-RS 6f02 in a slot (for example, slot #0 6f06 of FIG. 6F) in which DCI format 0_1 triggering the aperiodic CSI report is received, and report CSI information measured by the received CSI-RS to the BS through the PUSCH 6f05 in slot #3 6f09 spaced apart from slot #0 6f06 by three slots according to a K2 value 6f04 corresponding to the slot offset value for PDCCH-to-PUSCH.

Control information is transmitted within first N OFDM symbols in the subframe. A control channel transmission interval N is generally N={1, 2, 3}. Accordingly, the N value varies depending on the subframe according to an amount of control information to be transmitted in the current subframe. For example, the control information may include an indicator indicating the number of OFDM symbols through which the control information is transmitted, scheduling information for the uplink or the downlink, a hybrid automatic repeat request (HARQ) acknowledgement (ACK)/negative ACK (NACK) signal, and the like.

When decoding failure occurs in initial transmission, the wireless communication system adopts an HARQ scheme for retransmitting the corresponding data in the physical layer. The HARQ scheme means a scheme in which, when a receiver does not accurately decode data, the receiver transmits information indicating decoding failure (for example, NACK) to a transmitter and allows the transmitter to retransmit the corresponding data in the physical layer. The receiver combines the data which the transmitter retransmits and the data of which the decoding has failed, so as to increase data reception performance. When the receiver accurately decodes data, the receiver may transmit information indicating decoding success (for example, ACK) to the transmitter and allows the transmitter to transmit new data.

In a communication system, one of the important things in providing a high-speed data service is supporting of a scalable bandwidth. In some embodiments, a system transmission band of the LTE system can have various bandwidths such as 20/15/10/5/3/1.4 MHz. Accordingly, service providers may select specific bandwidths from among various bandwidths and provide services. Further, there are various types of UEs (for example, the UE 120) which can support a maximum of the bandwidth 20 MHz and supports only a minimum of the 1.4 MHz bandwidth.

In the wireless communication system, the BS (for example, the BS 110) informs the UE of scheduling information for downlink data or uplink data through downlink control information (DCI). The uplink refers to a radio link in which the UE transmits data or a control signal tot eh BS, and the downlink refers to a radio link in which the BS transmits data or a control signal to the UE. The DCI defines various formats, and a DCI format may be determined and applied according to whether scheduling information is for uplink data (for example, an uplink (UP) grant) or for downlink data (for example, a downlink (DL) grant), whether it is compact DCI of which the control information is small, whether spatial multiplexing using multiple antennas is applied, whether it is used for controlling power, and the like. For example, DCI format 1 indicating scheduling information for downlink data (for example, the DL grant) may be configured to include the following control information.

Resource allocation type 0/1 flag: Resource allocation type 0/1 flag indicates whether a resource allocation type is type 0 or type 1. Type 0 flag applies a bitmap scheme to allocate resources in the unit of resource block groups (RBGs). In the LTE system, a basic scheduling unit is a resource block (RB) indicated by time and frequency domain resources, and an RBG includes a plurality of RBs and is used as a basic scheduling unit in the type 0 scheme. Type 1 flag allocates a particular RB within the RBG.

Resource block assignment: Resource block assignment indicates RBs allocated to data transmission. Expressed resources are determined according to the system bandwidth and the resource allocation type.

MCS: MCS indicates a modulation scheme and a target coding rate used for data transmission or the size of transport blocks to be transmitted.

HARQ process number: HARQ process number indicates a process number of HARQ.

New data indicator: New data indicator indicates HARQ initial transmission or retransmission.

Redundancy version: Redundancy version indicates a redundancy version (RV) of HARQ.

TPC command for PUCCH: TPC command for physical uplink control channel (PUCCH) indicates a power control command for a PUCCH which is an uplink control channel.

The DCI is transmitted through a physical downlink control channel (PDCCH) corresponding to a downlink physical control channel via a channel coding and modulation process.

In general, the DCI is channel-coded independently for each UE, and is then configured and transmitted as an independent PDCCH. In the time domain, the PDCCH is mapped and transmitted during the control channel transmission interval. The mapping location of the PDCCH in the frequency domain is determined by the identifier (ID) of each UE, and is propagated to the entire system transmission band.

Downlink data is transmitted through a physical downlink shared channel (PDSCH), which is a physical downlink data channel. The PDSCH is transmitted after the control channel transmission interval. Scheduling information, such as a specific mapping position in the frequency region and a modulation scheme, may be reported by DCI transmitted through the PDCCH.

Through an MCS including 5 bits in the control information included in the DCI, the BS may inform the UE of the modulation scheme applied to a PDSCH to be transmitted and the size (transport block size (TBS)) of data to be transmitted. The TBS corresponds to the size before the channel coding for error correction is applied to the data to be transmitted by the BS.

In the cellular system such as the 5G NR or LTE/LTE-A system, the BS (for example, the BS 110) should transmit a reference signal in order to measure a downlink channel state. For example, in the case of the LTE-advanced (LTE-A) system of the 3GPP, the UE (for example, the UE 120) measures a channel state between the BS and the UE by using a channel status information reference signal (CSI-RS) which the BS transmits. In association with the channel state, several factors need to be basically considered, and the amount of interference in the downlink is included therein. The amount of interference in the downlink may include an interference signal generated by an antenna belonging to a neighboring BS and a thermal noise, which may be used by the UE to determine a downlink channel state. For example, when the BS having one transmission antenna transmits a reference signal to the UE having one reception antenna, the UE determines energy per symbol which can be received through the downlink on the basis of the reference signal received from the BS and amounts of interference to be simultaneously received in an interval in which the corresponding symbol is received and determines energy per symbol-to-interference ratio (Es/Io). The determined Es/Io is transmitted to the BS and allows the BS to determine which data transmission speed is used for transmission to the UE through the downlink.

Figure 7:
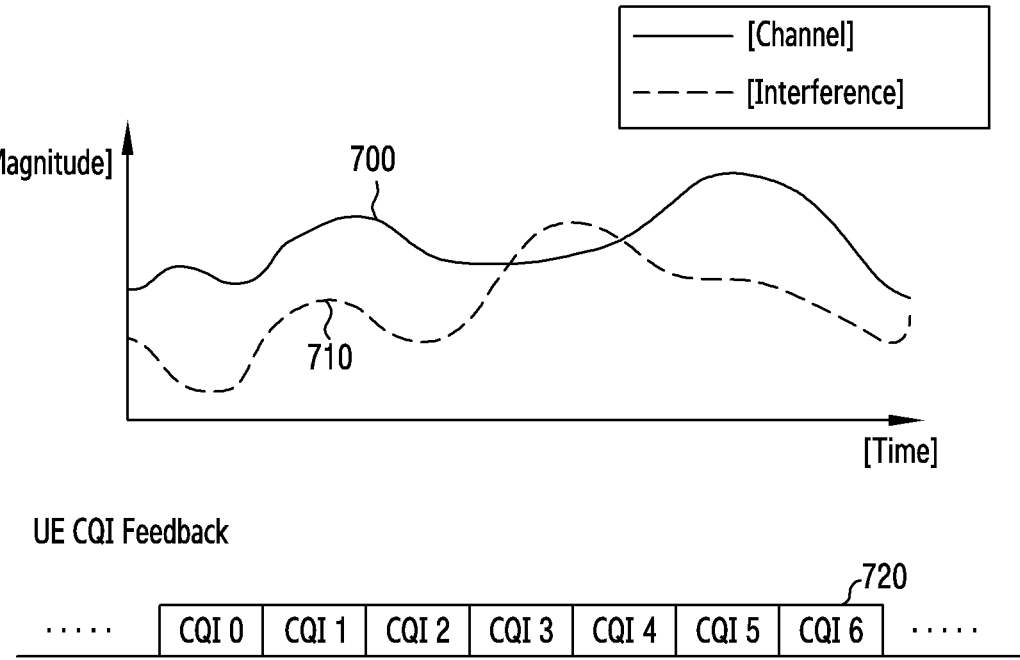
FIG. 7 illustrates an example of transmission of a channel quality indicator (CQI) which is one of channel state information of the UE according to signal energy and interference intensity measured by the UE according to an embodiment of the disclosure.

FIG. 7 illustrates an example of transmission of a channel quality indicator (CQI) which is one of channel state information of the UE according to signal energy and interference intensity measured by the UE according to an embodiment of the disclosure.

Referring to FIG. 7, the UE (for example, the UE 120) may measure a downlink reference signal, such as a CSI-RS, and perform channel estimation. The UE may calculate Es (received signal energy) according to a radio channel, like a solid line 700, by using the channel estimation result. Further, the UE may calculate the strength of interference and noise, like a dotted line 710, by using a downlink reference signal or separate resources for measuring interference and noise. The BS may use a downlink reference signal (for example, a cell-specific reference signal (CRS) or a channel state information-reference signal (CSI-RS)) to measure interference and noise, or may configure interference measurement resources in the UE and assume that a signal measured in corresponding radio resources as interference and noise. The UE may determine a maximum data transmission speed at which reception is performed at a predetermined success rate by the calculated corresponding signal-to-interference and noise ratio by using the received signal energy and the strength of interference and noise and inform the BS of the same. The BS may receive the maximum data transmission speed which the UE can support at the corresponding signal-to interference and noise ratio. The BS may determine a real data transmission rate of a downlink data signal to be transmitted to the UE on the basis of the received result. As described above, information on the maximum data transmission speed at which the UE can perform reception from the BS at a predetermined success rate is referred to as a CQI in the LTE/NR standard. The UE may feed back the CQI to the BS as indicated by reference numeral 720. In general, a radio channel varies depending on the time, and thus the UE periodically informs the BS of the CQI (that is, a CQI of a periodic CSI report) or the UE informs the BS of the CQI whenever the BS makes a request (that is, a CQI of an aperiodic CQI report). The request which the BS transmits to the UE may be made through one or more of the periodic and aperiodic methods.

The UE transfers CQI information to the BS. The BS may configure an MCS indicating a modulation scheme and a coding rate. The BS may provide the MCS when downlink or uplink resources are allocated, so that link adaptation between the BS and the UE may be performed. As the CQI information is accurately measured by the UE or the BS and accurately transmitted and received, an appropriate MCS may be configured and efficient transmission and reception are possible with a target error probability configured in the system, and thus an advanced wireless communication system is more likely to need the definition for a method of generating and applying CQI and MCS tables suitable for services supporting various reliabilities. Hereinafter, a scheme for designing a new channel quality indicator (CQI) table and modulation and coding (MCS) table is descried to accurately report a channel quality or determine a modulation and coding scheme combination according to a target transmission and reception error probability (for example, a transport block error probability) required for efficient communication in the 4G or 5G communication system. Hereinafter, the target transmission and reception error probability is described as a target BLER in the disclosure, but other parameters having the equivalent technology meaning may be used.

Further, a method of controlling a coding rate or a spectral efficiency on the basis of the existing CQI table and MCS table is described to accurately report a channel quality or determine a modulation and coding scheme combination according to a target transmission and reception error probability (for example, a transport block error probability) required for efficient communication in the 4G or 5G communication system. For reference, the spectral efficiency may be expressed as a modulation order product rate (MPR).

A scheme for reporting an accurate channel quality on the basis of a plurality of CQI tables or a scheme for determining an efficient modulation and coding scheme combination on the basis of a plurality of MCS tables according to a target transmission and reception error probability required for efficient communication in the 4G or 5G communication system is described.

In the case of the current 5G NR system, different CQI tables and MCS tables are applied according to a maximum modulation order or a target block error rate (BLER) configured in the system. The BLER value may be an error occurrence probability after the received transport block is completely decoded. In some embodiments, after decoding the larger number of transport blocks, the UE may determine the BLER value through proper calculation but may determine an approximately expected BLER value through a received signal to noise ratio (SNR). In this case, the UE may measure the received SNR, predict a decoding success probability on the basis of the SNR, and report a CQI index to the BS without actually performing the decoding.

<CSI Reference Resource Description>

In order to report a CQI index to the BS, the UE may transmit a report based on CSI reference resources, the following items may be examples of elements included in the CSI reference resources, and items which are not described below may be elements included in the CSI reference resources.

First two OFDM symbols are used as control signal
    PDSCH and number of DMRS symbols are 12 symbols
    Subcarrier spacing such as bandwidth part (BWP) configured to receive PDSCH and CP length
    BWP size configured to report CQI
    RV 0
    No RE allocated for NZP CSI-RS and ZP CSI-RS
    PDSCH symbol includes no DMRS
    PRB bundling size in units of 2 PRBs
    PDSCH transmission can be performed by maximum of 8 transmission layers

[Table 9] or [Table 11] can be used when a CQI is reported for the case in which a maximum of 64 QAM can be used, and [Table 10] can be used when a CQI report should be transmitted for the case in which a maximum of 256 QAM can be used. Further, [Table 12] or [Table 14] can be used when an MCS is determined or configured for the case in which a maximum of 64 QAM can be used for the PDSCH or the PUSCH, and [Table 13] can be used when an MCS is determined or configured for the case in which a maximum of 256 QAM can be used for the PDSCH or the PUSCH. [Table 15] and [Table 16] can be used when an MCS is determined or configured for the PUSCH to which a transform precoding (that is, whether DFT spreading is activated) and 64 QAM are applied (a q value in [Table 15] and [Table 16] is a value determined according to whether pi/2-BPSK is indicated and, q=1 when tp-pi2BPSK is configured by higher-layer signaling, and otherwise, q=2. Further, values of CQI tables in [Table 9] to [Table 14] may be configured through 4-bit indicators, and values of CQI tables in [Table 15] and [Table 16] may be configured through 5-bit indicators.

TABLE 9

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 10

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 11

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

TABLE 12

| MCS Index IMCS | Modulation Order Qm | Target code Rate [R × 1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |

TABLE 12-continued

| MCS Index IMCS | Modulation Order Qm | Target code Rate [R × 1024] | Spectral efficiency |
|---|---|---|---|
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 14

| MCS Index IMCS | Modulation Order Qm | Target code Rate [R × 1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

TABLE 13

| MCS Index IMCS | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 15

| MCS Index IMCS | Modulation Order Qm | Target code Rate [R × 1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | reserved | |
| 29 | 2 | reserved | |
| 30 | 4 | reserved | |
| 31 | 6 | reserved | |

TABLE 16

| MCS Index IMCS | Modulation Order Qm | Target code Rate [R × 1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |
| 27 | 6 | 772 | 7.4063 |
| 28 | q | | reserved |
| 29 | 2 | | reserved |
| 30 | 4 | | reserved |
| 31 | 6 | | reserved |

In a more detailed description of a process of determining a CQI index, the UE derives or determines a highest CQI index satisfying the following conditions with respect to a CQI value reported in an uplink slot n.

[CQI Determination-1]

A single PDSCH transport block having a combination of the modulation order (or scheme), the target coding rate, and the TBS corresponding to the CQI index should be received to not exceed the following transport block error probability:

If a CSI-higher-layer parameter cqi-Table included in CSI-ReportConfig configures (or indicates) [Table 9] or [Table 10], the target transport block error probability is 0.1.

If a CSI-higher-layer parameter cqi-Table included in CSI-ReportConfig configures (or indicates) [Table 11], the target transport block error probability is 0.00001.

Since a condition for the transport block error probability may mean an approximated or substantial value, the BLER value satisfied in the real communication system may at least temporarily have a value in a range somewhat smaller or larger than the value of 0.1 or 0.00001 defined in the standard. However, the system operates to make the average transport block error probability be a value close to the defined 0.1 or 0.00001. The close value may be a value within 10% to 50% of the configured target BLER value and may be another range value configured in the system.

According to an embodiment, when a rate of the use of resources such as the number of RE resources, a UE implementation capability for estimating an accurate CQI index, the size of SNR difference for each target BLER when there are a plurality of target BLERs, whether different CQI indexes can be reported for respective target BLERs in various wireless communication environment due to the SNR difference, and UE implementation complexity when the number of types of a plurality of target BLERs increases may be considered to drive an appropriate target BLER value determined to report the CQI index. When there are the plurality of target BLERs, the UE may report a CQI index estimated on the basis of at least one target BLER, and the target BLER values may be configured by a higher signal or a layer 1 (L1) signal.

The current 5G NR system considers 0.1 and 0.00001 as target BLER values, and the latter may be configured in consideration of a service requiring high reliability and low latency, for example, a service scenario such as URLLC. However, as the LTE or 5G NR system spreads, more various services for different purposes are required. The various services need various system conditions in consideration of not only reliability or low latency characteristics according to each service but also a place supporting the service, average data traffic, and a UE type. However, it may be difficult to efficiently support various services on the basis of two BLER conditions having the difference of ten thousand times or more between 0.1 and 0.00001. Accordingly, the disclosure proposes a CQI table and an MCS table for efficiently supporting other target BLERs as well as the target BLERs of the values of 0.1 and 0.00001.

When a maximum modulation order to be applied to the system is configured as 64 QAM in the current 5G NR, the CQI table in [Table 9] is used if the target BLER of the system is 0.1 for CQI reporting, and the CQI table in [Table 11] is used if the target BLER is 0.00001. The disclosure proposes a method of determining a new CQI table when a separate CQI table is used for a target BLER between 0.1 and 0.00001. Hereinafter, the disclosure is described on the basis the assumption that the target BLER is mostly configured as a value $10^{-P}$, P being 1, 2, 3, 4, 5, . . . for convenience of description, but is not limited thereto, and the target BLER may be configured as a value close to $10^{-P}$ such as 0.2, 0.002, 0.00002, 0.09, 0.009, or 0.000009 according to the system.

Further, hereinafter, embodiments of the disclosure describe a method of designing a CQI table or a method using the designed CQI table in order to transmit channel state information (CSI) by a device including a transceiver and a minimum of one or more processors coupled with the transceiver in the communication system. Particularly, a method of designing a CQI table designed when supported services or target BLERs are different or a method using the designed CQI table is described. Further, a method of determining or configuring an appropriate MCS using an appropriate MCS table corresponding to the CQI table or a designed MCS table is described. For reference, in order to maintain signaling overhead at an LTE level, CQI and MCS indicators may remain in 4 bits and 5 bits, respectively, and CQI index 0 may also be defined to be "out of range".

Hereinafter, in the disclosure, an operation of designing or generating a CQI table or an MCS table may mean a process in which the tables mentioned in [Table 9] to [Table 16] are stored in the device and the device generates a new table from the stored tables, or may be related to a process in which a table designed on the basis of the tables (for example, tables mentioned in [Table 9] to [Table 16]) defined in the existing standard is stored in advance in the device and the device calls a stored new table. That is, not only generating a new table using the tables (for example, tables mentioned in [Table 9] to [Table 16]) defined in the existing standard as a method of deriving the new table but also storing an already newly designed table is stored in the device and indicating a CQI report/MCS simply using the newly designed table may correspond to an embodiment of the disclosure. The embodiment of the disclosure may be identified on the basis of correlation between predetermined values within a table used in a first case (for example, the existing standard, for example, target BLER=0.1) and a table used in a second case (for example, required environment defined in the disclosure).

Embodiment 1

In general, indexes included in the CQI table or the MCS table are uniformly determined to have an operation signal-to-noise ratio (SINR) interval supporting the target BLER of the system. In general, a channel capacity based on the SNR is influenced by an error probability of received bits allowed by the system or the BLER. For example, when a channel capability based on the assumption that there is no error (error free) when a channel coding having a coding rate of R is applied is $C_{SNR}(R)$, a channel capacity $C_{SNR,b}(R)$ having a target bit error rate Pb has the relation of $C_{SNR,b}(R) < C_{SNR}(R)$, which allows a bit error rate or a BLER to a certain extent in the system compared to a strong condition having no error (error free), and thus a required SNR level is low. Accordingly, an operation SNR also varies depending on the allowed system target bit error rate or BLER, so that an optimized modulation order and coding rate combination or a target spectral efficiency value may be different according to the target bit error rate. Further, in general, since the bit error rate exponentially decreases compared to an SNR increase, it is preferable to design or configure the optimal CQI table or MCS table in consideration of log-scale for the target BLER or the bit error rate. For example, target BLER 0.001 corresponds to an intermediate value in the log-scale of target BLERs 0.1 and 0.00001, and thus a CQI table for the target BLER 0.001 may be generated using the CQI table in [Table 9] and the CQI table in [Table 11]. For reference, the spectral efficiency may be briefly expressed as a modulation order product rate (MPR), that is, the product R*Qm of the modulation order Qm and the coding rate R.

[Table 9] and [Table 11] consider the case in which the modulation order is a maximum of 6, that is, 64 QAM and correspond to CQI tables used when the target BLERs are 0.1 and 0.00001, respectively. In general, the CQI table or the MCS table is designed in consideration of almost uniform SNR and target BLER. Accordingly, when a CQI table is newly generated on the basis of two CQI tables having the target BLERs of 0.1 and 0.00001, the modulation and coding rate combination of the existing table or the spectral efficiency corresponding thereto may be reused as much as possible.

First, a first CQI table and a second CQI table having the same maximum modulation scheme or order are assumed. A target BLER of the first CQI table is $10^{-P1}$. A target BLER of the second CQI table is $10^{-P2}$. A new third CQI table having a target BLER of $10^{-P}$ and the same maximum modulation order may be generated or designed to meet at least some or all of the following conditions (assumption of P1<P<P2).

Condition 1) spectral efficiency corresponding to the modulation and coding rate combination of index I in the third CQI table is smaller than or equal to spectral efficiency corresponding to the modulation and coding rate combination corresponding to index I in the first CQI table and larger than or equal to spectral efficiency corresponding to the modulation and coding rate combination corresponding to index I in the second CQI table.

Condition 2) the same modulation and coding rate combinations commonly included in the first CQI table and the second CQI table are all included in the third CQI table. Hereinafter, a set including all of the same modulation and coding rate combinations is referred to as a set S for convenience.

Condition 3) when P=a*(P1+P2) and the number of same combinations in condition 2) is X, an index for a combination having the lowest spectral efficiency among the same combinations commonly included is determined as $g_{CQI}(a)$–floor(X/2) or $g_{CQI}(a)$–ceil(X/2), and indexes for the remaining same combinations commonly included are sequentially determined. Here, floor(x) denotes the highest integer equal to or smaller than a real number x, ceil(x) denotes the smallest integer larger than or equal to the real number x, and $g_{CQI}(a)$ denotes an integer determined according to a. a is a number which can be properly selected according to the target BLER, and, when P1=1 and P2=5, a=⅓ a=½ to configure P=2, a=½ to configure P=3, and a=⅔ to configure P=4. In the disclosure, for convenience, $g_{CQI}(⅓)$=5 (or 4), $g_{CQI}(½)$=8, $g_{CQI}(⅔)$=10 (11 or 12), but different values may be configured. If $g_{CQI}(a)$–floor(X/2)<1, $g_{CQI}(a)$–ceil(X/2)<1, $g_{CQI}(a)$–floor(X/2)+X>15, or $g_{CQI}(a)$–ceil(X/2)+X>15, modulation and coding rate combinations corresponding to indexes smaller than index 1 or larger than index 15 are excluded.

Condition 4) when an index allocated to a combination having the lowest spectral efficiency among the combinations included in the set S is J, (J–1) combinations having high spectral efficiency among modulation and coding rate combinations which are not included in the set S and have spectral efficiency lower than spectral efficiency of the modulation and coding rate combinations included in the set S are sequentially allocated to indexes 0 to (J–1) among the modulation and coding rate combinations in the second CQI table.

Condition 5) when an index allocated to a combination having the highest spectral efficiency among the same combinations included in the set S is K, (15–K) combinations having low spectral efficiency among modulation and coding rate combinations which are not included in the set S and have spectral efficiency higher than spectral efficiency of the modulation and coding rate combinations included in the set S are sequentially allocated to indexes (K+1) to 15 among the modulation and coding rate combinations in the first CQI table.

According to an embodiment of the disclosure, it may be identified whether to use a new table according to the disclosure by checking whether at least one of conditions 1 to 5 is satisfied. For example, whether to implement the disclosure may be identified according to whether at least one of conditions 1 to 5 between a table used when a target BLER is 0.1, a table used when a target BLER is 0.00001, and a table used when a target BLER between 0.1 and 0.00001 is configured.

As a detailed embodiment considering the conditions, a method of generating a new CQU table having a target BLER of $10^{-3}$ on the basis of [Table 9] and [Table 11] is described below. First, modulation and coding rate combinations commonly included in [Table 9] and [Table 11] are determined according to condition 2). The common combinations are a total of 13 including (QPSK, 78/1024), (QPSK, 120/1024), (QPSK, 193/1024), (QPSK, 308/1024), (QPSK, 449/1024), (QPSK, 602/1024), (16QAM, 378/1024), (16QAM, 490/1024), (16QAM, 616/1024), (64QAM, 466/1024), (64QAM, 567/1024), (64QAM, 666/1024), and (64QAM, 772/1024) (X=13).

Since a=½ by condition 3), $g_{CQI}(a)$-floor(X/2)=8-6=2 if $g_{CQI}$(½)=8. Accordingly, the 13 combinations are sequentially allocated to indexes 2 to 14. Subsequently, the combination of (QPSK, 50/1024) is allocated to index 1 in [Table 11], and the combination of (64QAM, 873/1024) is allocated to index 15 in [Table 9] by condition 4). The generated CQI tables are shown as in [Table 17].

TABLE 17

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

According to an embodiment, when a parameter (modulation scheme, coding rate×1024, efficiency) indicated by a CQI index $(I_{0.001})$ when the target BLER is 0.001 is the same as a parameter indicated by a CQI index $(I_{0.1})$ when the target BLER is 0.1 (that is, P=3), whether to implement the disclosure may be identified on the basis of the relation between the CQI index $(I_{0.001})$ and the CQI index $(I_{0.1})$. For example, whether to implement the embodiment of the disclosure may be identified on the basis of the relation of CQI index $(I_{0.001})$=CQI index $(I_{0.1})$+k (k being a positive integer). For example, k may be 1 in [Table 17].

According to an embodiment, when a parameter indicated by a CQI index $(I_{0.001})$ when the target BLER is 0.001 (that is, P=3) is the same as a parameter indicated by a CQI index $(I_{0.00001})$ when the target BLER is 0.00001, whether to implement the disclosure may be identified on the basis of the relation between the CQI index $(I_{0.001})$ and the CQI index $(I_{0.00001})$. For example, whether to implement the disclosure may be identified on the basis of the relation of CQI index $(I_{0.001})$=CQI index $(I_{0.00001})$-k (k being a positive integer). For example, k may be 1 in [Table 17].

Embodiment 2

In embodiment 1, for the case of (P1=1, P2=5, P=2) or (P1=1, P2=5, P=4), $g_{CQI}(a)$-floor(X/2)<2 or $g_{CQI}(a)$-ceil (X/2)<2. Since tables which are the same as the existing tables can be designed, a new third CQI table may be designed through a different method in this case.

First, it is assumed that spectral efficacy for the index J (J=1, 2, . . . ) of the given two CQI tables, the first CQI table and the second CQI table, are $A_J$ and $B_J$. When spectral efficiency for the index J of the new third CQI table is $C_J$, $C_J$ may be expressed as shown in [Table 18] and as follows by using a function F(A, B) defining a new value. $C_J$=F($A_J$, $B_J$). The function F(A, B) may be defined in various forms, and may be defined as, for example, a function considering the target BLER, such as F(A, B)=(1-a)*A+a*B (a being a value defined in condition 3 of embodiment 1). Further, in general, in the case of the same modulation scheme or order for the same index, $C_J$ may be defined according to the coding rate rather than spectral efficiency. Further, $C_J$=F($A_J$, $B_J$) may be expressed as another close value. For example, when $C_J$=0.1934, 1024*R=1024*0.1934/2=99.0208, and $C_J$ may be changed to a close value, such as $C_J$=0.1953, in order to simply express the same like 1024*R=100. In general, the close value of the given value may be values within a range of 10 to 20%.

TABLE 18

| CQI index | modulation | code rate × 1024 | efficiency |
|---|---|---|---|
| 0 | | out of range | |
| 1 | QPSK | 1024 × F(A1, B1)/2 | F(A1, B1) |
| 2 | QPSK | 1024 × F(A2, B2)/2 | F(A2, B2) |
| 3 | QPSK | 1024 × F(A3, B3)/2 | F(A3, B3) |
| 4 | QPSK | 1024 × F(A4, B4)/2 | F(A4, B4) |
| 5 | QPSK | 1024 × F(A5, B5)/2 | F(A5, B5) |
| 6 | QPSK | 1024 × F(A6, B6)/2 | F(A6, B6) |
| 7 | QPSK | 1024 × F(A7, B7)/2 | F(A7, B7) |
| 8 | 16QAM | 1024 × F(A8, B8)/4 | F(A8, B8) |
| 9 | 16QAM | 1024 × F(A9, B9)/4 | F(A9, B9) |
| 10 | 16QAM (or 64QAM) | 1024 × F(A10, B10)/4 (or 1024 × F(A10, B10)/6) | F(A10, B10) |
| 11 | 64QAM | 1024 × F(A11, B11)/6 | F(A11, B11) |
| 12 | 64QAM | 1024 × F(A12, B12)/6 | F(A12, B12) |
| 13 | 64QAM | 1024 × F(A13, B13)/6 | F(A13, B13) |
| 14 | 64QAM | 1024 × F(A14, B14)/6 | F(A14, B14) |
| 15 | 64QAM | 1024 × F(A15, B15)/6 | F(A15, B15) |

A new CQI table having the target BLER of $10^{-2}$, $10^{-3}$, or $10^{-4}$ may be generated using the method according to [Table 18] on the basis of [Table 9] and [Table 11]. The new CQI table having the target BLER of $10^{-2}$, $10^{-3}$, and $10^{-4}$ may correspond to [Table 19], [Table 20], and [Table 21], respectively.

TABLE 19

| CQI index | modulation | code rate × 1024 | efficiency |
|---|---|---|---|
| 0 | | out of range | |
| 1 | QPSK | 62 | 0.1211 |
| 2 | QPSK | 97 | 0.1895 |
| 3 | QPSK | 155 | 0.3027 |
| 4 | QPSK | 245 | 0.4785 |
| 5 | QPSK | 364 | 0.7109 |
| 6 | QPSK | 504 | 0.9844 |
| 7 | QPSK | 654 | 1.2773 |
| 8 | 16QAM | 427 | 1.6680 |
| 9 | 16QAM | 537 | 2.0977 |
| 10 | 16QAM | 629 | 2.4570 |
| 11 | 64QAM | 515 | 3.0176 |
| 12 | 64QAM | 599 | 3.5098 |
| 13 | 64QAM | 704 | 4.1250 |
| 14 | 64QAM | 804 | 4.7109 |
| 15 | 64QAM | 889 | 5.2090 |

TABLE 20

| CQI index | modulation | code rate × 1024 | efficiency |
|---|---|---|---|
| 0 | | out of range | |
| 1 | QPSK | 54 | 0.1055 |
| 2 | QPSK | 85 | 0.1660 |
| 3 | QPSK | 136 | 0.2656 |
| 4 | QPSK | 214 | 0.4180 |
| 5 | QPSK | 321 | 0.6270 |
| 6 | QPSK | 455 | 0.8887 |
| 7 | QPSK | 602 | 1.1758 |
| 8 | 16QAM | 396 | 1.5469 |
| 9 | 16QAM | 497 | 1.9414 |
| 10 | 16QAM | 595 | 2.3242 |
| 11 | 64QAM | 489 | 2.8652 |

TABLE 20-continued

| CQI index | modulation | code rate × 1024 | efficiency |
|---|---|---|---|
| 12 | 64QAM | 566 | 3.3164 |
| 13 | 64QAM | 670 | 3.9258 |
| 14 | 64QAM | 770 | 4.5117 |
| 15 | 64QAM | 856 | 5.0156 |

TABLE 21

| CQI index | modulation | code rate × 1024 | efficiency |
|---|---|---|---|
| 0 | | out of range | |
| 1 | QPSK | 46 | 0.08984375 |
| 2 | QPSK | 73 | 0.142578125 |
| 3 | QPSK | 116 | 0.2265625 |
| 4 | QPSK | 182 | 0.35546875 |
| 5 | QPSK | 278 | 0.54296875 |
| 6 | QPSK | 406 | 0.79296875 |
| 7 | QPSK | 551 | 1.076171875 |
| 8 | 16QAM | 364 | 1.421875 |
| 9 | 16QAM | 457 | 1.78515625 |
| 10 | 16QAM | 560 | 2.1875 |
| 11 | 64QAM | 463 | 2.712890625 |
| 12 | 64QAM | 533 | 3.123046875 |
| 13 | 64QAM | 635 | 3.720703125 |
| 14 | 64QAM | 735 | 4.306640625 |
| 15 | 64QAM | 831 | 4.869140625 |

Meanwhile, the modulation schemes having the CQI index of 7 and 8 re expressed as QPSK and 16 QAM in [Table 18], but they are all QPSK or 16 QAM according to another embodiment.

According to an embodiment, a new CQI table may be derived using the method of [Table 18] on the basis of [Table 17] of embodiment 1. An example of generating the new CQI table having the target BLER of $10^{-2}$ using the method of [Table 18] on the basis of [Table 9] and [Table 17] is as shown in [Table 22]. An example of generating the new CQI table having the target BLER of $10^{-4}$ using the method of [Table 18] on the basis of [Table 11] and [Table 17] is as shown in [Table 23]. In P=a*(P1+P2), P1=1, P2=3, and a=½ when [Table 9] and [Table 17] are used, and P1=3, P2=5, and a=½ when [Table 11] and [Table 17] are used.

TABLE 22

| CQI index | modulation | code rate × 1024 | efficiency |
|---|---|---|---|
| 0 | | out of range | |
| 1 | QPSK | 64 | 0.1250 |
| 2 | QPSK | 99 | 0.1934 |
| 3 | QPSK | 157 | 0.3066 |
| 4 | QPSK | 251 | 0.4902 |
| 5 | QPSK | 379 | 0.7402 |
| 6 | QPSK | 526 | 1.0273 |
| 7 | 16QAM (or QPSK) | 340 (or 679) | 1.3281 (or 1.3262) |
| 8 | 16QAM | 434 | 1.6953 |
| 9 | 16QAM | 553 | 2.1602 |
| 10 | 64QAM (or 16QAM) | 438 (or 658) | 2.5664 (or 2.5703) |
| 11 | 64QAM | 517 | 3.0293 |
| 12 | 64QAM | 616 | 3.6094 |
| 13 | 64QAM | 719 | 4.2129 |
| 14 | 64QAM | 822 | 4.8164 |
| 15 | 64QAM | 910 | 5.3320 |

TABLE 23

| CQI index | modulation | code rate × 1024 | efficiency |
|---|---|---|---|
| 0 | | out of range | |
| 1 | QPSK | 40 | 0.0781 |
| 2 | QPSK | 64 | 0.1250 |
| 3 | QPSK | 99 | 0.1934 |
| 4 | QPSK | 157 | 0.3066 |
| 5 | QPSK | 251 | 0.4902 |
| 6 | QPSK | 379 | 0.7402 |
| 7 | QPSK | 526 | 1.0273 |
| 8 | 16QAM(or QPSK) | 340 (or 679) | 1.3281 (or 1.3262) |
| 9 | 16QAM | 434 | 1.6953 |
| 10 | 16QAM | 553 | 2.1602 |
| 11 | 64QAM(or 16QAM) | 438 (or 658) | 2.5664 (or 2.5703) |
| 12 | 64QAM | 517 | 3.0293 |
| 13 | 64QAM | 616 | 3.6094 |
| 14 | 64QAM | 719 | 4.2129 |
| 15 | 64QAM | 822 | 4.8164 |

The method of determining the third CQI table by newly determining spectral efficiency in consideration of spectral efficiency and the target BLER for each index in different two tables, such as the first CQI table and the second CQI table, has been described above, and the CQI tables in [Table 18] to [Table 23] may be determined according to the described method. Further, the coding rate or spectral efficiency of each CQI table may be determined on the basis of a value of a determined according to the target BLER value. According to an embodiment, the UE may acquire the third CQI table having the target BLER of $10^{-P}$ on the basis of the first CQI table having the target BLER of $10^{-P1}$ and the second CQI table having the target BLER of $10^{-P2}$. At this time, a parameter value for each CQI index of the third CQI table may be determined on the basis of the value of a (for example, a=P/(P1+P2)) determined on the basis of the first CQI table, the second CQI table, P1, and P2. In other words, the coding rate or spectral efficiency for each CQI index J of the third CQI table may have a value of $(1-a)*R_1(J)+a*R_2(J)$ or $(1-a)*SE_1(J)+a*SE_2(J)$, or a value close thereto for the cording rate $R_1(J)$, $R_2(J)$ or the spectral efficiency $SE_1(J)$, $SE_2(J)$ corresponding to the first CQI table or the second CQI table.

Embodiment 3

In 5G NR, when the maximum modulation order is 8, that is, when a modulation scheme of 256 QAM is allowed, only one CQI table for the target BLER=0.1 of [Table 10] exists. In this case, the following method may be applied to generate the third CQI table having the target BLER=0.001. First, from [Table 17] of embodiment 1 or [Table 20] of embodiment 2, it may be noted that (QPSK, 50/1024) or (QPSK, 54/1024) is suitable as a modulation and coding rate combination for index 1 in the case of the target BLER=0.001. Combinations suitable for an initial index may be first configured in the CQI table having the target BLER=0.001 (at this time, methods of the other embodiments may be used to configure the corresponding combinations, or the following corresponding combinations for determining the operation SNR through simulation may be determined). Among combinations suitable for the initial index, combinations corresponding to spectral efficiency values lower than the lowest spectral efficiency in [Table 10] are sequentially allocated to indexes from index 1, and the existing modulation and coding rate combinations in [Table 10] are sequentially allocated to the remaining indexes. For example, when a combination suitable for the initial index of the CQI table for the BLER=0.001 is (QPSK, 50/1024), spectral efficiency of a combination of (QPSK, 50/1024) is lower than that of a combination of (QPSK, 78/1024) corresponding to the lowest spectral efficiency of [Table 10], and thus the combination of (QPSK, 50/1024) may be allocated to index 1 and the combinations of [Table 10] may be sequentially allocated to the following indexes. Through such a method, the new table may be determined as shown in [Table 24]. If X combinations suitable for the initial index are selected, it may be noted that X indexes are replaced with combinations suitable for the initial index among the combinations of [Table 10].

TABLE 24

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |
| 3 | QPSK | 193 | 0.3770 |
| 4 | QPSK | 449 | 0.8770 |
| 5 | 16QAM | 378 | 1.4766 |
| 6 | 16QAM | 490 | 1.9141 |
| 7 | 16QAM | 616 | 2.4063 |
| 8 | 64QAM | 466 | 2.7305 |
| 9 | 64QAM | 567 | 3.3223 |
| 10 | 64QAM | 666 | 3.9023 |
| 11 | 64QAM | 772 | 4.5234 |
| 12 | 64QAM | 873 | 5.1152 |
| 13 | 256QAM | 711 | 5.5547 |
| 14 | 256QAM | 797 | 6.2266 |
| 15 | 256QAM | 885 | 6.9141 |

According to an embodiment, when a parameter (modulation scheme, coding rate, spectral efficiency) indicated by a CQI index $(I_{0.001})$ in the case in which the target BLER is 0.001 (that is, P=3) is the same as a parameter (for example, [Table 10]) indicated by a CQI index $(I_{0.1})$ in the case in which the target BLER is 0.1, whether to implement the disclosure may be identified on the basis of the relation of CQI index $(I_{0.001})$=CQI index $(I_{0.1})$+X(X being a positive integer). For example, X may be 1 in [Table 24].

The designed CQI tables of [Table 17] to [Table 24] are only examples, and may be configured by another modulation and coding rate combination having a close value of each coding rate or spectral efficiency of 10 to 20% according to a circumstance.

Embodiment 4

The embodiment describes a method of determining a modulation and coding rate combination according to a CQI index using the existing CQI tables but on the basis of a prearranged rule. In general, when the newly designed CQI table in embodiment 1 to embodiment 3 is applied to the system, parameters indicating the corresponding CQI tables may be defined through higher-layer signaling (for example, RRC signaling). According to an embodiment, the BS may transmit a parameter indicating a CQI table designed through embodiment 1 to embodiment 3 to the UE through RRC signaling. For example, in 5G NR, a cqi-Table parameter included in CSI-ReportConfig may be used to indicate the corresponding CQI tables.

Further, according to an embodiment, the BS may transmit information indicating the use of the CQI table designed through embodiment 1 to embodiment 3 to the UE by providing an indicator indicating that a target BLER or another target BLER different from the existing target BLER (for example, 0.1 or 0.00001) are required. The table(s) may be indirectly indicated through a direct indication of the target BLER or a parameter corresponding thereto in RRC (or MAC CE or DCI). For example, when a specific CQI table is indicated through cqi-Table included in CSI-Report-Config and a target BLER or a user category is separately indicated, an appropriate CQI index may be determined on the basis of a predetermined rule in the CQI table according to the CQI table, the BLER, or the user category indicated by the indicators. At this time, in order to report the CSI to the BS, the UE may transmit CQI indexes determined on the basis of the target BLER or the user category, the CQI table, and the measured received SNR through appropriate parameters.

First, coding rate*1024 and spectrum efficiency (SE) according to each index J are R(J) or (SE(J) and the modulation order is Q(J) in the CQI table, and the target BLER is referred to as $10^{-P}$. A method of determining the final coding rate by determining the appropriate value F(Q (J), P) on the basis of the target BLER and the modulation order and subtracting the determined appropriate F(Q(J), P) from the coding rate R(J) or adding them is described. In other words, when the target BLER is indicated through higher-layer signaling and the CQI table to be used is indicated, a real coding rate $R_{eff}(J)*1024$ may be generally calculated using the method of Equation 2 (a value obtained by multiplying the coding rate by 1024 is used in the disclosure for convenience, but the coding rate itself may be used).

$$R_{eff}(J)=R(J)-F(Q(J),P) \quad\quad [EQN. 2]$$

In Equation 2 above, F(Q(J), P) may be a function complexly determined according to the value P corresponding to the modulation order Q(J) and the target BLER. Further, F(Q(J), P) may be divided into independent functions such as $F_1(Q(J))$ referring to a value determined on the modulation order and $F_2(P)$ referring to a value determined according to the target BLER like F(Q(J), P)=$F_1$(Q(J))+$F_2$ (P). Further, according to a circumstance, $F_1(Q(J))$=0 is configured, and thus $R_{eff}(J)$ may be configured as a value irrelevant to the modulation order. For example, in the case of $F_1(Q(J))$=0, $F_2(P)$=(P−1)*c, $R_{eff}(J)$=R(J)−c if the target BLER=$10^{-2}$, $R_{eff}(J)$=R(J)−2*c if the BLER=$10^{-3}$, $R_{eff}(J)$=R (J)−3*c if the target BLER=$10^{-4}$, and $R_{eff}(J)$=R(J)−4*c BLER=$10^{-5}$ according to Equation 2 above. In Equation 2 above, an appropriate value may be selected as the constant c according to the system. For example, the constant c may be configured as a value of 12 by uniformly dividing 48, which is the difference between the values of 78 and 30 of index 1 or may be a value configured in consideration of an average of the difference according to each modulation and coding rate combination with reference to [Table 9] and [Table 11].

Equation 2 above indicates addition of the existing coding rate and specific values and subtraction of specific values from the existing coding rate according to the predetermined rule, but a method using specific rate values such as multiplication or division of the existing coding rate by the appropriate value according to the predetermined rule may also be used as an embodiment of the disclosure.

According to an embodiment, a method applying another rule according to P and P1 may be used. In an embodiment, a method of adding an appropriate value is used when P1 is equal to or smaller than a specific value, and a method of multiplying an appropriate value is used when P1 is larger than the specific value.

Embodiment 5

In embodiment 1 to embodiment 4, the method of designing or determining CQI tables has been described. The designed CQI tables may be stored in the BS or the UE and used to determine a CQI index or report CSI.

For example, CQI tables designed for the target BLER=0.001, such as not only [Table 9], [Table 10], and [Table 11] but also newly designed [Table 17], may be used to determine the CQI index or report the CSI.

[CQI Determination-2]

A single PDSCH transport block having a combination of the modulation order (or scheme), the target coding rate, and the TBS corresponding to the CQI index should be received to not exceed the following transport block error probability:

If a CSI-higher-layer parameter cqi-Table included in CSI-ReportConfig configures (or indicates) [Table 9] or [Table 10], the target transport block error probability is 0.1.

If a CSI-higher-layer parameter cqi-Table included in CSI-ReportConfig configures (or indicates) [Table 17], the target transport block error probability is 0.001.

If a CSI-higher-layer parameter cqi-Table included in CSI-ReportConfig configures (or indicates) [Table 11], the target transport block error probability is 0.00001.

The example indicates the case in which the transport block error probability (for example, target BLER)=0.001 is added and thus the number of CQI tables is 4, but some of [Table 19] to [Table 24] may be additionally used when target BLERs are generally larger and more various service scenarios are considered.

According to an embodiment, the BS may indicate a specific CQI table (for example, at least one of [Table 9] to [Table 11] and [Table 17] to [Table 24]) through higher-layer signaling (for example, RRC signaling). The UE may identify a transport block error probability corresponding to the indicated specific CQI table. The UE may perform CQI reporting on the basis of the transport block error probability.

Further, according to an embodiment, a separate indicator may be used to request a transport block error probability in a specific range or indicate a CQI table used only in a specific service. For example, in the case of a service requiring a transport block error probability in a specific range based on the standard (for example, target BLER=0.001), [Table 9] to [Table 11] may not be used, and thus an indicator indicating a service category may be configured in the UE. The UE may identify a transport block error probability (for example, a target BLER) corresponding to a category of the corresponding indicator. When the number of transport block error probabilities corresponding to the category of the corresponding indicator is plural, an indicator indicating a specific transport block error probability value (for example, indicating a specific CQI table within the corresponding range) may be additionally used. The UE may perform CQI reporting on the basis of the identified transport block error probability.

In embodiment 1 to embodiment 5, a newly generated CQI table or a characteristic and a use method of the generated CQI table has been described. Subsequently, a method of designing an MCS table according to the target BLER is described.

Embodiment 6

Since the error probability exponentially decreases compared to an SNR increase, it is preferable to design or configure the optimal MCS table in consideration of log-scale for the target BLER or the bit error rate. For example, target BLER 0.001 corresponds to an intermediate value in the log-scale of target BLERs 0.1 and 0.00001, and thus an MCS table for the target BLER 0.001 may be generated properly using the MCS table in [Table 12] to the MCS table in [Table 16].

It is assumed that a first MCS table and a second MCS table have the same maximum modulation scheme or order. A target BLER of the first MCS table is $10^{-P1}$. A target BLER of the second MCS table is $10^{-P2}$. A new third MCS table having a target BLER of 10–P and the same maximum modulation order may be generated or designed to meet at least some or all of the following conditions (assumption of P1<P<P2).

Condition 1) Spectral efficiency corresponding to the modulation and coding rate combination of index I of the third MCS table is equal to or smaller than spectral efficiency corresponding to the modulation and coding rate combination corresponding to index I of the first MCS table and larger than or equal to spectral efficiency corresponding to the modulation and coding rate combination corresponding to index I of the second MCS table.

Condition 2-1) The same modulation and coding rate combination commonly included in both the first MCS table and the second MCS table is included in a third MCS table. Hereinafter, a set including all of the same modulation and coding rate combinations is a set S1 for convenience.

Condition 2-2) When a combination having the lowest spectral efficiency is C1 and a set having the highest spectral efficiency is C2 among the same modulation and coding rate combinations commonly included in the first MCS table and the second MCS table, the third MCS table includes all modulation and coding rate combinations higher than or equal to C1 or equal to or lower than C2 in the first MCS table and the second MCS table. Hereinafter, all of the same modulation and coding rate combinations are referred to as a set S2.

Condition 3) when P=a*(P1+P2) and the number of same combinations in condition 2-1 or condition 2-2 is X (hereinafter, referred to X1 in the case of the set S1 and referred to as X2 in the case of the set S2), an index for the combination having the lowest spectral efficiency among the same commonly included combinations is determined as $g_{MCS}(a)-floor(X/2)$ or $g_{MCS}(a)-ceil(X/2)$, and indexes for the remaining commonly included combinations are sequentially determined. Here, floor(x) denotes the highest integer equal to or smaller than a real number x, ceil(x) denotes the smallest integer larger than or equal to the real number x, and $g_{MCS}(a)$ denotes an integer determined according to a. a is a number which can be properly selected according to the target BLER, and, when P1=1 and P2=5, a=⅓ a=½ to configure P=2, a=½ to configure P=3, and a=⅔ to configure P=4. In the disclosure, it is configured and described that $g_{MCS}(½)=14$ or 15 for convenience, but another value may be configured. If $g_{MCS}(a)-floor(X/2)<0$, $g_{MCS}(a)-ceil(X/2)<0$, $g_{MCS}(a)-floor(X/2)+X>28$ (or 27), or $g_{MCS}(a)-ceil(X/2)+X>28$ (or 27), modulation and coding rate combinations corresponding to indexes smaller than index 0 or larger than index 28 (or 27) are excluded.

Condition 4) When an index allocated to the combination having the lowest spectral efficiency among the same combinations included in the set S1 or S2 is J, J combinations having high spectral efficiency among modulation and coding rate combinations which have low spectral efficiency and are not included in the set S1 or S2 rather than modulation and coding rate combinations included in the S1 or S2 may be allocated to indexes 0 to (J–1) among modulation and coding rate combinations of the second MCS table.

Condition 5) when an index allocated to a combination having the highest spectral efficiency among the same combinations included in the set S1 or S2 is K, (28–K) or (27–K) combinations having low spectral efficiency among modulation and coding rate combinations which have higher spectral efficiency than modulation and coding rate combinations included in the set S1 or S2 and are not included in the set S1 or S2 may be sequentially allocated to indexes (K+1) to 28 or 27 among the modulation and coding rate combinations of the first MCS table. The value of 28 or 27 may vary depending on the number of reserved indexes in the given MCS table (for example, 31–(the number of reserved indexes)).

As a detailed embodiment considering the conditions, a method of generating a new MCS table having a target BLER of $10^{-3}$ on the basis of [Table 12] or [Table 14] is described below. First, a set S1 of the modulation and coding rate combinations commonly included in [Table 12] and [Table 14] is determined according to condition 2-1). Indexes 0 to 8, indexes 10 to 15, and indexes 17 to 24 in [Table 12] correspond to indexes 6 to 28 in [Table 14]. It may be noted that a total number of common combinations is 23, such as (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (16QAM, 340/1024), (16QAM, 378/1024), (16QAM, 434/1024), (16QAM, 490/1024), (16QAM, 553/1024), (16QAM, 616/1024), (64QAM, 438/1024), (64QAM, 466/1024), (64QAM, 517/1024), (64QAM, 567/1024), (64QAM, 616/1024), (64QAM, 666/1024), (64QAM, 719/1024), and (64QAM, 772/1024) (X1=23).

When the set S2 of modulation and coding rate combinations is determined according to condition 2-2 for [Table 12] and [Table 14], it may be noted that a total number of combinations included in S2 is 25, such as (QPSK, 120/1024), (QPSK, 157/1024), (QPSK, 193/1024), (QPSK, 251/1024), (QPSK, 308/1024), (QPSK, 379/1024), (QPSK, 449/1024), (QPSK, 526/1024), (QPSK, 602/1024), (QPSK, 679/1024), (16QAM, 340/1024), (16QAM, 378/1024), (16QAM, 434/1024), (16QAM, 490/1024), (16QAM, 553/1024), (16QAM, 616/1024), (16QAM, 658/1024), (64QAM, 438/1024), (64QAM, 466/1024), (64QAM, 517/1024), (64QAM, 567/1024), (64QAM, 616/1024), (64QAM, 666/1024), (64QAM, 719/1024), and (64QAM, 772/1024) (X2=25). That is, compared to the set S1, the combinations of (QPSK, 679/1024) and (16QAM, 658/1024) may be additionally included in the set S2.

Subsequently, since a=½ by condition 3), $g_{MCS}$(a)–floor (X/2)=14–12=2 if $g_{MCS}$(½)=14. Accordingly, 23 combinations included in the set S1 are sequentially allocated to indexes 2 to 24. Subsequently, by condition 4), the combination of (QPSK, 78/1024) is allocated to index 0 and the combination of (QPSK, 99/1024) is allocated to index 1 in [Table 14], and (64QAM, 822/1024), (64QAM, 873/1024), (64QAM, 910/1024), and (64QAM, 948/1024) are sequentially allocated to indexes 25, 26, 27, and 28, respectively in [Table 12].

The generated MCS table is as shown in [Table 25].

TABLE 25

| MCS Index IMCS | Modulation Order Qm | Target code Rate [R × 1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 4 | 340 | 1.3281 |
| 12 | 4 | 378 | 1.4766 |
| 13 | 4 | 434 | 1.6953 |
| 14 | 4 | 490 | 1.9141 |
| 15 | 4 | 553 | 2.1602 |
| 16 | 4 | 616 | 2.4063 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Since $g_{MCS}$(a)–floor(X/2)=15–12=3 if $g_{MCS}$(½)=15 in condition 3), 23 combinations included in the set S1 are sequentially allocated to indexes 3 to 25. Further, by condition 4), the combinations of (QPSK, 64/1024), (QPSK, 78/1024), and (QPSK, 99/1024) are sequentially allocated to indexes 0, 1, and 2 in [Table 14] and the combinations of (64QAM, 822/1024), (64QAM, 873/1024), and (64QAM, 910/1024) are sequentially allocated to indexes 26, 27, and 28, respectively in [Table 12].

The generated MCS table is as shown in [Table 26].

TABLE 26

| MCS Index IMCS | Modulation Order Qm | Target code Rate [R × 1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 157 | 0.3066 |
| 5 | 2 | 193 | 0.3770 |
| 6 | 2 | 251 | 0.4902 |
| 7 | 2 | 308 | 0.6016 |
| 8 | 2 | 379 | 0.7402 |
| 9 | 2 | 449 | 0.8770 |
| 10 | 2 | 526 | 1.0273 |
| 11 | 2 | 602 | 1.1758 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 6 | 438 | 2.5664 |
| 19 | 6 | 466 | 2.7305 |

TABLE 26-continued

| MCS Index IMCS | Modulation Order Qm | Target code Rate [R × 1024] | Spectral efficiency |
|---|---|---|---|
| 20 | 6 | 517 | 3.0293 |
| 21 | 6 | 567 | 3.3223 |
| 22 | 6 | 616 | 3.6094 |
| 23 | 6 | 666 | 3.9023 |
| 24 | 6 | 719 | 4.2129 |
| 25 | 6 | 772 | 4.5234 |
| 26 | 6 | 822 | 4.8164 |
| 27 | 6 | 873 | 5.1152 |
| 28 | 6 | 910 | 5.3320 |
| 29 | 2 | reserved | |
| 30 | 4 | reserved | |
| 31 | 6 | reserved | |

Since $g_{MCS}(a)$–floor(X/2)=14–12=2 when $g_{MCS}(\frac{1}{2})$=14 in condition 3) and the MCS table is generated on the basis of the set S2, 25 combinations included in the set S2 are sequentially allocated to indexes 2 to 26. Further, by condition 4), the combinations of (QPSK, 78/1024) and (QPSK, 99/1024) are sequentially allocated to indexes 0 and 1 in [Table 14] and the combinations of (64 QAM, 822/1024) and (64 QAM, 873/1024) are sequentially allocated to indexes 27 and 28, respectively in [Table 12].

The generated MCS table is as shown in [Table 27].

TABLE 27

| MCS Index IMCS | Modulation Order Qm | Target code Rate [R × 1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 157 | 0.3066 |
| 4 | 2 | 193 | 0.3770 |
| 5 | 2 | 251 | 0.4902 |
| 6 | 2 | 308 | 0.6016 |
| 7 | 2 | 379 | 0.7402 |
| 8 | 2 | 449 | 0.8770 |
| 9 | 2 | 526 | 1.0273 |
| 10 | 2 | 602 | 1.1758 |
| 11 | 2 | 679 | 1.3262 |
| 12 | 4 | 340 | 1.3281 |
| 13 | 4 | 378 | 1.4766 |
| 14 | 4 | 434 | 1.6953 |
| 15 | 4 | 490 | 1.9141 |
| 16 | 4 | 553 | 2.1602 |
| 17 | 4 | 616 | 2.4063 |
| 18 | 4 | 658 | 2.5703 |
| 19 | 6 | 438 | 2.5664 |
| 20 | 6 | 466 | 2.7305 |
| 21 | 6 | 517 | 3.0293 |
| 22 | 6 | 567 | 3.3223 |
| 23 | 6 | 616 | 3.6094 |
| 24 | 6 | 666 | 3.9023 |
| 25 | 6 | 719 | 4.2129 |
| 26 | 6 | 772 | 4.5234 |
| 27 | 6 | 822 | 4.8164 |
| 28 | 6 | 873 | 5.1152 |
| 29 | 2 | reserved | |
| 30 | 4 | reserved | |
| 31 | 6 | reserved | |

As described above, another MCS table may be generated using the set S1 or the set S2 by changing the value of $g_{MCS}(a)$ and a calculated value of floor(X/2) or ceil(X/2).

According to an embodiment, when a parameter (modulation order, target coding rate, spectral efficiency) indicated by an MCS index ($I_{midSE}$) in a specific case (for example, a target BLER is 0.001 (that is, P=3) or a separate indicator is configured in the UE) is the same as a parameter indicated by an MCS index ($I_{lowSE}$) in the case in which a low SE is configured (for example, a target BLER is 0.00001), whether to implement the disclosure may be identified on the basis of the relation between the MCS index ($I_{midSE}$) and the MCS index ($I_{lowSE}$). For example, whether to implement the disclosure may be identified on the basis of the relation of MCS index ($I_{midSE}$)=MCS index ($I_{lowSE}$)–k (k being a positive integer). For example, k may be 4 in [Table 25]. For example, k may be 3 in [Table 26].

Further, according to an embodiment, when a parameter (modulation order, target coding rate, spectral efficiency) indicated by an MCS index ($I_{midSE}$) in a specific case (for example, a target BLER is 0.001 (that is, P=3) or a separate indicator is configured in the UE) is the same as a parameter indicated by an MCS index ($I_{MCS}$) of a default configuration (for example, a target BLER is 0.1), whether to implement the disclosure may be identified on the basis of the relation between the MCS index ($I_{midSE}$) and the MCS index ($I_{MCS}$). For example, whether to implement the disclosure may be identified on the basis of the relation of MCS index ($I_{midSE}$)=MCS index ($I_{MCS}$)+k (k being a positive integer). For example, k may be 2 in [Table 27].

Embodiment 7

In 5G NR, when the maximum modulation order is 8, that is, when a modulation scheme of 256 QAM is allowed, only one MCS table for the target BLER=0.1 of [Table 10] exists. In this case, the following method may be applied to generate a third MCS table of the target BLER=0.001.

First, in the case of the target BLER=0.001, it may be noted that, from [Table 25] to [Table 27] of embodiment 6, (QPSK, 64/1024) or (QPSK, 78/1024) is suitable for the modulation and coding rate combination for index 0 and combinations suitable for the initial index in the CQI table having the target BLER=0.001 are configured as (QPSK, 64/1024), (QPSK, 78/1024), and (QPSK, 99/1024) (at this time, a method of another embodiment may be used to configure the corresponding combinations, or the corresponding combinations may be determined after an operation SNR through simulation is determined). Subsequently, among the combinations suitable for the initial index, combinations corresponding to spectral efficiency values lower than the lowest spectral efficiency in [Table 13] are sequentially allocated to indexes from index 0, and the existing modulation and coding rate combinations in [Table 10] are sequentially allocated to the remaining indexes. For example, since spectral efficiency of the combinations (QPSK, 64/1024), (QPSK, 78/1024), and (QPSK, 99/1024) is lower than that of the combination of (QPSK, 120/1024) corresponding to the lowest spectral efficiency in [Table 13], the combinations may be allocated to indexes 0, 1, and 2, respectively, and the existing combinations in [Table 13] may be sequentially allocated to the following indexes. Through such a method, a new MCS table may be determined as shown in [Table 28]. In the same way, when combinations suitable for the initial index are configured as (QPSK, 78/1024) and (QPSK, 99/1024), a new MCS table may be determined as shown in [Table 29]. When X combinations suitable for the initial index are selected, X indexes may be replaced with the combinations suitable for the initial index among the combinations in [Table 13].

TABLE 28

| MCS Index IMCS | Modulation Order Qm | Target code Rate [R × 1024] | Spectral efficiency |
|---|---|---|---|
| 0 | 2 | 64 | 0.1250 |
| 1 | 2 | 78 | 0.1523 |
| 2 | 2 | 99 | 0.1934 |
| 3 | 2 | 120 | 0.2344 |
| 4 | 2 | 193 | 0.3770 |
| 5 | 2 | 308 | 0.6016 |
| 6 | 2 | 449 | 0.8770 |
| 7 | 2 | 602 | 1.1758 |
| 8 | 4 | 378 | 1.4766 |
| 9 | 4 | 434 | 1.6953 |
| 10 | 4 | 490 | 1.9141 |
| 11 | 4 | 553 | 2.1602 |
| 12 | 4 | 616 | 2.4063 |
| 13 | 4 | 658 | 2.5703 |
| 14 | 6 | 466 | 2.7305 |
| 15 | 6 | 517 | 3.0293 |
| 16 | 6 | 567 | 3.3223 |
| 17 | 6 | 616 | 3.6094 |
| 18 | 6 | 666 | 3.9023 |
| 19 | 6 | 719 | 4.2129 |
| 20 | 6 | 772 | 4.5234 |
| 21 | 6 | 822 | 4.8164 |
| 22 | 6 | 873 | 5.1152 |
| 23 | 8 | 682.5 | 5.3320 |
| 24 | 8 | 711 | 5.5547 |
| 25 | 8 | 754 | 5.8906 |
| 26 | 8 | 797 | 6.2266 |
| 27 | 8 | 841 | 6.5703 |
| 28 | 2 | reserved | |
| 29 | 4 | reserved | |
| 30 | 6 | reserved | |
| 31 | 8 | reserved | |

TABLE 29

| MCS Index IMCS | Modulation Order Qm | Target code Rate [R × 1024] | Spectral efficiency |
|---|---|---|---|
| 0 | 2 | 78 | 0.1523 |
| 1 | 2 | 99 | 0.1934 |
| 2 | 2 | 120 | 0.2344 |
| 3 | 2 | 193 | 0.3770 |
| 4 | 2 | 308 | 0.6016 |
| 5 | 2 | 449 | 0.8770 |
| 6 | 2 | 602 | 1.1758 |
| 7 | 4 | 378 | 1.4766 |
| 8 | 4 | 434 | 1.6953 |
| 9 | 4 | 490 | 1.9141 |
| 10 | 4 | 553 | 2.1602 |
| 11 | 4 | 616 | 2.4063 |
| 12 | 4 | 658 | 2.5703 |
| 13 | 6 | 466 | 2.7305 |
| 14 | 6 | 517 | 3.0293 |
| 15 | 6 | 567 | 3.3223 |
| 16 | 6 | 616 | 3.6094 |
| 17 | 6 | 666 | 3.9023 |
| 18 | 6 | 719 | 4.2129 |
| 19 | 6 | 772 | 4.5234 |
| 20 | 6 | 822 | 4.8164 |
| 21 | 6 | 873 | 5.1152 |
| 22 | 8 | 682.5 | 5.3320 |
| 23 | 8 | 711 | 5.5547 |
| 24 | 8 | 754 | 5.8906 |
| 25 | 8 | 797 | 6.2266 |
| 26 | 8 | 841 | 6.5703 |
| 27 | 8 | 885 | 6.9141 |
| 28 | 2 | reserved | |
| 29 | 4 | reserved | |
| 30 | 6 | reserved | |
| 31 | 8 | reserved | |

Embodiment 8

The embodiment relates to a method of designing an MCS table suitable for the case in which a wireless communication system such as 5G NR allows a modulation scheme of 1024 QAM having a maximum modulation order of 10 and a method of transmitting and receiving data on the basis of the MCS table.

First, a CQI table defined as shown in [Table 30] below in the wireless communication system is assumed. In other words, it is assumed that the UE or the BS may configure the CQI table in [Table 30] as cqi_table parameter in [CQI determination-1] or [CQI determination-2] (the disclosure is described on the basis of a CQI table suitable for a target transport block error probability of 0.1 when a CSI-higher-layer parameter cqi-Table included in CSI-ReportConfig configures (or indicates) [Table 30] for convenience of description, but the disclosure is not limited thereto and the same application can be made to another CQI table).

TABLE 30

| CQI index | modulation | code rate × 1024 | Spectral efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 616 | 2.4063 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 853 | 8.3321 |
| 15 | 1024QAM | 948 | 9.2578 |

A newly defined MCS table may be configured in the UE or the BS on the basis of [Table 13] which is one of the MCS tables of the 5G NR system. According to an embodiment, it is assumed for convenience that MCS indexes 23 to 26 correspond to the modulation scheme of 1024 QAM, that is, the modulation order of 10 in the newly defined MCS table. When MCS index 22 corresponds to 256 QAM, MCS index 23 may be configured as an average value of spectral efficiency corresponding to CQI indexes 13 and 14 in the CQI table of [Table 30] or a value close to the average. For example, since an average value of spectral efficiency 7.4063 of CQI index 13 in [Table 30] and spectral efficiency 8.3321 of CQI index 14 in [Table 30] is 7.8692, spectral efficiency corresponding to index 23 of the newly defined MCS table may be configured as 7.8692 or a value close thereto. Since spectral efficiency 7.4063 of CQI index 13 in [Table 30] and spectral efficiency 8.3321 of CQI index 14 in [Table 30] are close values of actual spectral efficiency, the average value can be more accurately calculated.

$$\frac{1}{2} \times \left( \frac{948}{1024} \times 8 + \frac{853}{1024} \times 10 \right) \cong 7.8682.$$

According to a circumstance, spectral efficiency may be defined (or determined) as a close vale of the average value instead of the accurate average value, and the meaning of the close value may be, for example, a value within +3% or −3% of the accurate average value.

Since a value of [coding rate (R)×1024] has a value close to 805.7 when spectral efficiency is determined as 7.8682 and a value of [coding rate (R)×1024] has a value close to 805.8 when spectral efficiency is determined as 7.8692, a value of [coding rate (R)×1024] of MCS index 23 may be defined as a value of 805, 805.5, 806, or 806.5. Further, the spectral efficiency value corresponding to the values (805, 805.5, 806, or 806.5) of [coding rate (R)×1024] may be 7.8613, 7.8662, 7.8711, or 7.8760.

Values corresponding to CQI table index 14 in [Table 30] may be used as spectral efficiency corresponding to MCS index 24 of the newly defined MCS table and the value of [coding rate (R)×1024]. Similarly, values corresponding to CQI table index 15 in [Table 30] may be used as spectral efficiency corresponding to MCS index 26 and [coding rate (R)×1024].

Spectral efficiency corresponding to MCS index 25 of the newly defined MCS table may be determined as an average value of the values corresponding to CQI index 14 and CQI index 15 in [Table 30] or a close value of the average value (or determined as an average value of the values corresponding to MCS index 24 and MCS index 26 or a close value of the average value).

Since spectral efficiency values corresponding to CQI index 14 and the CQI index 15 in [Table 30] are 8.3321 and 9.2578, an average value thereof may be a value close to 8.7950. Alternatively, the average value is accurately calculated as follows.

$$\frac{1}{2} \times \left( \frac{853}{1024} \times 10 + \frac{948}{1024} \times 10 \right) \cong 8.7939$$

Accordingly, the average value of spectral efficiency may be 8.7939. Therefore, the spectral efficiency value corresponding to MCS index 25 may be determined as a close value of the accurate average value such as 8.7939 or 8.7950. The meaning of the close value may be a value within −3% to +3% of the accurate average value.

Since a value of [coding rate (R)×1024] has a value close to 900.5 when spectral efficiency is determined as 8.7939 and a value of [coding rate (R)×1024] has a value close to 900.6 when spectral efficiency is determined as 8.7950, a value of [coding rate (R)×1024] of MCS index 25 may be defined as a value of 900, 900.5, or 901. Further, the spectral efficiency value corresponding to the values (900, 900.5, or 901) of [coding rate (R)×1024] may be 8.7891, 8.7939 (~8.7940), or 8.7988.

An example of the MCS table designed through the above-described method may be expressed as [Table 31]. For reference, indexes 27 to 31 sequentially correspond to modulation orders 2, 4, 6, 8, and 10 in [Table 31] and mean indexes which can be configured for data retransmission.

TABLE 31

| MCS Index IMCS | Modulation Order Qm | Target Code Rate [R × 1024] | Spectral Efficiency |
|---|---|---|---|
| 0 | — | — | — |
| 1 | — | — | — |
| ... | ... | ... | ... |
| 22 | — | — | — |
| 23 | 10 | 805.5 | 7.8662 |
| 24 | 10 | 853 | 8.3321 |

TABLE 31-continued

| MCS Index IMCS | Modulation Order Qm | Target Code Rate [R × 1024] | Spectral Efficiency |
|---|---|---|---|
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

[Table 31] shows an example of the MCS table obtained by removing four indexes for 1024 QAM and one index value indicating reserved from [Table 13]. At this time, various MCS tables may be determined according to a method of determining MCS combinations to be removed from [Table 13] (however, in general, a combination of MCS index 0 is the most robust modulation order and coding rate combination which can endure in the system, and thus MCS index 0 may be equally configured).

According to an embodiment, [Table 31] may acquire combinations corresponding to MCS indexes 0 to 22 from [Table 13]. For example, a new MCS table may be configured through a combination of 23 MCS indexes, obtained by removing three modulation order and coding rate combinations from MCS indexes corresponding to modulation order 4 and two modulation order and coding rate combinations from MCS indexes corresponding to modulation order 6 in [Table 13] and sequentially rearranging the MCS indexes, and MCS indexes corresponding to 1024 QAM in [Table 31]. In a more detailed example, [Table 32] may be derived through a combination of 23 MCS indexes, obtained by removing modulation order and coding rate combinations (three combinations) of MCS indexes 5, 7, and 9 from MCS indexes corresponding to modulation order 4 and modulation order and coding rate combinations (two combinations) of MCS indexes 12 and 14 from MCS indexes corresponding to modulation order 6 in [Table 13], and MCS indexes in [Table 31].

TABLE 32

| MCS Index IMCS | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |

TABLE 32-continued

| MCS Index IMCS | Modulation Order Qm | Target code Rate [R × 1024] | Spectral efficiency |
|---|---|---|---|
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In another example, [Table 33] may be derived through a combination of 23 MCS indexes, obtained by removing modulation order and coding rate combinations of MCS index 5, MCS index 7, and MCS index 9 from MCS indexes corresponding to modulation order 4, MCS index 11 from MCS indexes corresponding to modulation order 6, and MCS index 20 from MCS indexes corresponding to modulation order 8 in [Table 13], and MCS indexes in [Table 31].

TABLE 33

| MCS Index IMCS | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 6 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

In another example, [Table 34] may be derived through a combination of 23 MCS indexes, obtained by removing modulation order and coding rate combinations of MCS index 4 from MCS indexes corresponding to modulation order 2, MCS index 7 and MCS index 9 from MCS indexes corresponding to modulation order 4, and MCS index 12 and MCS index 14 from MCS indexes corresponding to modulation order 6 in [Table 13], and MCS indexes in [Table 31].

TABLE 34

| MCS Index IMCS | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 4 | 378 | 1.4766 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

As described above, in the method of configuring the new MCS table on the basis of the MCS table in [Table 13], when the field of reserved corresponding to 1024 QAM is added by adding D modulation order and coding rate combinations corresponding to 1024 QAM, (D+1) combinations should be removed from the MCS combinations in [Table 13]. [Table 32] to [Table 34] are examples in the case of D=4 (for example, MCS indexes 23 to 26). For reference, indexes indicating reserved are generally used for retransmission, and thus it is preferable that the MCS index corresponding to each modulation order is included in the MCS table, but reserved corresponding to a specific modulation order may be omitted.

Further, [Table 31] to [Table 34] are only examples, and combinations of modulation orders and coding rates corresponding some MCS levels in each MCS table may be removed or changed. Further, a new MCS table may be generated by combining appropriate combinations of modulation orders and coding rates of the MCS table.

For example, in the configuration of the MCS table, if the MCS table is configured to include modulation order and coding rate combinations included in the CQI table and spectral efficiency corresponding thereto as many as possible, MCS tables different from the MCS tables in [Table 28] to [Table 34] may be defined. The meaning that the modulation order and coding rate combinations included in the CQI table and the spectral efficiency corresponding thereto are included as many as possible may be the meaning that, except for one to three modulation order and coding rate combinations included in the CQI table, the remaining modulation order and coding rate combinations are included in the MCS table.

In a detailed example, if an MCS table is designed to include combinations in the case in which the modulation order is 4 as many as possible among modulation order and coding rate combinations included in the MCS table in [Table 32], all or at least one of (modulation order, [coding rate (R)×1024], spectral efficiency value)=(4, 378, 1.4766) and (4, 616, 2.4063) should be included in the MCS table. As an example of the MCS table, except for modulation order and coding rate combinations corresponding to MCS index 6, MCS index 8, and MCS index 10 among the MCS indexes corresponding to modulation order 4 in [Table 13], the remaining modulation order and coding rate combinations may be included in the MCS table. In other words, the MCS table in which (modulation order, [coding rate (R)× 1024], spectral efficiency value)=(4, 378, 1.4766) for MCS index 5, (modulation order, [coding rate (R)×1024], spectral efficiency value)=(4, 490, 1.9141) for index 6, and (modulation order, [coding rate (R)×1024], spectral efficiency value)=(4, 616, 2.4063) for index 7 in [Table 32] and [Table 33] may be defined. Of course, it is only an example, and an MCS table necessarily including all or at least one of (modulation order, [coding rate (R)×1024], spectral efficiency value)=(4, 378, 1.4766) and (4, 616, 2.4063) and including at least one or a maximum of two of (4, 434, 1.6953), (4, 490, 1.9141), (4, 553, 2.1602), or (4, 658, 2.5703) may be defined. Accordingly, as an MCS table supporting 1024 QAM according to the disclosure, various MCS tables supporting 1024 QAM, such as MCS tables supporting 1024 QAM in [Table 35] and [Table 36] below, may be used. [Table 35] illustrates an MCS table in which information indicated by an MCS index having a modulation order of 4 is replaced through the above-described method from [Table 32]. [Table 36] illustrates an MCS table in which information indicated by an MCS index having a modulation order of 4 is replaced through the above-described method from [Table 33].

TABLE 35

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |

TABLE 35-continued

| MCS Index $I_{MCS}$ | Modulation Order Qm | Target code Rate [R × 1024] | Spectral efficiency |
|---|---|---|---|
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 36

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 517 | 3.0293 |
| 9 | 6 | 567 | 3.3223 |
| 10 | 6 | 616 | 3.6094 |
| 11 | 6 | 666 | 3.9023 |
| 12 | 6 | 719 | 4.2129 |
| 13 | 6 | 772 | 4.5234 |
| 14 | 6 | 822 | 4.8164 |
| 15 | 6 | 873 | 5.1152 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3321 |
| 25 | 10 | 900.5 | 8.7939 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

Although [Table 35] and [Table 36] illustrates the example in which the information indicated by the MCS index of modulation order 4 in [Table 32] and [Table 33] is replaced, embodiments of the disclosure are not limited thereto. Rows corresponding to indexes corresponding to other modulation orders as well as modulation order 4 may be replaced. For example, new MCS tables may be defined by replacing some of the modulation order and coding rate combinations corresponding to the corresponding modulation order in [Table 32] to [Table 36] with one or more modulation order and coding rate combinations in one of the CQI or MCS tables in [Table 9] to [Table 16].

Similarly, in the case of [Table 34], with respect to indexes 5, 6, and 7, an MCS table having a characteristic corresponding to (modulation order, [coding rate (R)×1024], spectral efficiency value)=(4, 616, 2.4063) for at least one of index 6 or index 7 and corresponding to at least two of to (modulation order, [coding rate (R)×1024], spectral efficiency value)=(4, 434, 1.6953), (4, 490, 1.9141), (4, 553, 2.1602), or (4, 658, 2.5703) for the remaining two indexes. Accordingly, as the MCS table according to the disclosure, an MCS table in which the set of (modulation order, [coding rate (R)×1024], spectral efficiency value) corresponding to one or more indexes in [Table 31] is changed to another value as described the above may be used.

Further, when modulation order and coding rate combinations in the case in which the modulation order is 6 in the CQI table of [Table 30] are included in the MCS table as many as possible, all or at least some of the combinations corresponding to (modulation order, [coding rate (R)×1024], spectral efficiency value)=(6, 567, 3.3223), (6, 666, 3.9023), (6, 772, 4.5234), and (6, 873, 5.1152) are included in the MCS table, but at least some of the combinations corresponding to (modulation order, [coding rate (R)×1024], spectral efficiency value)=(6, 466, 2.7305), (6, 517, 3.0293), (6, 616, 3.6094), (6, 719, 4.2129), and (6, 822, 4.8164) should be excluded from the MCS table. In a detailed example, (6, 466, 2.7305) is selected from [Table 35] and (6, 517, 3.0293) is selected from [Table 36], as the modulation order and coding rate combination between (modulation order, [coding rate (R)×1024], spectral efficiency value)=(4, 616, 2.4063) and (6, 567, 3.3223) in consideration of an interval of spectral efficiency. In [Table 35], (6, 517, 3.0293) and (6, 616, 3.6094) are excluded, and (6, 719, 4.2129) and (6, 822, 4.8164) are included. [Table 35] is an MCS table having a maximum modulation order of 1024 QAM and thus may be more suitable for a system supporting relatively high spectral efficiency. In a system requiring higher spectral efficiency, (6, 517, 3.0293) instead of (6, 466, 2.7305) may be selected for MCS index 8. In a system in which robustness is more important than spectral efficiency, exclusion of all or at least one of (6, 719, 4.2129) and (6, 822, 4.8164) may be replaced with all or at least one of (6, 517, 3.0293) and (6, 616, 3.6094) (however, MCS indexes are appropriately arranged in the order of spectral efficiency). The modulation order and coding rate combination may be similarly changed in the case of [Table 36].

For reference, in [Table 13] and [Table 31] to [Table 36], (modulation order, [coding rate (R)×1024], spectral efficiency value) corresponding to indexes m1, 2, and 3 are (2, 193, 0.3770), (2, 308, 0.6016), and (2, 449, 0.8770), respectively. However, the spectral efficiency value 0.6016 has a value beyond close values 0.6082 to 0.6458 within −3% to +3% for an average value 0.6270 of spectral efficiency values 0.3770 and 0.8770 correspond to index 1 and index 3. That is, the modulation or and coding rate combination of index 2 may be considered as a combination which is not in the CQI table in [Table 10] or [Table 30] and not based on an average value of two specific modulation order and coding rate combinations or a close value thereof. However, the combination of (2, 308, 0.6016) is identified as a combination included in the CQI table in which the maximum modulation order is different, that is, is not 8 as shown in [Table 9] and [Table 11]. It is preferable that spectral efficiency is uniform as much as possible when the MCS table is defined, but like in the above case, modulation order and coding rate combinations included in the CQI table corresponding to the maximum order value among the modulation orders included in the MCS table may be included as many as possible, and, according to a circumstance, at least one of the modulation order and coding rate combinations included in the CQI table corresponding to a maximum modulation order different from the maximum order value may be included.

For reference, the spectral efficiency value for index 2 may be configured as the average value of 0.6270 or a close value thereof, and, when it is configured as 0.6270, (modu-lation order [modulation order, coding rate (R)×1024], spectral efficiency value) may be determined as (2, 321, 0.6270).

Further, spectral efficiency values included in [Table 31] to [Table 36] may be replaced with close values of the respective values. As a detailed example, for index 23 of [Table 31] to [Table 36], (modulation order, [coding rate (R)×1024], spectral efficiency value) may be replaced with values such as (805, 7.8613), (806, 7.8711), or (806.5, 7.8760). Similarly, for index 25 of [Table 31] to [Table 36], (modulation order, [coding rate (R)×1024], spectral efficiency value) may be replaced with values such as (900, 8.7891) or (901, 8.7988). Spectral efficiency values 7.8662, 8.3321, 8.7939, and 9.2578 corresponding to MCS indexes 23, 24, 25, and 26 in [Table 31] to [Table 36] may be replaced with close values within −3% to +3%. When the spectral efficiency values are SE(23), SE(24), SE(25), and SE(26), the value of [coding rate (R)×1024] may be generally configured to have one of the values of $\lfloor SE(i)/10 \times 1024 \rfloor$, $\lceil SE(i)/10 \times 1024 \rceil$, $\lfloor SE(i)/10 \times 1024 \rfloor \pm 0.5$, or $\lceil SE(i)/10 \times 1024 \rceil \pm 0.5$ for I=23, 24, 25, and 26 (here, $\lfloor \cdot \rfloor$ means a flooring operation and $\lceil \cdot \rceil$ means a ceiling operation).

The MCS tables in [Table 25] to [Table 36] designed up to now are only examples presented to describe a design method according to embodiments of the disclosure, and the embodiments of the disclosure are not limited thereto. According to a circumstance, another modulation and coding rate combination in which each coding rate or spectral efficiency has a close value within 10 to 20% may be configured.

Embodiment 9

The embodiment describes a method of determining a modulation and coding rate combination according to an MCS index using the existing MCS tables but on the basis of a prearranged rule. In general, when the newly designed MCS tables in embodiment 6 and embodiment 7 are applied to the system, the corresponding MCS tables may be indicated using parameters corresponding to the corresponding MCS tables through higher-layer signaling (for example, RRC signaling). According to an embodiment, the BS may transmit parameters indicating MCS tables designed through embodiment 6 to embodiment 8 to the UE through RRC signaling. Further, according to an embodiment, the table(s) may be indirectly indicated through a direct indication of target BLER or a parameter corresponding thereto in RRC (or MAC CE or DCI). For example, when a specific MCS table is indicated through higher-layer signaling and a target BLER or a user category is separately indicated, an appropriate MCS index may be determined on the basis of a predetermined rule in the MCS table according to the MCS table, the BLER, or the user category indicated by the indicators. At this time, when the BS indicates the target BLER or the user category, the MCS table, and the MCS index to the UE (for example, DCI including downlink resource allocation or DCI including uplink resource allocation), the UE may identify parameters (modulation order, coding rate, or spectral efficiency) indicated by the MCS index in the MCS table corresponding to the target BLER. The UE may receive downlink data (for example, PDSCH) or transmit uplink data (for example, PUSCH) on the basis of parameters indicated by the MCS index.

First, coding rate*1024 and spectrum efficiency according to each index J are R(J) or SE(J) and the modulation order is Q(J) in the MCS table, and the target BLER is referred to as $10^{-P}$. A method of determining the final coding rate by determining the appropriate value F(Q(J), P) on the basis of the target BLER and the modulation order and subtracting the determined appropriate F(Q(J), P) from the coding rate R(J) or adding them is described. In other words, when the target BLER is indicated through higher-layer signaling and the CQI table to be used is indicated, a real coding rate $R_{eff}(J)*1024$ may be generally calculated using the method of Equation 2 (a value obtained by multiplying the coding rate by 1024 is used in the disclosure for convenience, but the coding rate itself may be used).

In Equation 2 above, F(Q(J), P) may be a function complexly determined according to the value P corresponding to the modulation order Q(J) and the target BLER. Further, F(Q(J), P) may be divided into independent functions such as $F_1(Q(J))$ referring to a value determined on the modulation order and $F_2(P)$ referring to a value determined according to the target BLER like $F(Q(J), P)=F_1(Q(J))+F_2(P)$. Further, according to a circumstance, $F_1(Q(J))=0$ is configured, and thus $R_{eff}(J)$ may be configured as a value irrelevant to the modulation order. For example, in the case of $F_1(Q(J))=0$ and $F_2(P)=(P-1)*c$, $R_{eff}(J)=R(J)-c$ if the target BLER=$10^{-2}$, $R_{eff}(J)=R(J)-2*c$ if the BLER=$10^{-3}$, $R_{eff}(J)=R(J)-3*c$ if the target BLER=$10^{-4}$, and $R_{eff}(J)=R(J)-4*c$ BLER=$10^{-5}$ according to Equation 2 above. In Equation 2 above, an appropriate value may be selected as the constant c according to the system. For example, the constant c may be configured as a value (for example, a value of 22.5 between 22 and 23) by approximately uniformly dividing 90, which is the difference between the values of 120 and 30 of index 1 with reference to [Table 12] and [Table 14] or may be a value configured in consideration of an average of the difference according to each modulation and coding rate combination.

Equation 2 above indicates addition of the existing coding rate and specific values and subtraction of specific values from the existing coding rate according to the predetermined rule, but a method using specific rate values such as multiplication or division of the existing coding rate by the appropriate value according to the predetermined rule may also be used as an embodiment of the disclosure.

According to an embodiment, a method applying another rule according to P and P1 may be used. For example, a method of adding an appropriate value is used when P1 is equal to or smaller than a specific value, and a method of multiplying an appropriate value is used when P1 is larger than a specific value.

Embodiment 10

The methods of designing or determining the MCS tables have been described in embodiment 6 to embodiment 9. The designed MCS tables may be stored in the BS or the UE and used to determine MCS indexes.

Modulation schemes supported by the current 5G NR system include QPSK, 16 QAM, 64 QAM, and 256 QAM. Different CQI tables and different MCS tables may be used by the order of the maximum modulation scheme supported by the UE. At this time, the UE may apply different CQI tables according to the target BLER and the maximum modulation order required by the system to determine or indicate the appropriate CQI index and transmit the value to the BS. Accordingly, the BS may configure or indicate an MCS index, that is, a combination for the modulation scheme and the target coding rate on the basis of the appropriate MCS table based on the corresponding CQI index or the CQI value corresponding thereto. At this time, the MCS index may be determined on the basis of the MCS table designed for the target BLER=0.001, like in newly designed [Table 25] to [Table 29] as well as [Table 12] to [Table 16].

As an example of the detailed method, the MCS index for the PDSCH, that is, the modulation order (or scheme) Qm and the target coding rate R may be determined through the following process in the 5G NR system.

for a PDSCH scheduled through a PDCCH including DCI format 1_0 or format 1_1 with CRC scrambled by a C-RNTI, an MCS-C-RNTI, a TC-RNTI, a CS-RNTI, an SI-RNTI, an RA-RNTI, or a P-RNTI or a PDSCH scheduled using a PDSCH configuration SPS-Config provided by a higher layer without corresponding PDCCH transmission, (a) when a higher-layer parameter mcs-Table given by PDSCH-Config is set as 'qam256' and the PDSCH is scheduled by the PDCCH of DCI format 1_1 with the CRC scrambled by the C-RNTI, the UE uses a value of MCS index $I_{MCS}$ in [Table 13] in order to determine a modulation order Qm and a target coding rate R.

(b) when the condition of (a) is not met, the UE is not configured by the MCS-C-RNTI, the higher-layer parameter mcs-Table given by PDSCH-Config is configured as 'qam64LowSE', and the PDSCH is scheduled by the PDCCH in a UE-specific search space with the CRC scrambled by the C-RNTI, the UE uses a value of MCS index $I_{MCS}$ in [Table 14] in order to determine a modulation order Qm and a target coding rate R.

(c) when the conditions of (a) and (b) are not met, the UE is configured by the MCS-C-RNTI, and the PDSCH is scheduled by the PDCCH to which the CRC scrambled by the MCS-C-RNTI is applied, the UE uses a value of MCS index $I_{MCS}$ in [Table 14] in order to determine a modulation order Qm and a target coding rate R.

(d) when the conditions of (a), (b), and (c) are not met, the UE is not configured by the higher-layer parameter mcs-Table given by SPC-Config, and the higher-layer parameter mcs-Table given by PDSCH-Config is set as 'qam256', (d-1) if the PDSCH is scheduled by the PDCCH of DCI format 1_1 to which the CRC scrambled by the CS-RNTI is applied, or (d-2) if the PDSCH is scheduled without corresponding SPDCCH transmission using SPS-Config, the UE uses a value of MCS index $I_{MCS}$ in [Table 13] in order to determine a modulation order Qm and a target coding rate R.

(e) when the conditions of (a), (b), (c) and (d) are not met and the UE is configured such that the higher-layer parameter mcs-Table given by SPS-Config is set as qam64LowSE, (e-1) if the PDSCH is scheduled by the PDCCH to which the CRC scrambled by the CS-RNTI is applied, or (e-2) if the PDSCH is scheduled without corresponding PDCCH transmission using SPS-Config, the UE uses a value of MCS index $I_{MCS}$ in [Table 14] in order to determine a modulation order Qm and a target coding rate R.

(f) when the conditions (a), (b), (c), (d), and (e) are not met when the UE uses a value of MCS index $I_{MCS}$ in [Table 12] in order to determine a modulation order Qm and a target coding rate R.

The content for determining the MCS index for the PDSCH, that is, the modulation order (or scheme) Qm and the target coding rate R corresponds to the content in the standard below.

TABLE 37

For the PDSCH scheduled by a PDCCH with DCI format 1_0 or format
1_1 with CRC scrambled by C-RNTI, MCS-C-RNTI, TC-RNTI, CS-RNTI, SI-
RNTI, RA-RNTI, or P-RNTI, or for the PDSCH scheduled without corresponding
PDCCH transmissions using the higher-layer-provided PDSCH configuration
SPS-Config,
    (a) if the higher layer parameter mcs-Table given by PDSCH-Config is set
to 'qam256', and the PDSCH is scheduled by a PDCCH with DCI format 1_1 with
CRC scrambled by C-RNTI
        -      the UE shall use $I_{MCS}$ and Table 5 to determine the
  modulation order ($Q_m$) and Target code rate (R) used in the physical
  downlink shared channel.
    (b) elseif the UE is not configured with MCS-C-RNTI, the higher layer
parameter mcs-Table given by PDSCH-Config is set to 'qam64LowSE', and the
PDSCH is scheduled by a PDCCH in a UE-specific search space with CRC
scrambled by C-RNTI
        -      the UE shall use $I_{MCS}$ and Table 6 to determine the
  modulation order ($Q_m$) and Target code rate (R) used in the physical
  downlink shared channel.
    (c) elseif the UE is configured with MCS-C-RNTI, and the PDSCH is
scheduled by a PDCCH with CRC scrambled by MCS-C-RNTI
        -      the UE shall use $I_{MCS}$ and Table 6 to determine the
  modulation order ($Q_m$) and Target code rate (R) used in the physical
  downlink shared channel.
    (d) elseif the UE is not configured with the higher layer parameter mcs-
Table given by SPS-Config, the higher layer parameter mcs-Table given by
PDSCH-Config is set to 'qam256',
        if the PDSCH is scheduled by a PDCCH with DCI format
1_1 with CRC scrambled by CS-RNTI or
        if the PDSCH is scheduled without corresponding PDCCH
transmission using SPS-Config,
        - the UE shall use $I_{MCS}$ and Table 5 to determine the
  modulation order ($Q_m$) and Target code rate (R) used in the physical
  downlink shared channel.
    (e) elseif the UE is configured with the higher layer parameter mcs-Table
given by SPS-Config set to 'qam64LowSE'
        if the PDSCH is scheduled by a PDCCH with CRC
scrambled by CS-RNTI or
        if the PDSCH is scheduled without corresponding PDCCH
transmission using SPS-Config,
        - the UE shall use $I_{MCS}$ and Table 6 to determine the
  modulation order ($Q_m$) and Target code rate (R) used in the physical
  downlink shared channel.
    (f) else
        -      the UE shall use $I_{MCS}$ and Table 4 to determine the
  modulation order ($Q_m$) and Target code rate (R) used in the physical
  downlink shared channel.
    end When [Table 25] to [Table 36] are used for a specific service scenario, a specific donation may be added and used between or before/after the conditions (a), (b), (c), (d), (e), and (f). For example, the MCS table such as at least one of [Table 25] to [Table 36] may be used by adding or subdividing conditions according to a configured value of mcs-Table of higher-layer signaling PDSCH-Config or mcs-Table of SPS-Config or whether the PDSCH is scheduled on the basis of the PDCCH to which the CRC scrambled by a specific RNTI (for example, C-RNTI, MCS-C-RNTI, TC-RNTI, CS-RNTI, SI-RNTI, RA-RNTI, or P-RNTI) is applied. At this time, the value of the parameter mcs-Table may be set as another value, not 'qam256' or 'qam64LowSE'. For example, when the parameter is configured as a parameter having another name of 'qam64MidSE', the target BLER is smaller than 0.1 and larger than 0.00001 (for example, the target BLER is close to 0.001) and the use of at least one of the MCS tables in [Table 25] to [Table 27] in which 64 QAM is defined as the maximum modulation scheme may be configured. In general, when the number of target BLERs is larger and more various service scenarios are considered, more MCS tables may be additionally used. Further, when 256 QAM is defined as the maximum modulation scheme, a parameter having another name such as 'qam256MidSE' may be configured and the use of the MCS table of [Table 28] or [Table 29] may be configured. Similarly, when 1024 QAM is defined as the maximum modulation scheme, a parameter having another name such as 'qam1024' or qam1024MidSE' may be configured according to the target BLER and the use of at least one of the MCS tables of [Table 31] or [Table 36] may be configured.

As an example of another detailed method, in the 5G NR system, for a PUSCH scheduled by an RAR UL grant, a PUSCH scheduled by DCI format 0_0 CRC-scrambled by C-RNTI, an MCS-C-RNTI, a TC-RNTI, or a CS-RNTI, a PUSCH scheduled by DCI format 0_1 CRC-scrambled by a C-RNTI, an MCS-C-RNTI, a CS-RNTI, or an SP-CSI-RNTI, or a PUSCH having a grant configured using a CS-RNTI, according to a type in which the PUSCH is scheduled,
  whether 'transform precoding' is deactivated or activated
    (disable or not),
  a parameter mcs-Table of higher-layer signaling pusch-
    Config or
  a set value of mcs-TableTransformPrecoder (for example,
    'qam256' or 'qam64LowSE'),
  a parameter mcs-Table of higher-layer signaling config-
    uredGrantConfig or
  a set value of mcs-TableTransformPrecoder (for example,
    'qam256' or 'qam64LowSE'), whether it is scheduled on the basis of the PDCCH to which the CRC scrambled by a specific RNTI, is applied, the MCS index for the PUSCH, that is, the modulation order (or scheme) Qm and the target coding rate R are determined. At this time, the conditions may be added or subdivided according to a service, and the MCS tables such as [Table 25] to [Table 36] may be additionally used. In this case, the value of the parameter mcs-Table may be set as another value, not 'qam256' or 'qam64LowSE', and when the parameter is configured as a parameter having another name, for example, 'qam64MidSE', the target BLER is smaller than 0.1 and larger than 0.00001 (for example, the target BLER is close to 0.001) and the use of at least one of the MCS tables in [Table 25] to [Table 27] in which 64 QAM is defined as the maximum modulation scheme may be configured. According to an embodiment, in addition, when the number of target BLERs becomes larger or more various service scenarios are considered, more various MCS tables as well as the above-described example may be additionally designed and used. Further, when 256 QAM is defined as the maximum modulation scheme, a parameter having another name such as 'qam256MidSE' may be configured and the UE may be configured to use the MCS table of [Table 28] or [Table 29]. Similarly, when 1024 QAM is defined as the maximum modulation scheme, a parameter having another name such as 'qam1024' or 'qam1024MidSE' may be configured according to the target BLER and the use of at least one of the MCS tables of [Table 31] or [Table 36] may be configured.

The TBS may be determined using a coding rate indicated by an index included in the MCS table. In 5G NR, the TBS may be determined by the number of allocated REs, the number of used layers, a modulation order, and a coding rate. Among various factors for determining the TBS, the modulation order and the coding rate may be determined through the MCS in signaling information. In some embodiments, the modulation order determined through the MCS may be used without any change and the coding rate determined through the MCS may be used without change, or they may be additionally adjusted according to RRC configuration information. In some embodiments, when only an MCS table for a service having a specific target BLER is defined and it is configured to support a service having which has the same maximum modulation order but a different BLER from the specific target BLER through RRC signaling, a transceiver may determine the modulation order and the coding rate in the defined MCS table and control only the coding rate to use the same. As a method of adjusting the coding rate, various methods as well as the method of embodiment 9 may be applied. For example, a method of subtracting a predetermined constant value from the coding rate, adding the predetermined constant value, or multiplying a specific ratio may be used. At this time, according to an embodiment, as the constant subtracted from or added to the coding rate or the multiplied specific ratio, the same values may be used for all CQI indexes. Further, according to an embodiment, as the constant subtracted from or added to the coding rate or the multiplied specific ratio, values determined according to (that is, values varying depending on) the modulation order may be used.

According to TS 38.214 which is one of the 5G NR standard documents, the TBS is determined on the basis of a value of $N_{RE} \times R \times Qm \times v$ when the total number of REs is $N_{RE}$, a coding rate is R, a modulation order is Qm, and the number of layers is v. When the value of $N_{RE}$ may be acquired as $N_{RE} = N_{PRB} \times N_{RE\_PRB}$ when the number of PRBs is $N_{PRB}$ and the number of allocated REs per PRB is $N_{RE\_PRB}$. The value of the TBS may be obtained using a predetermined method based on the value of $N_{RE} \times R \times Qm \times v$, but the TBS may be calculated for the values of $N_{RE}$, R, Qm, and v and then stored in a table to be used. That is, when all the values of TBS($N_{RE}$, R, Qm, and v) are stored and the respective parameters are determined using the table, the corresponding TBS may be determined on the basis of the table. Such a method additionally needs a memory for storing the TBS, but may rapidly determine the TBS due to omission of a predetermined calculation process.

The parameters $N_{RE}$, R, Qm, and v for table mapping or storage may use different values according to a circumstance. For example, the TBS value may be stored in the table by using the MCS index having one-to-one correspondence between R and Qm or the spectral efficiency SE in one-to-one correspondence. At this time, R and Qm indicated by the MCS index or the spectral efficiency SE vary depending on the MCS table configuration, and thus the TBS may become a table on the basis of information on the MCS table configuration. Further, since the value of $N_{RE}$ is determined according to the number of actual OFDM symbols, the number of allocated subcarriers per symbol, the number of RBs, and overhead, the table may be configured in the form of TBS (parameter1, parameter 2, . . . ) on the basis of the number of actual OFDM symbols and the RB when the TBS is determined in advance consideration of effects for the number of subcarriers or overhead. In addition, since the TBS varies depending on the number v of layers, the TBS may become a table on the basis of a rank value.

As a detailed example, when an MCS table indicator (referred to as QAM_configuration or MCS_configuration for convenience), an MCS (or MCS index), the number of RBs, the number of actual OFDM symbols, the number of layers, or the rank is calculated as needed or all TBS values are calculated in advance, and then the table TBS (QAM_configuration, MCS index, $N_{RB}$, $N_{Eff\_symbol}$, Rank) storing the values is possessed by the UE or the BS, the TBS may be determined on the basis of the parameters without a separate calculation process and then encoding and decoding of data may be performed on the basis of the determined TBS. In the case in which a rate of overhead in the symbols is considered on the basis of overhead when the number $N_{Eff\_symbol}$ of actual symbols is determined, the value of $N_{Eff\_symbol}$ may be generally defined as not only a rational number but also an integer. For example, when the overhead occupies half the resources allocated per symbol, the number $N_{Eff\_symbol}$ of symbols may be defined as rational numbers such as 0.5, 1, 1.5, 2, 2.5, . . . , 14.

The embodiment is only a simple example, and the TBS table may be generally stored or configured on the basis of at least some of $N_{RE}$, R, Qm, and v, or other relevant parameters QAM_configuration, MCS (or MCS index), $N_{RB}$, $N_{Eff\_symbol}$, and Rank, or a combination of the parameters. In the 5G NR system, when determining TBS, the UE/BS first calculates the number $N_{RE}'$ of REs allocated to PDSCH mapping in one PRB within allocated resources as $$N_{RE}' = N_{sc}^{RB} \cdot N_{symb}^{sh} - N_{DMRS}^{PRB} - N_{oh}^{PRB},$$

calculates the total number $N_{RE}$ of REs allocated to the PDSCH as $N_{RE} = \min(156, N_{RE}') \cdot n_{PRB}$, and calculates $N_{info}$— $N_{RE} \cdot R \cdot Q_m \cdot v$, so as to determine the TBS on the basis of the values ($N_{SC}^{RB}$ being the number of subcarriers included in one RB (for example, 12), $N_{symb}^{sh}$ being the number of OFDM symbols allocated to the PDSCH, $N_{DMRS}^{PRB}$ being the number of REs within one PRB occupied by demodulation reference signals (DMRSs) in the same code division multiplexing (CDM) group, and $N_{oh}^{PRB}$ being the number of REs (for example, configured as one of 0, 6, 12, and 18) occupied by overhead within one PRB configured by higher signaling). Accordingly, in order to determine the TBS, a TBS table may be configured on the parameters since the TBS values may be determined in advance on the basis of the parameters $N_{symb}^{sh}$, $N_{DMRS}^{PRB}$, $N_{oh}^{PRB}$, R, Qm, and v except for the parameter having a fixed value. Further, the table may be more efficiently configured through a combination of overhead values $N_{DMRS}^{PRB}$ or $N_{oh}^{PRB}$ and the value $N_{symb}^{sh}$ (as described above, the value of $N_{symb}^{sh}$ may be defined to include a rational number which is not an integer).

Embodiment 11

This embodiment proposes a TBS determination method when 1024 QAM is applied in a wireless communication system.

When a parameter of processingType2Enabled of higher-layer signaling PDSCH-ServingCellConfig (PUSCH-ServingCellConfig in the case of the PUSCH) is configured as 'enable' for a $j^{th}$ serving cell or MCS tables corresponding to 1024 QAM, such as [Table 31] to [Table 36], are configured, and at least one MCS index $I_{MCS}$ is indicated as a value larger than a predetermined value (for example, 26) for any PDSCH ($I_{MCS} > 27$ when a 256 QAM MCS table is configured and $I_{MCS} > 28$ when a 646 QAM MCS table is configured), the UE may not process PDSCH reception or PUSCH transmission if a data rate which can be determined on the basis of the number of symbols allocated to the PDSCH (or PUSCH) and the size of scheduled code blocks (size of TBs) is larger than a supported maximum data rate determined on the basis of a predetermined method. For example, if a condition of Equation 3 below is not satisfied, the UE may not process (handle) PDSCH reception or PUSCH transmission corresponding thereto.

$$\frac{\sum_{m=0}^{M-1} V_{j,xn}}{L \times T_s^\mu} \leq DataRateCC \qquad \text{[EQN. 3]}$$

L denotes the number of symbols allocated (assigned) to the corresponding PDSCH (or PUSCH), M denotes the number $$T_s^\mu = \frac{10^{-3}}{2^\mu \cdot N_{symb}^{slot}}$$

of TB(s) within the corresponding PDSCH (or PUSCH) (p: numerology of the corresponding PDSCH), $$V_{j,m} = C' \cdot \left\lfloor \frac{A}{C} \right\rfloor$$

for an $m^{th}$ TB denotes a value determined by the number A of bits included in the corresponding TB, the number C of code blocks corresponding to the corresponding TB, and the number C' of code blocks scheduled for the corresponding TB. Further, DataRateCC [Mbps] is a value obtained by calculating a maximum date rate (approximated) for one carrier in the frequency band of the corresponding serving cell with respect to a signaled band combination and a feature set consistent with the corresponding serving cell, and the value may be determined on the basis of Equation 4 below. However, Equation 4 below is only an embodiment of the disclosure, and the maximum data rate according to the disclosure may be determined on the basis of at least one parameter of the number of layers, a modulation order, a scaling factor, subcarrier spacing, overhead, the number of RBs in the bandwidth, and the length of OFDM symbols.

In the NR system, the maximum (approximated) data rate supported by the UE for the number of aggregated carriers in the band or the band combination may be determined through the following equation.

$$\text{data rate (in Mbps)} = \qquad \text{[EQN. 4]}$$
$$10^{-6} \cdot \sum_{j=1}^{J\Sigma} \left( v_{Layers}^{(j)} \cdot Q_m^{(j)} \cdot f^{(j)} \cdot R \frac{N_{PRB}^{BW(j),\mu} \cdot 12}{T_s^\mu} \left( 1 - OH^{(j)} \right)_{max} () \right)$$

In Equation 4, J denotes the number of carriers (CC) by carrier aggregation, Rmax=948/1024, $v_{layers}^{(j)}$ denote the maximum number of layers, $Qm^{(j)}$ denotes the maximum modulation order, $f^{(j)}$ denotes a scaling factor, and μ denotes subcarrier spacing. For $f^{(j)}$, one value of 1, 0.8, 0.75, and 0.4 may be reported by the UE, and μ may have a value shown in [Table 38] below ((j) being an index indicating a $j^{th}$ CC).

TABLE 38

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$$\frac{10^{-3}}{14 \cdot 2^\mu},$$

$T_s^\mu$ denotes the average OFDM symbol length, $T_s^\mu$ may be calculated as and $N_{PRB}^{BW(j),\mu}$ denotes the maximum number of RBs in BW(j). $OH^{(j)}$ is an overhead value, and may be given as 0.14 in the downlink of FR1 (also referred to as below 6 GHz (B6G), for example, a band equal to or lower than 7.125 GHz) and 0.18 in the uplink and given as 0.08 in the downlink of FR2 (also referred to as Above 6 GHz (A6G), for example, a band higher than 24.25 GHz) and 0.10 in the uplink.

Of course, values of the overhead OHO) may be defined as other values according to a service or a modulation order. For example, since the case in which the MCS tables supporting 1024 QAM, such as [Table 31] to [Table 36] in the wireless communication system means a specific condition corresponding to a very good channel environment, the value of OHO) may be differently configured. According to an embodiment, the use in a very good channel environment is assumed, an overhead value may be configured as smaller values (for example, values smaller than the reference). According to an embodiment, the modulation scheme of 1024 QAM is vulnerable to a peak-to-average power-ratio (PAPR) problem of the OFDM system or a phase error, and thus the overhead value may be configured as a value larger than the current reference.

When a vehicle-to-infra or vehicle to-vehicle (V2X) service is supported, data transmission and reception through a physical sidelink shared channel (PSSCH) may have a symbol allocation scheme different from that of data transmission and reception through a PDSCH, so that the value of OHO) may also be differently configured.

As a more detailed example for the V2X service, in the case of PSSCH data transmission and reception, at least a first symbol is allocated for automatic gain control (AGC) and a last symbol is allocated as a gap symbol for gap measurement, and thus the maximum number of OFDM symbols for actual data transmission and reception may be 12 (or smaller). In this case, the value of $OH^{(j)}$ may be larger than or equal to a specific value regardless of a configuration of a physical sidelink feedback channel (PSFCH). For example, the value of OHO) may be larger than or equal to $\frac{2}{12}$. As a detailed example, the value of OHO) may be configured as values including a specific value such as 0.21 larger than $\frac{2}{12}$ regardless of FR1/B6G and FR2/A6G. Alternatively, the value of OHO) may be determined according to a rate of slots in which PSFCH resources are configured or a period of PSFCH resources in the resource pool configuration of the corresponding carrier. At this time, as the rate of the configuration of PSFCH resources is higher, the value of $OH^{(j)}$ may become higher. For example, when a value in the case in which the PSFCH is configured in every slot is A, a value in the case in which the PSFCH is configured by one slot in every two slots is B, and a value in the case in which the PSFCH is configured by one slot in every four slots is C, the value of $OH^{(j)}$ may be configured to have the relation of A>B>C (for example, A=0.42, B=0.32, and C=0.26). For reference, the ratio of slots in which PSFCH resources are configured or the period of PSFCH resources may be determined on the basis of a parameter of sl-PSFCH-Period in the PSFCH-related configuration.

At least one sidelink resource pool may be configured in the UE for PSSCH transmission and reception, and the value of OHO) may be determined on the basis of a parameter of the resource pool having the largest bandwidth according to a higher-layer configuration.

Equation 3 means that some or all of the data reconstrcution processes of omitting the demodulation process for a received signal corresponding to data or performing the demodulation process but omitting the data decoding process such as LDPC decoding by the UE since, when a data rate which can be determined on the basis of the number of symbols allocated to the PDSCH (or PUSCH) and the scheduled code block size (or TBS) is configured to be larger than the maximum data rate which can be calculated according to a predetermined method, it is highly likely to fail data decoding due to a too high coding rate. However, Rmax=948/1024 is configured in Equation 4, but a coding rate which can be decoded may vary depending on basic graphs (or basic matrixes) BG(1) and BG(2) used for LDPC encoding and decoding in 5G NR, so that a different value may be applied as Rmax=948/1024 according to BG(1) and BG(2) (for example, the value of Rmax for BG(1) may be configured to be larger than the value of Rmax for BG(2)). For reference, the basic graph (or basic matrix) is determined according to the TBS length and the coding rate in 5N NR, and the LDPC encoding and decoding are performed according to the determined basic graph in initial transmission and retransmission.

[Method of Selecting Basic Graph (BG) (or Basic Matrix)]

When a coding rate indicated by an MCS is R,
TBS≤292 or TBS≤3824, and R≤0.67, or
the LDPC encoding is performed
on the basis of BG(2) (basic graph 2 or basic matrix 2) in the case of R≤0.25.
The LDPC encoding is performed
on the basis of BG(1) (basic graph 1 or basic matrix 1) in the other cases.

The (approximated) maximum data rate for the serving cell may be determined as a maximum value of the (approximated) maximum data rate calculated using Equation 4 according to each supported band or band combination. Further, for a single carrier-based 5G NR standalone (SA) operation, the UE may configure each parameter make a data rate for the corresponding carrier J=1 CC and a value of $$ v_{Layers}^{(j)} \cdot Q_m^{(j)} \cdot f^{(j)} $$

not be smaller than 4, so as to support the data rate not to be smaller than the data rate calculated through Equation 4 above.

However, when the maximum modulation order which can be supported in the wireless communication system is 8 (that is, $Q_m^{(j)}=8$), if a scaling factor $f^{(j)}$ is configured as 0.4, The above condition is satisfied only when $v_{Layers}^{(j)}$ is larger than or equal to 2
from $$ v_{Layers}^{(j)} \cdot Q_m^{(j)} \cdot f^{(j)} = v_{Layers}^{(j)} \times 3.2 \geq 4. $$

That is, any PDSCH or PUSCH data transmission/reception corresponding to a combination of $(v_{Layers}^{(j)}, f^{(j)})=(1, 0.4)$ does not need to be supported in the wireless communication system, or any PDSCH or PUSCH data transmission/reception supporting a data rate determined on the basis of the combination of $(v_{Layers}(j), f^{(j)})=(1, 0.4)$ also does not need to be supported. However, in a system supporting 1024 QAM, even though $f^{(i)}$ is configured as 0.4,
vLayers(j)=1 can be supported from $$ v_{Layers}^{(j)} \cdot Q_m^{(j)} \cdot f^{(j)} = v_{Layers}^{(j)} \times 10 \times 0.4 \geq 4, $$

and
accordingly, when the CQI or MCS table supporting 1024 QAM is configured like the CQI table in [Table 30] or the MCS table in [Table 31] to [Table 36] according to the disclosure, even PDSCH or PUSCH data transmission/reception supporting a combination of $(v_{Layers}^{(j)}, f^{(j)})=(1, 0.4)$ or a data rate larger than or equal to a (maximum) data rate determined on the basis of the combination may be supported.

More specifically, in the wireless communication system supporting 1024 QAM, the UE/BS may transmit and receive PDSCH or PUSCH data corresponding to the combination of $(v_{Layers}^{(j)}, Qm_{(j)}, f^{(j)})=(1, 10, 0.4)$ or transmit and receive PDSCH or PUSCH data supporting a data rate higher than or equal to a data rate determined on the basis of the combination of $(v_{Layers}^{(j)}, Qm^{(j)}, j^{(f)})=(1, 10, 0.4)$.

Of course, as described above, the case of supporting 1024 QAM in the wireless communication system (or the case in which the MCS table supporting 1024 QMA is configured) means a special situation having a very good channel environment, and thus the condition for $$v_{Layers}^{(j)} \cdot Q_m^{(j)} \cdot f^{(j)}$$

may be differently configured. For example, in a system allowing the case in which a value of $Qm^{(j)}$ is 10, a reference value of $$v_{Layers}^{(j)} \cdot Q_m^{(j)} \cdot f^{(j)}$$

is configured to be larger than 4 or there may be a limit on a value of $v_{Layers}^{(j)}$ or $f^{(j)}$. For example, the configuration may be limited not to configure the combination of $(v_{Layers}^{(j)}, f^{(j)})=(1, 0.4)$.

In the wireless communication system, it is possible to increase a decoding success probability by transmitting a TB having an appropriate TBS within a range which is not beyond the maximum data rate that can be supported for each UE, and as a result, minimize unnecessary retransmission.

When a higher-layer parameter maxNrofCodeWordsScheduledByDCI indicates that two codeword transmissions are 'enabled', the corresponding TB is 'disabled' if one of the two TBs is configured as $(I_{MCS}=26, rv_{id}=1)$ by DCI format 1_1. The UE is required to determine the TBS for data transmission and reception through a PDSCH allocated by a PDCCH of DCI format 1_0, format 1_1, or format 1_2 corresponding to a CRC scrambled by a C-RNTI, an MCS-C-RNTI, a TC-RNTI, a CS-RNTI, or an SI-RNTI except for the case in which the TB is 'disabled' by DCI format 1_1.

The TBS is determined on the basis of the total number $N_{RE}$ of REs allocated for the PDSCH or the PUSCH, Qm determined from MCS information of initial transmission, R, and the number v of used layers. Accordingly, the UE determines the TBS on the basis of Qm and R corresponding to the MCS index only for a value of $I_{MCS}$ from 0 to 28 when a CQI or MCS table corresponding to the maximum modulation order of 64 QAM is configured, only for a value of $I_{MCS}$ from 0 to 27 when a CQI or MCS table corresponding to the maximum modulation order of 256 QAM is configured, and only for a value of $I_{MCS}$ from 0 to 26 when a CQI or MCS table corresponding to the maximum modulation order of 1024 QAM, such as [Table 31] to [Table 36] is configured.

First, after determining the number $N_{RE}'$ of REs allocated to the PDSCH (or PUSCH) within one PRB, the BS or the UE determines the total number $N_{RE}$ of REs allocated to the PDSCH (or PUSCH) as $N_{RE}=\min(156, N_{RE}')\cdot n_{PRB}$ ($n_{PRB}$: the number of PRBs allocated to the UE) and determine the TBS value on the basis of the number of temporary information bits $N_{info}=N_{RE}\cdot Q_m\cdot R\cdot v$.

When $I_{MCS}$ is configured as a value larger than or equal to 27 and smaller than or equal to 31 if a CQI or MCS table corresponding to the maximum modulation order of 1024 QAM, such as [Table 31] to [Table 36], is configured, the TBS may be determined on the basis of DCI transported in the latest PDCCH for the same TB having $I_{MCS}$ configured to have a value from 0 to 26. If there is no PDCCH for the same TB configured to have the value from 0 to 26 and initial transmission PDSCH for the same TB is semi-persistently scheduled, the TBS is determined on the basis of the most recent semi-persistent scheduling assignment PDCCH.

Similarly, when $I_{MCS}$ is configured as a value larger than or equal to 28 and equal to or smaller than 31 if a CQI or MCS table having the maximum modulation order of 256 QAM is configured or when $I_{MCS}$ is configured as a value larger than 29 and equal to or smaller than 31 if a CQI or MCS table having the maximum modulation order of 646 QAM is configured, the TBS may be determined on the basis of DCI transported in the latest PDCCH for the same TB having $I_{MCS}$ configured as the value from 0 to 27 or the same TB having $I_{MCS}$ configured as the value from 0 to 28 for each case. If there is no PDCCH for the same TB configured as the value from 0 to 27 or the value from 0 to 28 and initial transmission PDSCH for the same TB is semi-persistently scheduled for each case, the TBS is determined on the basis of the most recent semi-persistent scheduling assignment PDCCH.

Embodiment 12

In the wireless communication system, when 1024 QAM is supported, it should be indicated whether the UE can support 1024 QAM. For example, in 5G NR, it may be indicated whether the UE supports 1024 QAM for the PDSCH for FR1 by using a parameter pdsch-1024QAM-FR1 only for FR1 for each UE of Phy-Parameters among physical layer parameters. Further, it may be indicated whether the UE supports 1024 QAM for the PDSCH for FR2 by using a parameter pdsch-1024QAM-FR2 only for FR2 for each band of BandNR parameters.

The UE may indicate the maximum modulation order to be applied to the downlink for a carrier to the BS to calculate an (approximated) maximum data rate on the basis of Equation 3 and [Embodiment 10] using a parameter supportedModulationOrderDL for each FSPC of FeatureSet-DownlinkPerCC. If the parameter is included, a modulation order larger than (or equal to) a value indicated by this value may be applied in the corresponding service cell (however, only for the case in which the UE supports the corresponding modulation order for the downlink).

If the parameter is not included, for FR1, the network may use a modulation order indicated by pdsch-256QAM-FR1 or pdsch-1024QAM-FR1.

for FR2, the network may use a modulation order indicated for each band. When pdsch-256QAM-FR2 or pdsch-1024QAM-FR2 is signaled, the modulation order indicated for each band indicates the value, and the modulation order 6, that is, 64 QAM is used when signaling is not performed for the given band.

When 1024 QAM is supported for the PUSCH, the UE may indicate supporting of 1024 QAM to the BS by using the parameter pusch-1024QAM for each band of BandNR parameters in the same way. The UE may indicate the maximum modulation order to be applied to the uplink for a carrier to the BS to calculate an (approximated) maximum data rate on the basis of Equation 3 and [Embodiment 10] using a parameter supportedModulationOrderUL for each FSPC. If the parameter is included, a modulation order larger than (or equal to) a value indicated by this value may be applied in the corresponding service cell (however, only for the case in which the UE supports the corresponding modulation order for the uplink).

If the parameter is not included, for FR1/FR2, the network may use a modulation order indicated for each band. When pusch-256QAM or pusch-1024QAM is signaled, the modulation order indicated for each band indicates the value, and the modulation order 6, that is, 64 QAM is used when signaling is not performed for the given band.

For reference, "FSPC" indicates signaling for each feature set and each component carrier (CC) (per CC per band per band combination).

Figure 8:
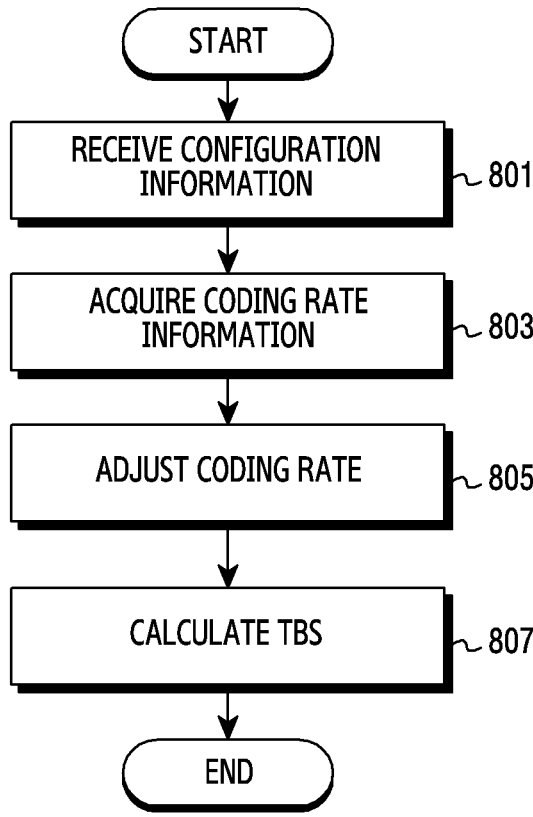
FIG. 8 is a flowchart illustrating the operation of the UE for calculating a transport block size (TBS) according to an embodiment of the disclosure.

FIG. 8 is a flowchart illustrating the operation of the UE for calculating a transport block size (TBS) according to an embodiment of the disclosure. FIG. 8 illustrates an operation method of the UE 120.

Referring to FIG. 8, in operation 801, the UE may receive configuration information from the BS. The configuration information may be configured in the UE through RRC signaling. That is, the BS (for example, the BS 110) signal RRC to the BS in consideration of a service to be provided to the UE. The UE makes an RRC configuration. In some embodiments, the configuration information may include information indicating an MCS table. The configuration information may include an indicator for directly configuring an MCS table to be used. In some embodiments, the configuration information may include a parameter for indirectly configuring an MCS table to be used. According to an embodiment, the parameter may include a value indicating a required transport block error probability or a service type indicator to be provided. According to an embodiment, the parameter may include a value indicating an SE level or a supported minimum or maximum modulation order. The parameter may indicate an MCS table to be configured through an indirect indication.

In operation 803, the UE may acquire coding rate information. The UE may acquire coding rate information from the BS. The coding rate information may include an MCS level. The BS may transmit resource allocation to the UE. In some embodiments, the resource allocation may include dynamic resource allocation through DCI. The DCI may include downlink resource allocation. Alternatively, the DCI may include uplink resource allocation. In some embodiments, the resource allocation may include semi-fixed resource allocation. For example, the resource allocation may include a semi-persistent scheduling (SPS) scheme. Further, for example, the resource allocation may include a configured grant scheme. The resource allocation may include the number of really allocated resource blocks and an index indicating an MCS level per transport block (or an index indicating an MCS level and a TBS). At this time, the MCS level may corresponding to a specific index in the MCS table. The specific index indicates a modulation order, a target coding rate, and spectral efficiency. The UE may acquire a coding rate and a modulation order which are the reference according to coding rate information.

In operation 805, the UE may control the coding rate. The UE may control the coding rate when a service defined in the RRC configuration is different from a service which is the reference. The meaning of the control of the coding rate may be a process of acquiring new tables and parameters indicated by MCS indexes according thereto. The UE may generate a new MCS table from the MCS tables (for example, [Table 12] to [Table 16]) pre-stored on the basis of the configuration information or may identify a newly designed MCS table. The UE may acquire a parameter value (for example, modulation order, modulation scheme according to the modulation order, coding rate, and spectral efficiency) according to the transmitted coding rate information (that is, MCS index) on the basis of the new MCS table.

According to an embodiment, service information itself for controlling the coding rate may be indicated through RRC signaling. Further, according to an embodiment, information for controlling the coding rate through the BLER value or other parameters distinguished by the service may be indicated. A detailed method of acquiring or determining the coding rate and the modulation order and a method of controlling the coding rate may follow various embodiments of the disclosure.

In operation 807, the UE may calculate a TBS by using the controlled coding rate. The UE may calculate the transport block size TBS on the basis of the number of resource blocks and the MCS level. Meanwhile, in the case of the uplink, the UE may directly acquire the TBS on the basis of the MCS level. Although not illustrated in FIG. 8, according to an embodiment, the BS 110 and the UE 120 may perform communication using at least one of wireless communication and wired communication.

Figure 9:
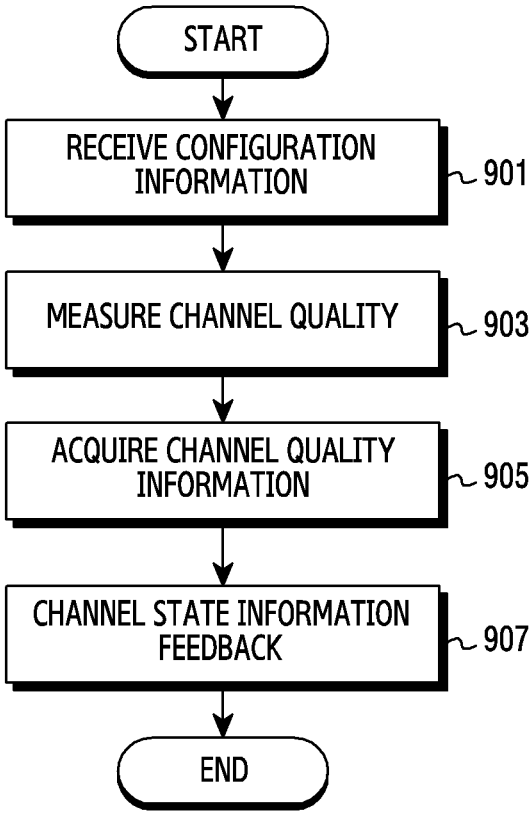
FIG. 9 is a flowchart illustrating the operation of the UE for channel state information feedback according an embodiment of the disclosure.

FIG. 9 is a flowchart illustrating the operation of the UE for channel state information feedback according an embodiment of the disclosure. FIG. 9 illustrates an operation method of the UE 120.

Referring to FIG. 9, in operation 901, the UE may receive configuration information. The configuration information may be RRC configuration information for CSI reporting. The BS (for example, the BS 110) signals RRC to the UE in consideration of a service to be provided to the UE. The UE makes an RRC configuration. The UE may receive the configuration information through RRC signaling. The configuration information may include information on a table to be used for feeding back a CQI index. The configuration information may include information for indicating a CQI table. According to an embodiment, the configuration information may include an indicator indicating a specific CQI table. Further, according to an embodiment, the configuration information may include a first indicator indicating a specific category and a second indicator indicating a specific CQI table within the corresponding category. In addition, according to an embodiment, the configuration information may include an indicator for indicating a specific target BLER value.

In operation 903, the UE may measure a communication quality. The UE may measure a communication quality of a reference signal transmitted from the BS. For example, the reference signal may include a CSI-RS. In another example, the reference signal may include a CRS. The UE may measure the communication quality (for example, SINR).

In operation 905, the UE may acquire channel quality information. The UE may determine a CQI. The UE may determine the CQI on the basis of the measured communication quality. The UE may first identify a CQI table in order to determine an appropriate CQI. The UE may identify the CQI table on the basis of the configuration information received from the BS. The operation of identifying the CQI table may be performed in operation 901 or operation 903 regardless of the order of operation 905.

According to an embodiment, the UE may acquire the CQI table from an indicator of the configuration information. The UE may identify a CQI table directly indicated by the configuration information. At this time, the UE may pre-store the corresponding CQI table. For example, the UE may pre-store CQI tables corresponding to target BLERs other than a CQI table corresponding to a target BLER=0.1 and a CQI table corresponding to a target BLER=0.00001.

Alternatively, the UE may pre-store a CQI table for another category service. This is because a quality requirement value varies depending on a performed service. Meanwhile, the UE may generate a new CQI table according to an indication of the BS. For example, the UE may acquire a CQI table corresponding to a specific target BLER value on the basis of the CQI table corresponding to the target BLER=0.1 and the CQI table corresponding to the target BLER=0.00001. The UE may acquire the CQI table corresponding to the specific target BLER value on the basis of the convention- ally stored tables (for example, the CQI table corresponding to the target BLER=0.1 and the CQI table corresponding to the target BLER=0.00001) by transmitting the specific target BLER value.

According to an embodiment, the UE may acquire or determine a coding rate and a modulation order which are the reference. The UE may control the coding rate when a service defined in the RRC configuration is different from a service which is the reference. The control of the coding rate may mean the acquisition of a CQI index indicating a coding rate value according to a newly defined CQI table. As the coding rate is controlled, a value indicated by the CQI index in the pre-stored table may become different. Similarly, as described above, the BS may indicate service information itself for controlling the coding rate through RRC signaling. Further, information on the control of a specific coding rate may be indicated through BLER values or other parameters distinguished according to a service. A detailed method of acquiring or determining the coding rate and the modulation order and a method of controlling the coding rate may follow various embodiments of the disclosure.

In operation 907, the UE may feed back channel state information. The channel state information may include channel quality information derived in operation 905. Although not illustrated in FIG. 9, according to an embodi- ment, the BS 110 and the UE 120 may perform communi- cation using at least one of wireless communication and wired communication.

It is possible to support efficient information throughput performance of the UE by configuring an appropriate MCS level (or index) in a communication system. Particularly, an MCS level (or index) for the DL may be variably configured to be suitable for a system condition on the basis of CSI or CQI information (or feedback) transmitted or reported by the UE in the UL, which is one of the basic roles of the link adaptation technology. The link adaptation technology is important to efficiently process packet-switch data traffic in the design of a radio interface. The link adaptation technol- ogy of LTE or 5G NR also dynamically controls a data rate (that is, a modulation scheme and a channel coding rate) to match a prevailing radio channel capacity of each UE.

Various data rates may be supported through a method of actually transmitting all or some of the encoded data through a puncturing method or repeatedly and actually transmitting all or some of the encoded data during an LDPC encoding process. As described above, the method by which the transmitter supports various data rates is referred to as rate matching, and, for example, a rate matching operation for an LDPC code of 5G NR may be referred to by TS 38.212 which is one of the standard documents. An operation of the receiver for the rate matching corresponding thereto may be referred to as de-rate-matching or rate de-matching. For reference, LDPC encoded data or code block may mean encoded bits generated from a parity check matrix of the LDPC code on the basis of the data or one code block, but all bits actually transmitted through the puncturing or rep- etition after LDPC encoding for one code block may be considered as LDPC encoded data for data or one code block. Further, the method such as puncturing or repetition can be applied to retransmission as well as initial transmis- sion.

For DL data transmission, an eNodeB which is the BS of LTE or a gNB which is the BS of 5G NR determines or selects a modulation scheme (or order) and a coding rate on the basis of prediction of a DL channel environment or condition. As a result, CSI or CQI feedback may be an indication for a data rate (that is, a modulation scheme and a channel coding rate) which can be supported in consider- ation of a signal to interference plus noise ratio (SINR) or an SNR and a characteristic of the receiver of the UE. In embodiment 13 and embodiment 14 below, a detailed example of the process for determining the appropriate MCS level through CQI feedback is described.

Embodiment 13

Figure 10:
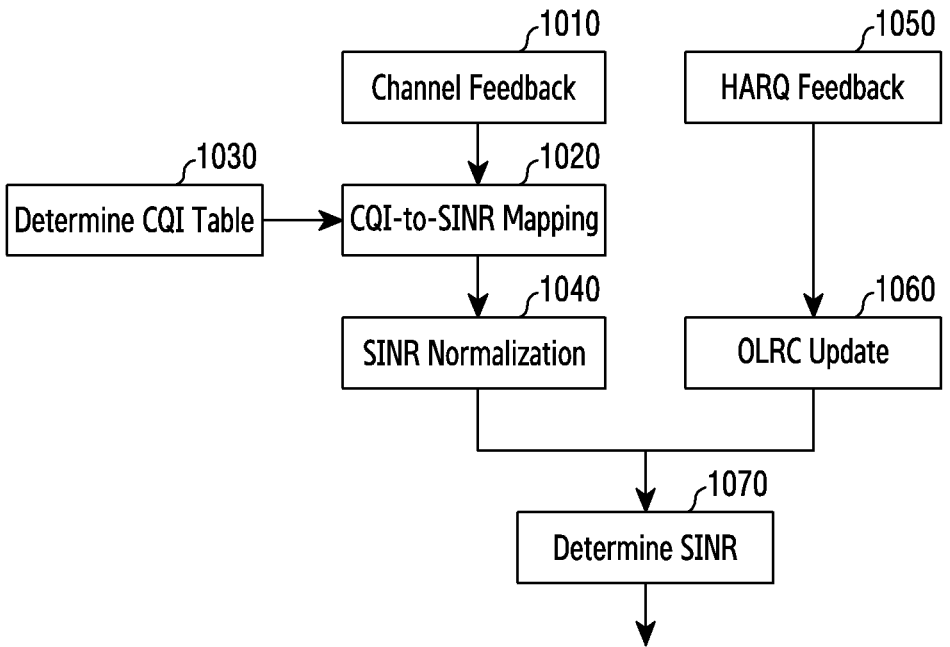
FIG. 10 is a flowchart illustrating signal-to-noise ratio (SINR) mapping based on CQI information received from the UE according to an embodiment of the disclosure.

FIG. 10 is a flowchart illustrating signal-to-noise ratio (SINR) mapping based on CQI information received from the UE according to an embodiment of the disclosure. FIG. 10 illustrates a process in which the BS receives CSI or CQI information (or feedback) transmitted by the UE in the UL and then determines or selects an optimized MCS level (or index) on the basis of the received CQI information (or CQI index) according to an embodiment of the disclosure.

In operation 1010, the BS may receive channel feedback from the UE. The channel feedback may include CSI. The CSI may include a CQI measured by the UE. A CQI value selected on the basis of a target BLER may be fed back. At this time, the CQI tables in [Table 9] to [Table 11] and [Table 17] to [Table 24] may be used.

In operation 1020, the BS may perform received CQI-to- SINR mapping. First, when CSI or CQI feedback is received from the UE, a link adaptation block of the BS performs an operation (or a function) of mapping (or converting) the CQI feedback information (or CQI index) to the SINR. Since the number of CQI tables is plural in LTE or 5G NR, a process of determining one of the CQI tables should be performed to map the CQI feedback information to the SINR. Accord- ingly, in operation 1030, the BS may determine a CQI table. According to an embodiment, the BS may identify pre- stored CQI tables. Further, according to an embodiment, the BS may generate or design a new CQI table on the basis of the pre-stored CQI tables. The BS may perform CQI-to- SINR mapping (or CQI-to SNR mapping) according to the determined CQI table in operation 1030.

In operation 1040, the BS may perform SINR normaliza- tion. The SINR (or SNR) value may be normalized to the case of single layer and single antenna. The SINR normal- ization may be performed on the basis of at least one of the number of CSI-RS ports, the number of antennas used for CSI-RS transmission, the number of antennas per CSI-RS port, or an RI (or a rank index or a rank indicated by the RI). For example, through the SINR (or SNR) normalization function, the SINR may be normalized on the basis of the number of CSI-RS ports and the RI (or a rank index or a rank indicated by the RI). Further, the SINR may be normalized on the basis of the RI (or a rank value indicated by the RI).

Such a normalization scheme may be differently applied according to a system operation or a requirement. In a detailed example, the SINR normalization may be per- formed on the basis of the number of CSI-RS ports and the rank when the UE or the BS operates in an area higher than or equal to a specific frequency area (for example, Above 6 GHz (A6G) or FR2), and the normalization may be performed on the basis of the rank in an area equal to or the specific frequency area (for example, Below 6 GHz (B6G) or FR1). Of course, a method opposite thereto or various other methods may be applied. After the SINR normalization, the BS may additionally perform an SINR filtering function in order to prevent fluctuation which makes the normalized SINR value unstable as necessary.

In operation 1050, the BS may receive HARQ feedback. The BS may perform link adaptation on the basis of the HARQ feedback. When the HARQ feedback is received, the BS may appropriately modify or convert the SINR value in order to perform outer loop rate control (OLRC) to achieve a target DL BLER.

In operation 1060, the BS may perform an OLRC update. The process of modifying or converting the SINR value to achieve the target DL BLER may include a process of determining an appropriate offset value on the basis of HARQ ACK/NACK information transmitted from the UE. In operation 1070, the BS may determine an SINR. The BS may apply a method of adding the offset value to the existing SINR value or subtracting the offset value from the existing SINR value. At this time, the BS may measure or determine a DL BLER on the basis of ACK/NACK information of all or at least some of the UL control channels corresponding to the PDSCH. Further, the determination or update of the OLRC offset may be performed on the basis of a type of the HARQ feedback. A value or setting for the OLRC update may be determined on the basis of a configuration of the MCS table. For example, a value for the OLRC update in the case of a configuration for an MCS table corresponding to a maximum modulation order of 256 QAM and a value for the OLRC update in the case of an absent/missing configuration or a configuration for an MCS table corresponding to a maximum modulation order of 64 QAM may be differently configured/determined.

Further, the determination or update of the OLRC offset can be controlled on the basis of a decoding result of the data transmitted in the UL. For example, it may be controlled on the basis of success and failure of the decoding of uplink control information (UCI) and the PUSCH or determination of DTX. The determination of decoding success or failure may be determined on the basis of at least one of a CRC check result, a syndrome check result of the LDPC code, and the size of an LLR value.

The determination or update of the OLRC offset can be controlled on the basis of the number of initial transmission and retransmissions. The determination or update of the OLRC offset can be controlled on the basis of a modulation order indicated by the received CQI index.

As described above, the efficient MCS level may be finally determined on the basis of the process illustrated in FIG. 10. The process illustrated in FIG. 10 is only an example, another function may be added according to a circumstance, and the respective functions of FIG. 10 may be more subdivided and performed. For example, the modified SINR may be additionally compensated or adjusted as necessary in order to accurately perform SINR-to-MPR mapping as well as the process illustrated in FIG. 10. Further, more appropriate values may be calculated on the basis of CQI/CSI erasure generated by a measurement gap (hereinafter, referred to M-Gap) operation during the SINR determination or calculation process and the appropriate MCS level may be determined on the basis of the values. That is, the MCS level may be determined on the basis of the M-Gap. The CQI/CSI erasure by the M-Gap may be generated by overlapping between an M-Gap time interval in which the UE or the BS measures signals in bands other than the currently used band and a time interval in which CSI should be reported. When the CQI/CSI erasure is generated, the BS may have difficulty in determining whether the erasure is generated by skipping or ignoring of the CSI reporting due to the M-Gap or by a bad reception environment of the UE. Accordingly, it is possible to configure a more appropriate MCS level by considering the MCS level on the basis of the CQI erasure or the CSI erasure according to a circumstance (for example, a CQI/CSI erasure rate may be used to determine the MCS level). If the CQI/CSI erasure is not considered, the BS may determine that the reception environment of the UE is bad and it is highly likely to reduce the MCS level through the OLRC, and thus transmission efficiency may decrease. Further, when CQI/CSI information for a time index t is CQI(t)/CSI(t) and information on CQI(t)/CSI(t) is erased, a value of SINR(t), RI(t), or PMI(t) may be determined on the basis of at least one of the previous CQI information CQI(t−k)/CSI(t−k), k=1, 2, . . . . For example, the values of SINR(t), RI(t), and PMI(t) may be configured as previously received values if SINR(t−1), RI(t−1), and PMI(t−1) or may be configured by multiplying the previously received values by an appropriate weighting factor, adding the weighting factor to the previously received values, or subtracting the weighting factor from the previously received values. As described above, the corresponding data may be transmitted to the UE by determining the TBS and performing the LDPC encoding for data or an input bitstream to be transmitted on the basis of the MCS determined in consideration of the CQI/CSI erasure.

After receiving a signal for transmitted data or input bitstream and then determining or identifying an MCS index (or level) determined via the process of FIG. 10, the UE identifies the size of the input bitstream or a TBS value on the basis of the MCS index (or a modulation order and a coding rate corresponding to the MCS index or an MPR) and determines or identifies a basic graph (or basic matrix) of an LDPC code to perform LDPC encoding and a parity check matrix on the basis of the determined size of input bitstream or TBS and the coding rate. Subsequently, it is possible to reconstruct the data or the input bitstream by performing decoding on the basis of the determined size of input bitstream or TBS, or the parity check matrix of the LDPC code.

According to [method of selecting basic graph (or basic matrix)], real BG(1) is used only when TBS>292 and R>0.67, or TBS>3824 and R>0.25. According to TS 38.214 which is one of the 5G NR standard documents, when the UE performs decoding on the basis of the LDPC code, it is assumed that the decoding can be omitted when an actual coding rate $R_{eff}$ is larger than 0.95. The actual coding rate $R_{eff}$ is a value obtained by dividing the total number of DL information bits including CRC bits added to the TB by the number of encoding bits (physical channel bits in the PDSCH). For example, in 5G NR, the CRC bits of 24 bits are added when the TBS is larger than 3824, and the CRC bits of 16 bits are added in the other cases.

The UE may skip decoding a transport block in an initial transmission if the effective channel code rate is higher than 0.95, where the effective channel code rate is defined as the number of downlink information bits (including CRC bits) divided by the number of physical channel bits on PDSCH.

Since the generation of decoding skip in the communication system means deterioration of actual efficiency, it is important for the BS to configure an MCS not to generate such a situation. That is, as the BS configures appropriate MCS and TBS, a decoding skip probability in the [Embodiment 11] is minimized and thus system efficiency increases.

However, if the MCS level is more lowered than necessary in order to reduce the decoding skip probability, a data processing speed of the entire system decreases, and thus controlling the appropriate MCS level is an important factor to maximize system efficiency.

The following embodiment shows an example of a method of determining an appropriate MCS level by the BS.

Embodiment 14

In general, like in [Embodiment 13], the UE accurately performs channel measurement on the basis of the CSI-RS and, when the BS accurately performs CQI-to-SINR mapping in consideration of various parameters, it is highly likely to configure an optimized MCS level. However, when overhead increases compared to actually allocated time/frequency resources, difference between a coding rate indicated by an MCS index and an actual coding rate increases (the actual coding rate increases), and thus an LDPC decoding failure probability of the UE increases and a risk is generated to not achieve the predicted BLER performance. Particularly, when overhead except for a PDCCH, a DMRS, and a CSI-RS/IM is generated, coding rate distortion due to the overhead is likely to affect the LDPC decoding performance, so that a configuration of the appropriate MCS level considering an effect for coding rate distortion is needed. It is possible to omit or minimize the decoding skip by configuring an MCS level more accurately reflecting the current channel state and acquire an effect of increasing data transmission efficiency while achieving a target BLER.

The BS may apply a specific limit to MCS determination so as to not generate a specific MCS index (for example, maximum MCS level) in a specific TBS, but may apply a method of adjusting the MCS level when specific overhead is applied to time-frequency resources in order to prevent LDPC decoding skip in the UE.

As a detailed example, if a tracking reference signal (TRS) is allocated to a specific slot, 6 REs may be used per RB for the TRS. Accordingly, data or parity bits of the LDPC code as many as the corresponding location cannot be mapped, and thus the actual coding rate increases. Particularly, when the TBS or the number of DL information bits is not relatively large, the effect of increasing the coding rate cannot be further ignored. Accordingly, in the case of the TRS slot, an effect such as "SNIR degradation" may be reflected (for reference, since the TRS cannot be located in a slot in which a synchronization signal block (SSB) is transmitted, the TRS slot may be deactivated (disabled) for the slot in which the SSB is transmitted).

As described above, by determining the MCS level in consideration of the TRS or the TRS slot, the overall transmission efficiency of the system may increase. There may be various methods of determining the MCS level. At this time, the method of determining the MCS level may include a method which does not consider the TBS or a method of determining the MCS level in consideration of the TBS.

As a detailed example, when the MCS level is determined after the CQI-to-SINR mapping process described in [Embodiment 13], the MCS level may be reduced by predetermined steps. For example, when an MCS level determined according to the method of [Embodiment 13] is I and a predetermined level difference to reduce the MCS level in consideration of the TRS or the TRS slot is d, a final MCS index is (I−d) (however, it is assumed that the MCS table or MCS configuration has been already determined).

As another example, in the 5G system, when the necessary use of BG(2) is considered in the case of TBS≤292, if the TBS value is smaller than 292 or a (predetermined) specific value ($\mathrm{TBS}_{MCS\_reduce}$) smaller 292, the highest MCS level is determined after the CQI-to-SINR mapping process and, when the TRS is configured, the actual coding rate is highly likely to be a close value of 0.95 or a value larger than or equal to the same. Accordingly, in such a situation, even though LDPC decoding skip is generated or LDPC decoding is performed in the UE, the decoding fails with a very high probability. In order to prevent the situation in advance, the BS may restrict not to configure the highest MCS level when all or at least some of the following conditions (or in a situation corresponding to all or at least some of the conditions).

$\mathrm{TBS}{\le}\mathrm{TBS}_{MCS\_reduce}$ (or $\mathrm{TBS}{<}\mathrm{TBS}_{MCS\_reduce}$)

A ratio (or amount) of overhead is larger than or equal to a specific reference value (threshold)

A specific overhead generation condition is satisfied (for example, when the TRS is configured" or "some or all of a PDCCH, a DMRS, and a CSI-RS/IM are configured and a (slot) is configured")

$\mathrm{TBS}_{MCS\_reduce}$ may be configured as a value smaller than 296 in the case limited to the use of BG(2) (for example, $\mathrm{TBS}_{MCS\_reduce}{=}288$ or $\mathrm{TBS}_{MCS\_reduce}{=}292$). Further, when the configuration is made on the basis of DL information bits including CRC bits, the reference may be configured as "the number of DL information bits≤$\mathrm{DL}_{info\_MCS\_reduce}$". Similarly, in the case limited to the use of BG(2), $\mathrm{DL}_{info\_MCS\_reduce}$ may be configured as a value smaller than 312 (for example, DLinfo_MCS_reduce=304 or DLinfo_MCS_reduce=308).

In another method, when the SINR value is finally determined to determine the MCS level in [Embodiment 13], the SINR value may be adjusted in consideration of the TRS or the TRS slot. For example, the SINR value may be adjusted to "SINR degradation" on the basis of the TRS or the TRS slot after an operation 1070 of determining the SINR in consideration of an OLRC offset in FIG. 10. Of course, this case may be differently applied according to requirements of the system (for example, the application can be made in consideration of B6G/A6G (or FR1/FR2)). Further, when the SINR value is expressed as an integer (for example, 0 to 12800) in a specific range for convenience of implementation in the system, "SINR degradation" may adjust the SINR value by subtracting an appropriate integer value after the process such as operation 1070 in FIG. 10 (there may be an additional adjustment process such as SINR compensation between operation 1070 of FIG. 10 and the "SINR degradation" processor or before/after the two processes).

For reference, in 5G NR, the TRS means a CSI-RS for tracking as a DL reference signal used by the UE for accurate time-frequency tracking. In other words, the 5G NR UE may configure the TRS, which means a configuration as the CSI-RS for tracking.

Although only the adjustment or restriction of the SINR or the MCS according to the TBS or overhead is described for convenience of description in [Embodiment 14], the SINR, the MCS, or the MPR may be adjusted or restricted according to various system conditions. That is, the SINR considering overhead for the TRS slot may be adjusted or the maximum MCS may be restricted, and also adjustment or restriction related to the MPR is possible.

As a simple example, the UE is likely to not perform the LDPC encoding when the coding rate is higher than 0.95 in the current 5G NR standard, so that an upper bound of the MPR may corresponding to a value based on 0.95*(maximum modulation order) or 0.95*1024*(maximum modulation order). The coding rate 0.95 may have a different value according to a decodable coding rate of the LDPC code corresponding to BG(1) and BG(2). Further, '0.95*1024' is expressed in the form of numerator in the case in which a denominator of the coding rate is 1024 in 5G NR, which means that a coding rate expression method in the CQI table or the MCS table is used. The MCS may be configured such that the actual coding rate does not exceed 0.95 through the restriction (or adjustment) of the SINR, the MCS, or the MPR.

Embodiment 15

The scheme for the new CQI table (for example, target BLER is not 0.1 or 0.00001) or the new MCS table (for example, midSE is configured) has been described through the CQI tables (for example, [Table 9] to [Table 11]) and the MCS tables (for example, [Table 12] to [Table 16]) predefined by embodiment 1 to embodiment 12.

Services which can be supported by the UE may be diversified. Further, various communication scenarios are considered. For example, not only simple data communication between the BS and the UE but also communication scenarios of the UE in various environments, such as a UE in NR lite, industrial Internet of things (IIOT), or machine type communication (MTC) are introduced. Accordingly, as types of services performed by the UE or types of UEs are diversified, requirements therefor are also diversified. Therefore, the BS is required to detect a capability of the UE and design a CQI table or MCS table suitable therefor.

The UE may transmit a message including UE capability information to the BS. According to an embodiment, the capability information may include information indicating whether the UE can support a service for a specific target BLER. According to an embodiment, the capability information may include information indicating whether the UE supports high-order modulation or demodulation or information indicating whether the UE supports a replaceable table. According to an embodiment, the capability information may include information indicating whether the UE can derive a new CQI value or a new MCS value from the predefined tables.

The BS may configure an RRC configuration in the UE on the basis of the UE capability information. According to an embodiment, the BS may generate configuration information for CSI reporting on the basis of the UE capability information. According to an embodiment, the BS may generate configuration information for a data channel (for example, a PUSCH or a PDSCH) on the basis of the UE capability information. Further, in order to detect the capability, the BS may first transmit a UE capability enquiry message to the UE.

A method of transmitting control information in a wireless communication system according to an embodiment of the disclosure may include a method of designing a CQI table to transmit channel state information (CSI) or a method using the designed CQI table. The method of transmitting control information in the wireless communication system may include a method of designing the designed CQI table or a method using the designed CQI table when supported services or target BLERs are different. The method of transmitting control information in the wireless communication system may include a method of determining or configuring an appropriate MCS by using the appropriate MCS table or the designed MCS table corresponding to the CQI table. The method of transmitting control information in the wireless communication system may include an SINR mapping method and an MCS configuring method on the basis of CQI information reported from the UE.

According to embodiments of the disclosure, a method performed by a UE includes a process of receiving configuration information for CSI reporting from a base station (BS), a process of acquiring a channel quality indicator (CQI) table on the basis of the configuration information for CSI reporting, and a process of transmitting CSI including the CQI according to the CQI table to the BS, and the CQI table may be configured on the basis of a first CQI table in the case in which a transport block error probability is 0.1 and a second CQI table in the case in which the transport block error probability is 0.00001.

According to an embodiment of the disclosure, the transmission block error probability corresponding to the CQI table may correspond to a value larger than 0.1 and smaller than 0.00001, a first set of indexes of the CQI table may indicate parameter combinations according to at least one index of the first CQI table, and a second set of indexes of the CQI table may indicate parameter combinations according to at least one index of the second CQI table.

According to an embodiment of the disclosure, a parameter combination indicated by an index $I_{0.1}$ of the first CQI table may correspond to a parameter combination indicated by a first index of the CQI table, an index $I_{0.00001}$ of the second CQI table may correspond to a second index of the CQI table, the first index may be larger than $I_{0.1}$, and the second index may be smaller than $I_{0.00001}$.

According to an embodiment of the disclosure, the process of acquiring the CQI table may include a process of acquiring the CQI table on the basis of a common parameter combination set, and the common parameter combination set may include one or more common parameter combinations among first parameter combinations indicated by indexes of the first CQI table and second parameter combinations indicated by indexes of the second CQI table.

According to an embodiment of the disclosure, the method may further include a process of receiving configuration information for a physical uplink shared channel (PUSCH) or a physical downlink shared channel (PDSCH) from the BS, a process of identifying a modulation and coding scheme (MCS) table on the basis of the configuration information for the PUSCH or the PDSCH, and a process of acquiring a transport block size (TBS) on the basis of the MCS table, and the MCS table may be configured on the basis of the first MCS table configured by default and a second MCS table configured for low spectral efficiency (SE) in the BS, the first set of indexes of the MCS table may indicate parameter combinations according to at least one index of the first MCS table, and the second set of indexes of the MCS table may indicate parameter combinations according to at least one index of the second MCS table.

According to embodiments of the disclosure, a method performed by a BS may include a process of transmitting configuration information to a UE and a process of receiving channel state information (CSI) including the CQI according to a channel quality indicator (CQI) table determined on the basis of the configuration information from the UE, and the CQI table may be configured on the basis of a first CQI table in the case in which a transport block error probability is 0.1 and a second CQI table in the case in which the transport block error probability is 0.00001.

According to an embodiment of the disclosure, the transmission block error probability corresponding to the CQI table may correspond to a value larger than 0.1 and smaller than 0.00001, a first set of indexes of the CQI table may indicate parameter combinations according to at least one index of the first CQI table, and a second set of indexes of the CQI table may indicate parameter combinations according to at least one index of the second CQI table.

According to an embodiment of the disclosure, a parameter combination indicated by an index $I_{0.1}$ of the first CQI table may correspond to a parameter combination indicated by a first index of the CQI table, an index $I_{0.00001}$ of the second CQI table may correspond to a second index of the CQI table, the first index may be larger than $I_{0.1}$, and the second index may be smaller than $I_{0.00001}$.

According to an embodiment, the CQI table may be acquired on the basis of a common parameter combination set, and the common parameter combination set may include one or more common parameter sets among first parameter combinations indicated by indexes of the first CQI table and second parameter combinations indicated by indexes of the second CQI table.

According to an embodiment of the disclosure, the method may include a process of identifying a modulation and coding scheme (MCS) table and a process of transmitting configuration information for a physical uplink shared channel (PUSCH) or a physical downlink shared channel (PDSCH) indicating the MCS table to the UE, and the MCS table may be configured on the basis of the first MCS table configured by default and a second MCS table configured for low spectral efficiency (SE) in the BS, the first set of indexes of the MCS table may indicate parameter combinations according to at least one index of the first MCS table, and the second set of indexes of the MCS table may indicate parameter combinations according to at least one index of the second MCS table.

According to embodiments of the disclosure, a UE includes at least one transceiver and at least one processor, and the at least one processor may be configured to receive configuration information for CSI reporting from a BS, acquire a channel quality indicator (CQI) table on the basis of the configuration information for CSI reporting, and transmit CSI including the CQI according to the CQI table to the BS, and the CQI table may be configured on the basis of a first CQI table in the case in which a transport block error probability is 0.1 and a second CQI table in the case in which the transport block error probability is 0.00001.

According to an embodiment of the disclosure, the transmission block error probability corresponding to the CQI table may correspond to a value larger than 0.1 and smaller than 0.00001, a first set of indexes of the CQI table may indicate parameter combinations according to at least one index of the first CQI table, and a second set of indexes of the CQI table may indicate parameter combinations according to at least one index of the second CQI table.

According to an embodiment of the disclosure, a parameter combination indicated by an index $I_{0.1}$ of the first CQI table may correspond to a parameter combination indicated by a first index of the CQI table, an index $I_{0.00001}$ of the second CQI table may correspond to a second index of the CQI table, the first index may be larger than $I_{0.1}$, and the second index may be smaller than $I_{0.00001}$.

According to an embodiment of the disclosure, in order to acquire the CQI table, the at least one processor may be configured to acquire the CQI table on the basis of a common parameter combination set, and the common parameter combination set may include one or more common parameter sets among first parameter combinations indicated by indexes of the first CQI table and second parameter combinations indicated by indexes of the second CQI table.

According to an embodiment of the disclosure, the at least one processor may be further configured to receive configuration information for a physical uplink shared channel (PUSCH) or a physical downlink shared channel (PDSCH) from the BS, identify a modulation and coding scheme (MCS) table on the basis of the configuration information for the PUSCH or the PDSCH, and acquire a transport block size (TBS) on the basis of the MCS table, and the MCS table may be configured on the basis of the first MCS table configured by default and a second MCS table configured for low spectral efficiency (SE) in the BS, the first set of indexes of the MCS table may indicate parameter combinations according to at least one index of the first MCS table, and the second set of indexes of the MCS table may indicate parameter combinations according to at least one index of the second MCS table.

According to various embodiments of the disclosure, a BS includes at least one transceiver and at least one processor, and the at least one processor may be configured to transmit configuration information to a UE and receive channel state information (CSI) including the CQI according to a channel quality indicator (CQI) table determined on the basis of the configuration information from the UE, and the CQI table may be configured on the basis of a first CQI table in the case in which a transport block error probability is 0.1 and a second CQI table in the case in which the transport block error probability is 0.00001.

According to an embodiment of the disclosure, the transmission block error probability corresponding to the CQI table may correspond to a value larger than 0.1 and smaller than 0.00001, a first set of indexes of the CQI table may indicate parameter combinations according to at least one index of the first CQI table, and a second set of indexes of the CQI table may indicate parameter combinations according to at least one index of the second CQI table.

According to an embodiment of the disclosure, a parameter combination indicated by an index $I_{0.1}$ of the first CQI table may correspond to a parameter combination indicated by a first index of the CQI table, an index $I_{0.00001}$ of the second CQI table may correspond to a second index of the CQI table, the first index may be larger than $I_{0.1}$, and the second index may be smaller than $I_{0.00001}$.

According to an embodiment, the CQI table may be acquired on the basis of a common parameter combination set, and the common parameter combination set may include one or more common parameter sets among first parameter combinations indicated by indexes of the first CQI table and second parameter combinations indicated by indexes of the second CQI table.

According to an embodiment of the disclosure, the at least one processor may be further configured to identify a modulation and coding scheme (MCS) table and transmit configuration information for a physical uplink shared channel (PUSCH) or a physical downlink shared channel (PDSCH) indicating the MCS table to the UE, and the MCS table may be configured on the basis of the first MCS table configured by default and a second MCS table configured for low spectral efficiency (SE) in the BS, the first set of indexes of the MCS table may indicate parameter combinations according to at least one index of the first MCS table, and the second set of indexes of the MCS table may indicate parameter combinations according to at least one index of the second MCS table.

The embodiments have been mostly described only for the UE/DL for convenience, but may be similarly applied to the case of the BS/UL in consideration of the number of DL information bits as the number of UL information bits.

Further, various embodiments may be configured through an appropriate combination of detailed processes of respective embodiments. That is, embodiments of the disclosure may be applied to not only link adaptation for downlink data but also link adaptation for uplink data (for example, CQI reporting and an MCS level indication for uplink data). The disclosure describes a scheme for designing (or generating) a new CQI table and a new MCS table through embodiment 1 to embodiment 14, but respectively embodiments may be individually implemented and a combination thereof may be used as necessary.

The target BLER mentioned in the disclosure is an example indicating a target transmission/reception error probability, and the target BLER may be generalized and used as a transport block error probability in each embodiment.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof

What is claimed is:

1. A method performed by a base station (BS) in a wireless communication, the method comprising:

identifying a set of entries for modulation and coding scheme (MCS), wherein each of the entries is associated with an index and includes a combination of a modulation order, a target code rate, and a spectral efficiency, for use in a physical downlink shared channel (PDSCH), determining a modulation order and a coding rate based on the set of entries;

determining a transport block size for the PDSCH, based on the determined modulation order and coding rate;

determining a parity check matrix for low density parity check (LDPC) encoding, based on the determined transport block size;

encoding data based on the determined parity check matrix; and transmitting at least a part of the encoded data to a user equipment (UE), wherein, in case that a higher-layer signaling parameter corresponding to the set of entries indicates 1024-quadrature amplitude modulation (QAM), the set of entries includes a maximum modulation order of 10, and comprises entries including modulation order and coding rate combinations of (10, 805.5/1024), (10, 853/1024), (10, 900.5/1024), and (10, 948/1024).

2. The method of claim 1, wherein the set of entries including the maximum modulation order of 10 further comprises 23 entries including modulation order and coding rate combinations included in a set of entries including a maximum modulation order of 8.

3. The method of claim 2, wherein the set of entries including the maximum modulation order of 8 includes modulation order and coding rate combinations of (2, 120/1024), (2, 193/1024), (2, 308/1024), (2, 449/1024), (2, 602/1024), (4, 378/1024), (4, 434/1024), (4, 490/1024), (4, 553/1024), (4, 616/1024), (4, 658/1024), (6, 466/1024), (6, 517/1024), (6, 567/1024), (6, 616/1024), (6, 666/1024), (6, 719/1024), (6, 772/1024), (6, 822/1024), (6, 873/1024), (8, 682.5/1024), (8, 711/1024), (8, 754/1024), (8, 797/1024), (8, 841/1024), (8, 885/1024), (8, 916.5/1024), and (8, 948/1024).

4. The method of claim 1, wherein the combination of the target code rate, and the spectral efficiency of at least one of the entries in the set of entries is omitted.

5. The method of claim 1, further comprising:

receiving, from the UE, a channel quality information (CQI), wherein the set of entries are determined based on the CQI.

6. A base station (BS) in a wireless communication, the BS comprising:

at least one transceiver; and at least one processor connected to the at least one transceiver;

at least one memory, coupled to the at least one processor, storing instructions executable by the at least one processor to cause the BS to:

identify a set of entries for modulation and coding scheme (MCS), wherein each of the entries is associated with an index and includes a combination of a modulation order, a target code rate, and a spectral efficiency, for use in a physical downlink shared channel (PDSCH), determine a modulation order and a coding rate based on the set of entries;

determine a transport block size for the PDSCH, based on the determined modulation order and coding rate;

determine a parity check matrix for low density parity check (LDPC) encoding, based on the determined transport block size;

encode data based on the determined parity check matrix; and transmit at least a part of the encoded data to a user equipment (UE), wherein, in case that a higher-layer signaling parameter corresponding to the set of entries indicates 1024-quadrature amplitude modulation (QAM), the set of entries includes a maximum modulation order of 10, and comprises entries including modulation order and coding rate combinations of (10, 805.5/1024), (10, 853/1024), (10, 900.5/1024), and (10, 948/1024).

7. The BS of claim 6, wherein the set of entries including the maximum modulation order of 10 further comprises 23 entries including modulation order and coding rate combinations included in a set of entries including a maximum modulation order of 8.

8. The BS of claim 7, wherein the set of entries including the maximum modulation order of 8 includes modulation order and coding rate combinations of: (2, 120/1024), (2, 193/1024), (2, 308/1024), (2, 449/1024), (2,602/1024), (4, 378/1024), (4, 434/1024), (4, 490/1024), (4, 553/1024), (4, 616/1024), (4,658/1024), (6, 466/1024), (6, 517/1024), (6, 567/1024), (6, 616/1024), (6, 666/1024), (6,719/1024), (6, 772/1024), (6, 822/1024), (6, 873/1024), (8, 682.5/1024), (8, 711/1024), (8,754/1024), (8, 797/1024), (8, 841/1024), (8, 885/1024), (8, 916.5/1024), and (8, 948/1024).

9. The BS of claim 6, wherein the combination of the target code rate, and the spectral efficiency of at least one of the entries in the set of entries is omitted.

10. The BS of claim 6, wherein the instructions further cause the BS to:

receive, from the UE, a channel quality information (CQI), wherein the set of entries are determined based on the CQI.

11. A method performed by a user equipment (UE) in a wireless communication, the method comprising:

receiving, from a base station (BS), an indication for modulation and coding scheme (MCS);

receiving, from the BS, encoded data via a physical downlink shared channel (PDSCH);

identifying a set of entries for the modulation and coding scheme (MCS) based on the indication, wherein each of the entries is associated with an index and includes a combination of a modulation order, a target code rate, and a spectral efficiency, for use in the PDSCH, determining a modulation order and a coding rate based on the set of entries;

determining a transport block size for the PDSCH, based on the determined modulation order and coding rate;

determining a parity check matrix for low density parity check (LDPC) encoding, based on the determined transport block size; and decoding data based on the determined parity check matrix, wherein, in case that a higher-layer signaling parameter corresponding to the set of entries indicates 1024-quadrature amplitude modulation (QAM), the set of entries includes a maximum modulation order of 10, and comprises entries including modulation order and coding rate combinations of (10, 805.5/1024), (10, 853/1024), (10, 900.5/1024), and (10, 948/1024).

12. The method of claim 11, wherein the combination of the target code rate, and the spectral efficiency of at least one of the entries in the set of entries is omitted.

13. The method of claim 11, wherein the set of entries including the maximum modulation order of 10 further comprises 23 entries including modulation order and coding rate combinations included in a set of entries including a maximum modulation order of 8.

14. The method of claim 13, wherein the set of entries including the maximum modulation order of 8 includes modulation order and coding rate combinations of: (2, 120/1024), (2, 193/1024), (2, 308/1024), (2, 449/1024), (2, 602/1024), (4, 378/1024), (4, 434/1024), (4,490/1024), (4, 553/1024), (4, 616/1024), (4, 658/1024), (6, 466/1024), (6, 517/1024), (6,567/1024), (6, 616/1024), (6, 666/1024), (6, 719/1024), (6, 772/1024), (6, 822/1024), (6,873/1024), (8, 682.5/1024), (8, 711/1024), (8, 754/1024), (8, 797/1024), (8, 841/1024), (8,885/1024), (8, 916.5/1024), and (8, 948/1024).

15. The method of claim 11, further comprising: transmitting, to the BS, a channel quality information (CQI).

16. A user equipment (UE) in a wireless communication, the UE comprising:

at least one transceiver; and at least one processor connected to the at least one transceiver;

at least one memory, coupled to the at least one processor, storing instructions executable by the at least one processor to cause the UE to:

receive, from a base station (BS), an indication for modulation and coding scheme (MCS);

receive, from the BS, encoded data via a physical downlink shared channel (PDSCH);

identify a set of entries for the modulation and coding scheme (MCS) based on the indication, wherein each of the entries is associated with an index and includes a combination of a modulation order, a target code rate, and a spectral efficiency, for use in the PDSCH, determine a modulation order and a coding rate, based on the set of entries;

determine a transport block size for the PDSCH, based on the determined modulation order and coding rate;

determine a parity check matrix for low density parity check (LDPC) encoding, based on the determined transport block size; and decode data based on the determined parity check matrix, wherein, in case that a higher-layer signaling parameter corresponding to the set of entries indicates 1024-quadrature amplitude modulation (QAM), the set of entries includes a maximum modulation order of 10, and comprises entries including modulation order and coding rate combinations of (10, 805.5/1024), (10, 853/1024), (10, 900.5/1024), and (10, 948/1024).

17. The UE of claim 16, wherein the combination of the target code rate, and the spectral efficiency of at least one of the entries in the set of entries is omitted.

18. The UE of claim 16, wherein the set of entries including the maximum modulation order of 10 further comprises 23 entries including modulation order and coding rate combinations included in a set of entries including a maximum modulation order of 8.

19. The UE of claim 18, wherein the set of entries including the maximum modulation order of 8 includes modulation order and coding rate combinations of: (2, 120/1024), (2, 193/1024), (2, 308/1024), (2, 449/1024), (2, 602/1024), (4, 378/1024), (4, 434/1024), (4,490/1024), (4, 553/1024), (4, 616/1024), (4, 658/1024), (6, 466/1024), (6, 517/1024), (6,567/1024), (6, 616/1024), (6, 666/1024), (6, 719/1024), (6, 772/1024), (6, 822/1024), (6,873/1024), (8, 682.5/1024), (8, 711/1024), (8, 754/1024), (8, 797/1024), (8, 841/1024), (8,885/1024), (8, 916.5/1024), and (8, 948/1024).

20. The UE of claim 16, wherein the instructions further cause the UE to:

transmit, to the BS, a channel quality information (CQI).

* * * * *